US007016859B2

(12) United States Patent
Whitesage

(10) Patent No.: US 7,016,859 B2
(45) Date of Patent: Mar. 21, 2006

(54) SYSTEM AND METHOD FOR MANAGING PURCHASING CONTRACTS

(75) Inventor: Michael D. Whitesage, Corrales, NM (US)

(73) Assignee: Michael Whitesage, Incline Village, NV (US)

( * ) Notice: Subject to any disclaimer, the term of this patent is extended or adjusted under 35 U.S.C. 154(b) by 872 days.

(21) Appl. No.: 09/764,178

(22) Filed: Jan. 17, 2001

(65) Prior Publication Data

US 2002/0010686 A1    Jan. 24, 2002

Related U.S. Application Data

(60) Provisional application No. 60/194,538, filed on Apr. 4, 2000.

(51) Int. Cl.
*G06F 17/60* (2006.01)

(52) U.S. Cl. ............................................. 705/8; 705/7
(58) Field of Classification Search .................... 705/7, 705/8
See application file for complete search history.

(56) References Cited

U.S. PATENT DOCUMENTS

| 4,862,357 | A | * | 8/1989 | Ahlstrom et al. ............... 705/6 |
| 5,191,523 | A |   | 3/1993 | Whitesage |
| 5,570,283 | A | * | 10/1996 | Shoolery et al. ............... 705/5 |
| 5,774,870 | A |   | 6/1998 | Storey |
| 5,832,453 | A |   | 11/1998 | O'Brien |
| 6,167,378 | A | * | 12/2000 | Webber, Jr. ..................... 705/8 |
| 6,236,984 | B1 | * | 5/2001 | Owens et al. ................... 707/1 |
| 6,338,071 | B1 | * | 1/2002 | Balaban et al. .......... 707/104.1 |
| 2001/0011222 | A1 | * | 8/2001 | McLauchlin et al. .......... 705/1 |
| 2001/0034626 | A1 | * | 10/2001 | Gillespie ......................... 705/6 |
| 2002/0178034 | A1 | * | 11/2002 | Gardner et al. ................ 705/5 |
| 2002/0184084 | A1 | * | 12/2002 | Lidow .......................... 705/10 |
| 2003/0014326 | A1 | * | 1/2003 | Ben-Meir et al. ............. 705/26 |

FOREIGN PATENT DOCUMENTS

WO        WO 00/17798    *    3/2000

* cited by examiner

*Primary Examiner*—Tariq R. Harz
*Assistant Examiner*—Andre Boyce
(74) *Attorney, Agent, or Firm*—Alberto Q. Amatong, Jr.; Morris & Amatong, P.C.

(57) ABSTRACT

A method of managing purchasing contracts between a supplier entity and a customer entity for the purchase of ticket products includes the step of generating a purchasing contract between the two entities. The generated contract is applicable to ticketing transactions effected through a computerized system and, which, effect a ticket purchase by the customer entity. Contract terms are identified which are defined by term attributes then, a term data set of the term attributes associated with each contract term is stored in a computer database. Furthermore, transaction data relating to purchasing transactions are collected and also stored in a computer database. A computer program is executed to identify purchasing transactions as contracted transactions (i.e., applicable to a contract) by selecting a portion of the transaction data for a transaction and comparing this portion with the term attributes for a contract term.

34 Claims, 46 Drawing Sheets

SYSTEM CONFIGURATION

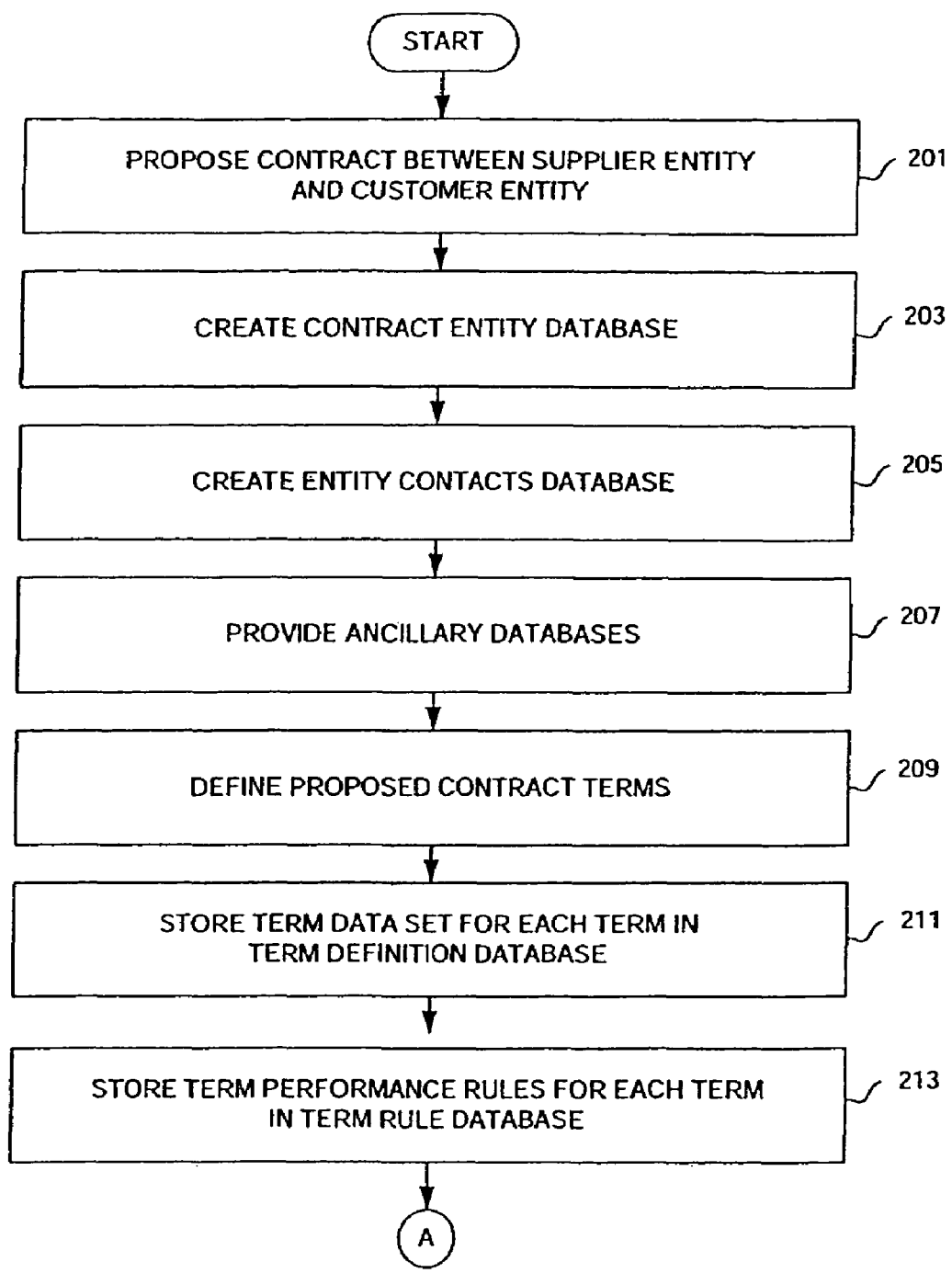

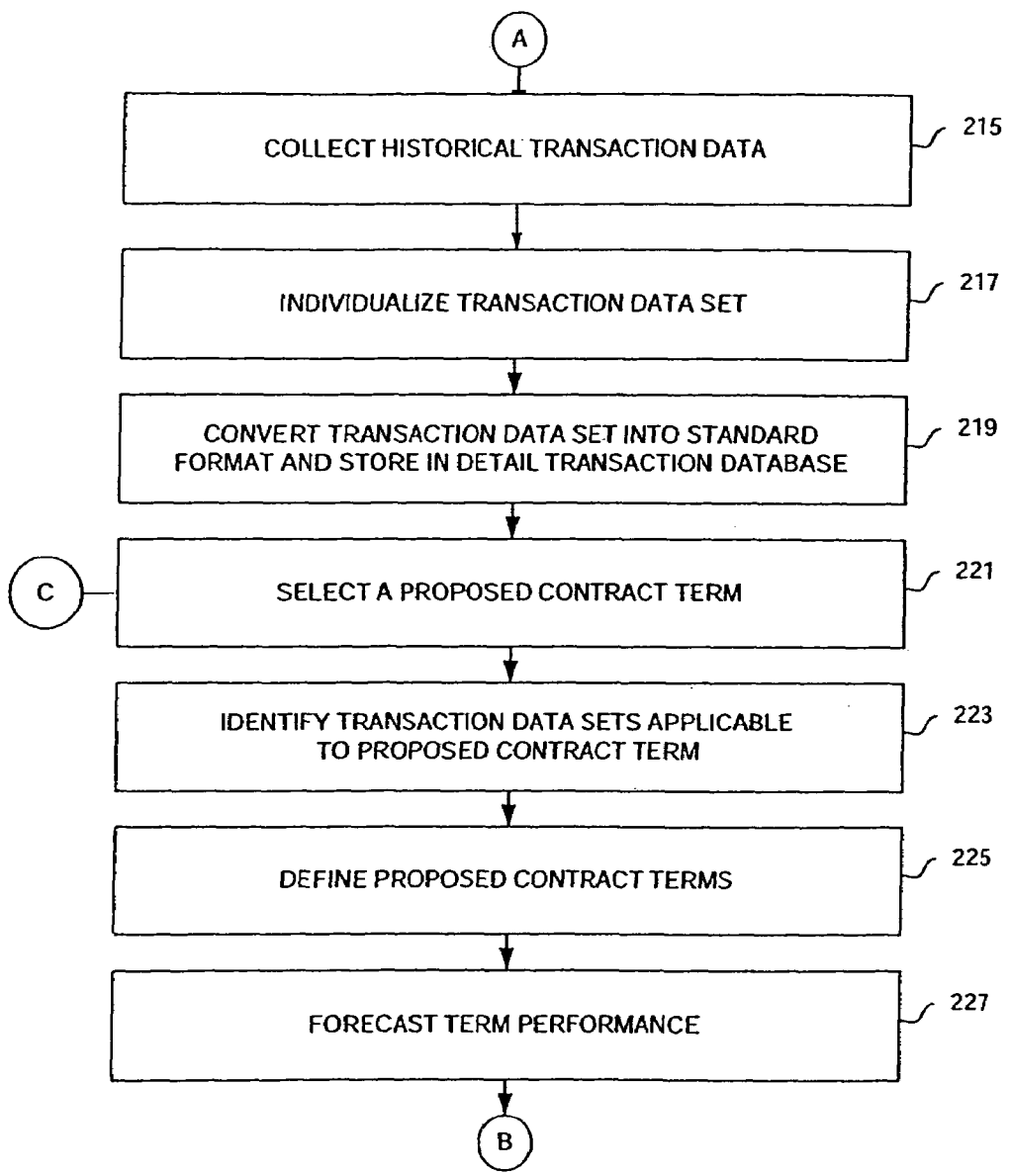

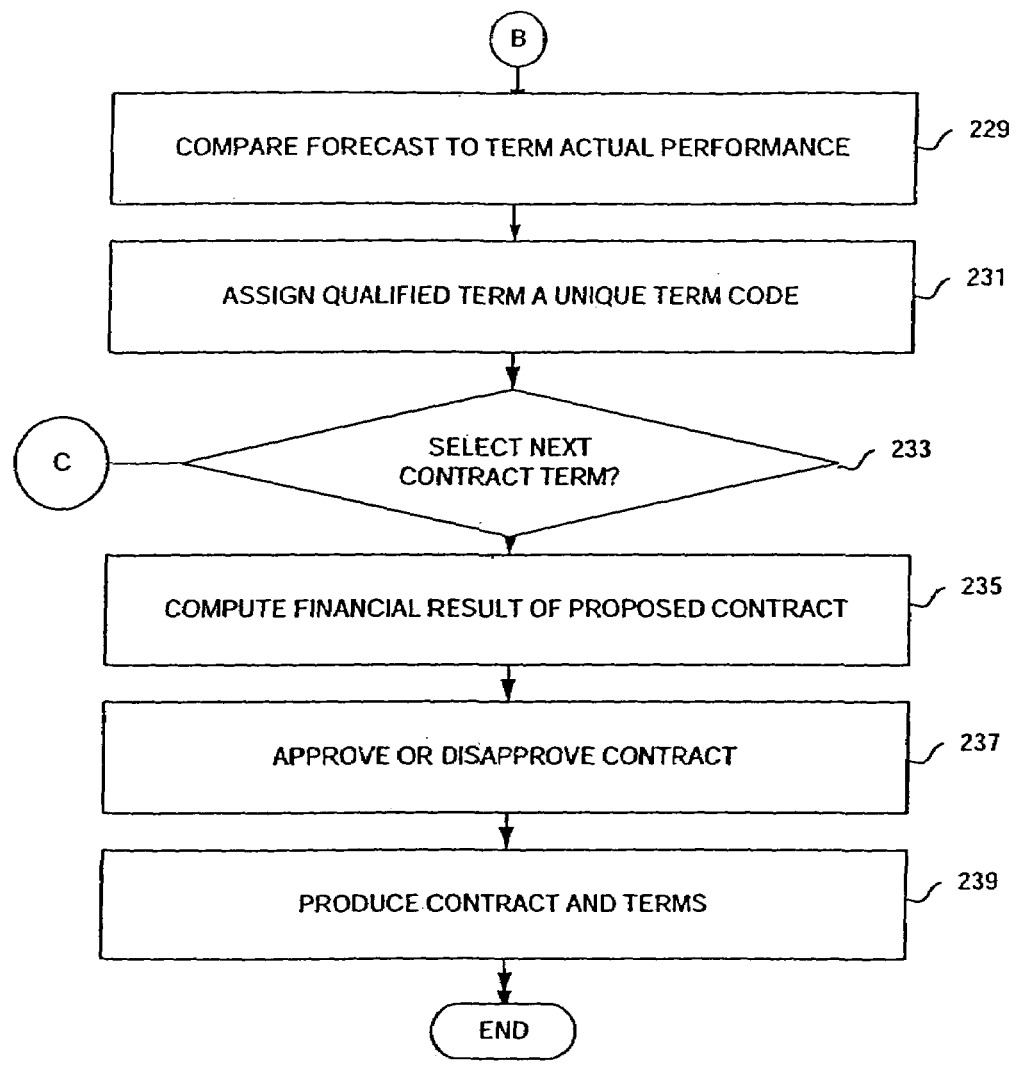

COMPUTER PROCESSOR AND DATABASES

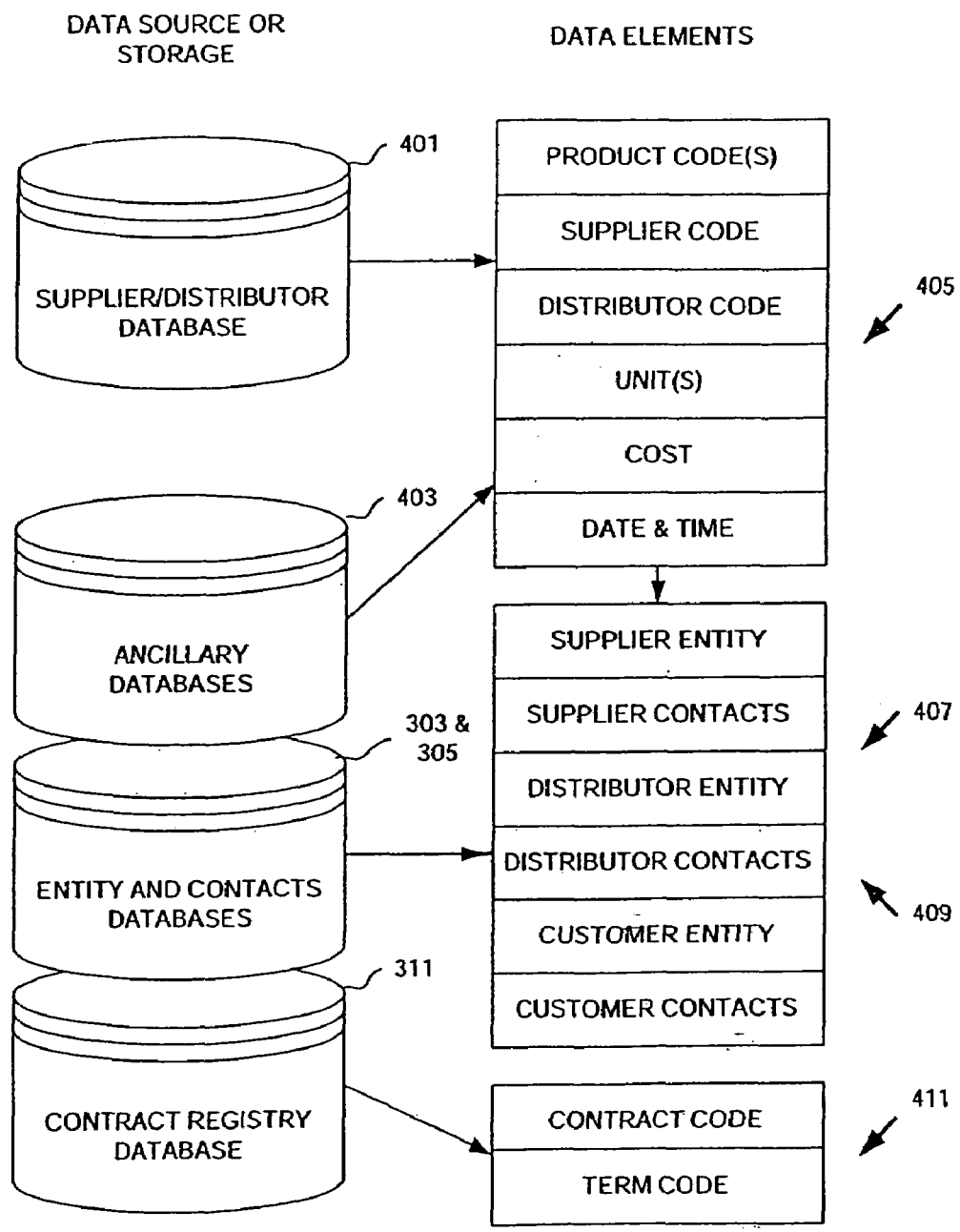
FIGURE 4.A
CONTRACT-DESIGNATED TRANSACTION

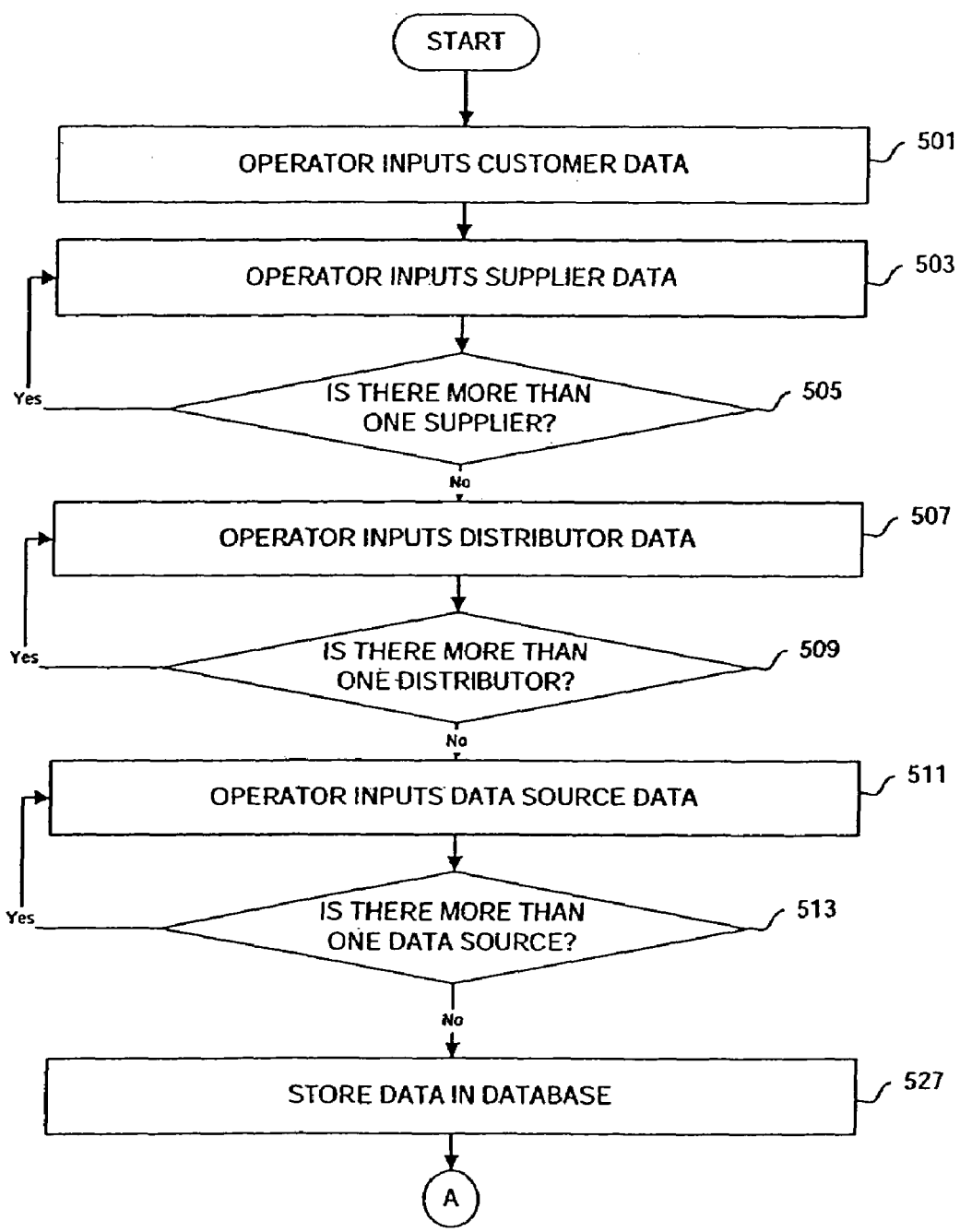
FIGURE 5.A
INPUT CONTRACT ENTITIES AND CONTACTS

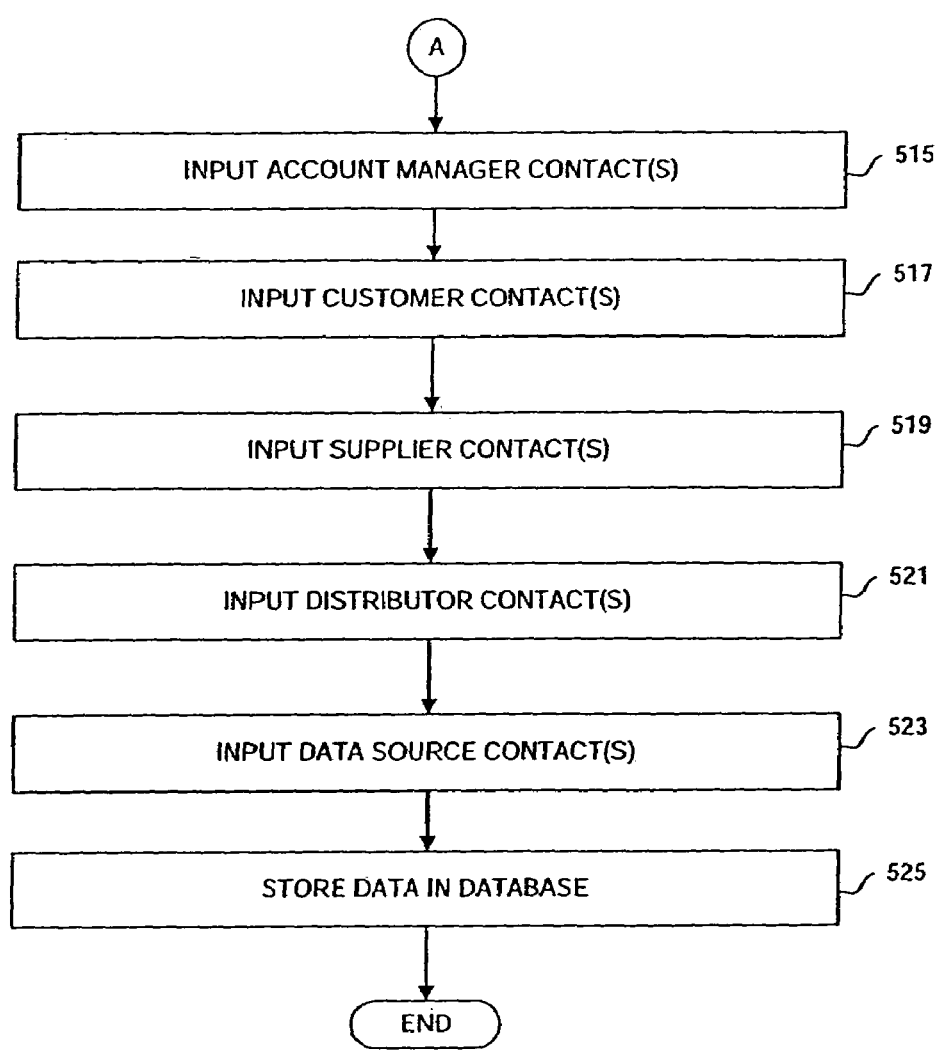
FIGURE 5.B
INPUT CONTRACT ENTITIES AND CONTACTS

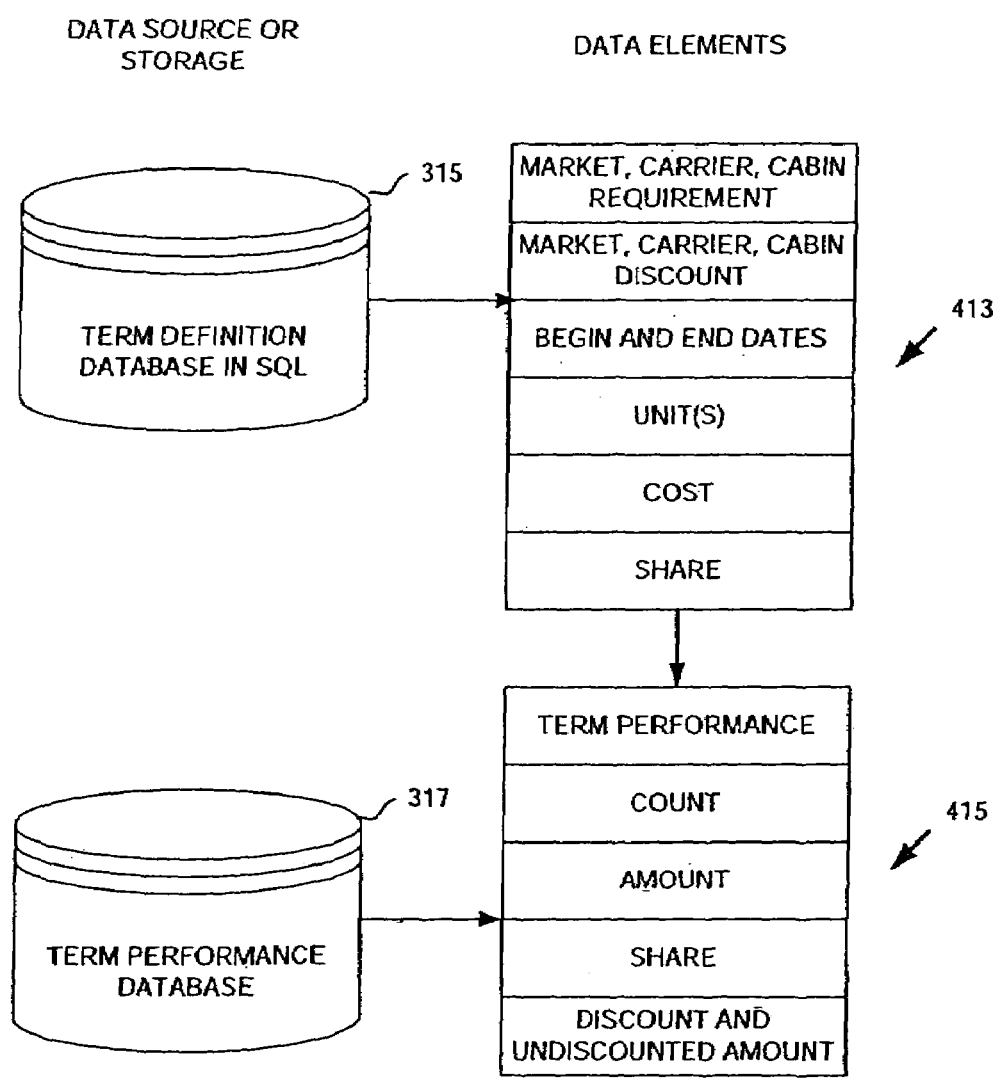
FIGURE 4.B
CONTRACT-DESIGNATED TRANSACTION

ESTABLISH CONTRACT AND TERM RULES

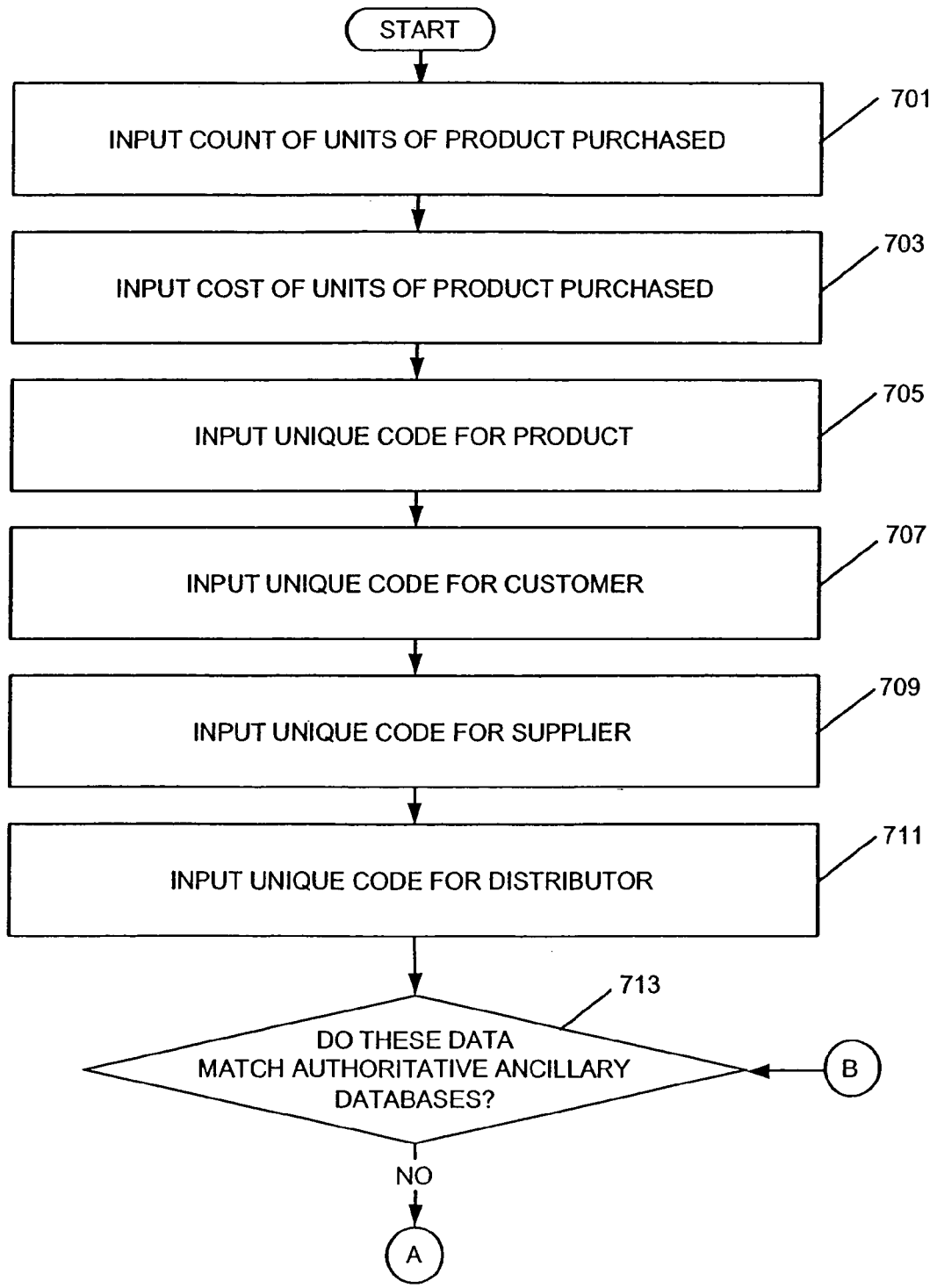
FIGURE 7.A
NORMALIZE DATA INTO STANDARD TRANSACTION FORMAT

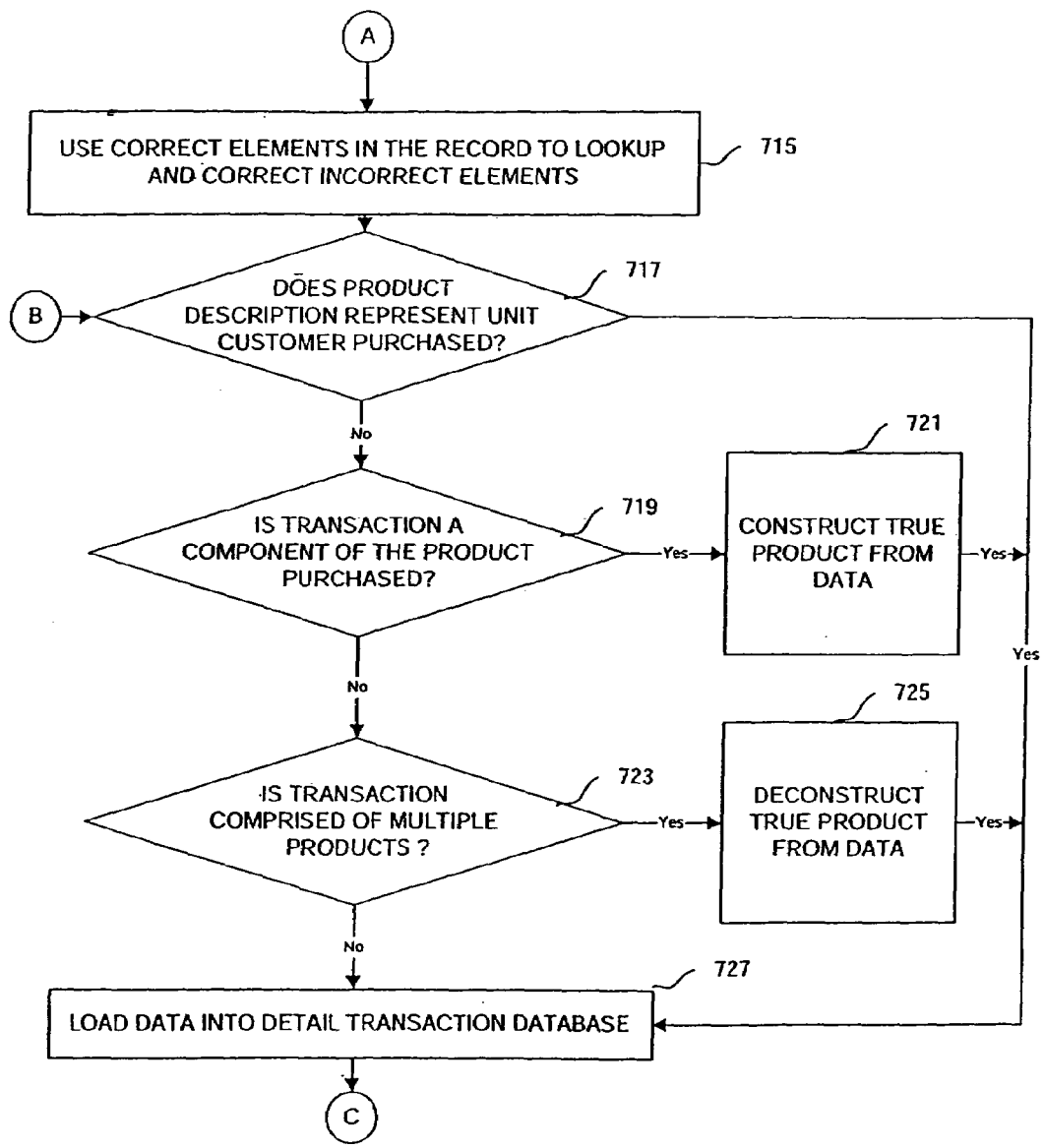

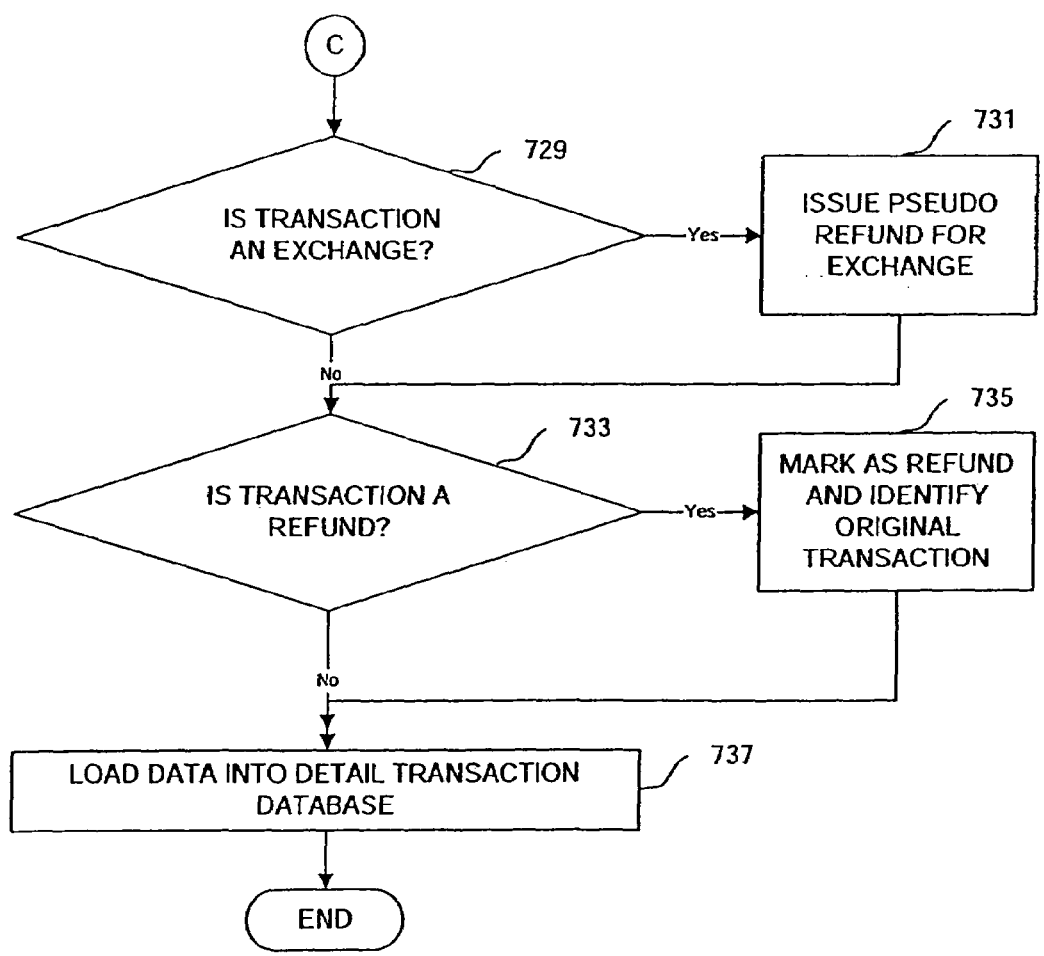
FIGURE 7.C:
NORMALIZE DATA INTO STANDARD TRANSACTION FORMAT

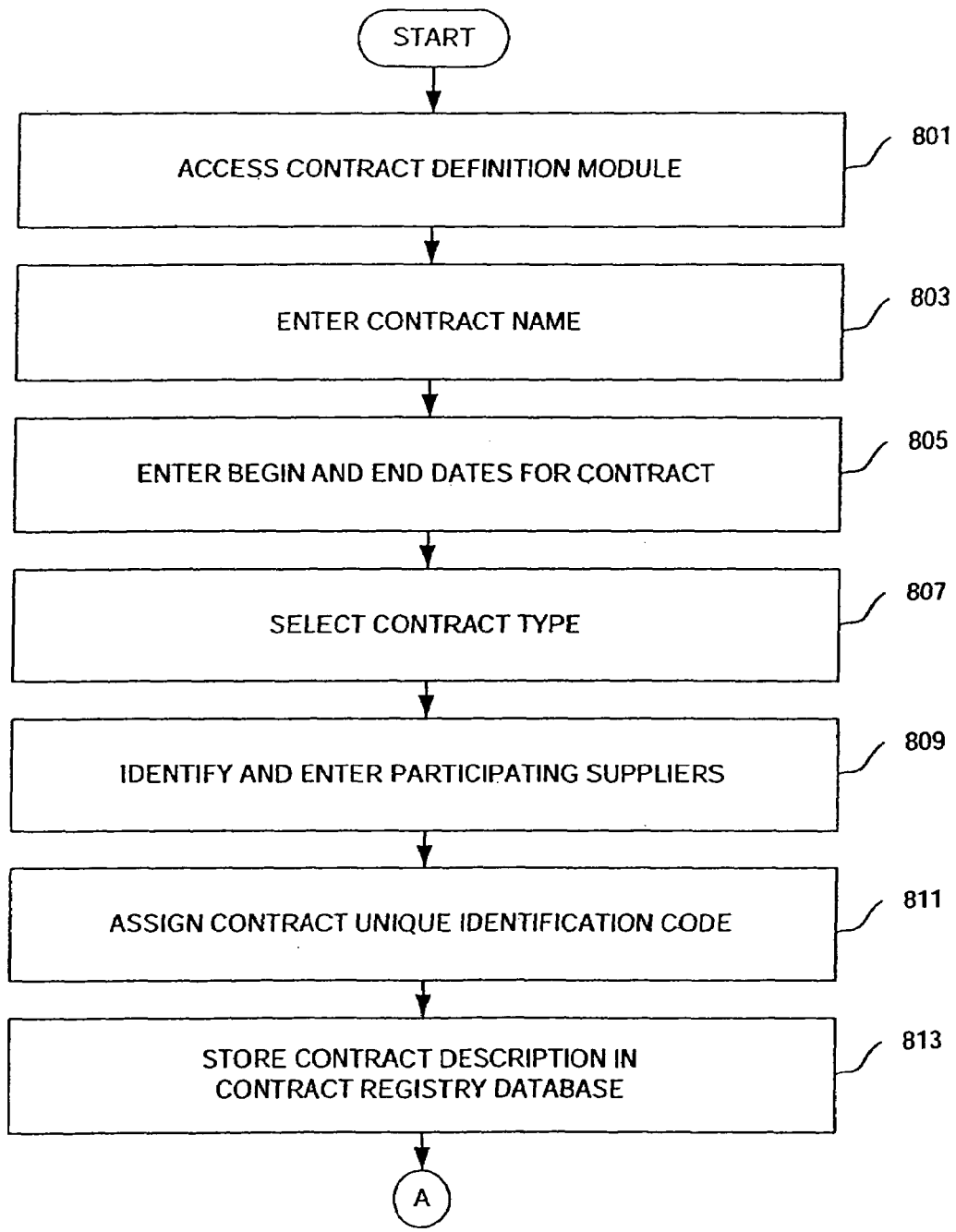
FIGURE 8.A
DEFINE CONTRACT AND PERFORMANCE TERMS

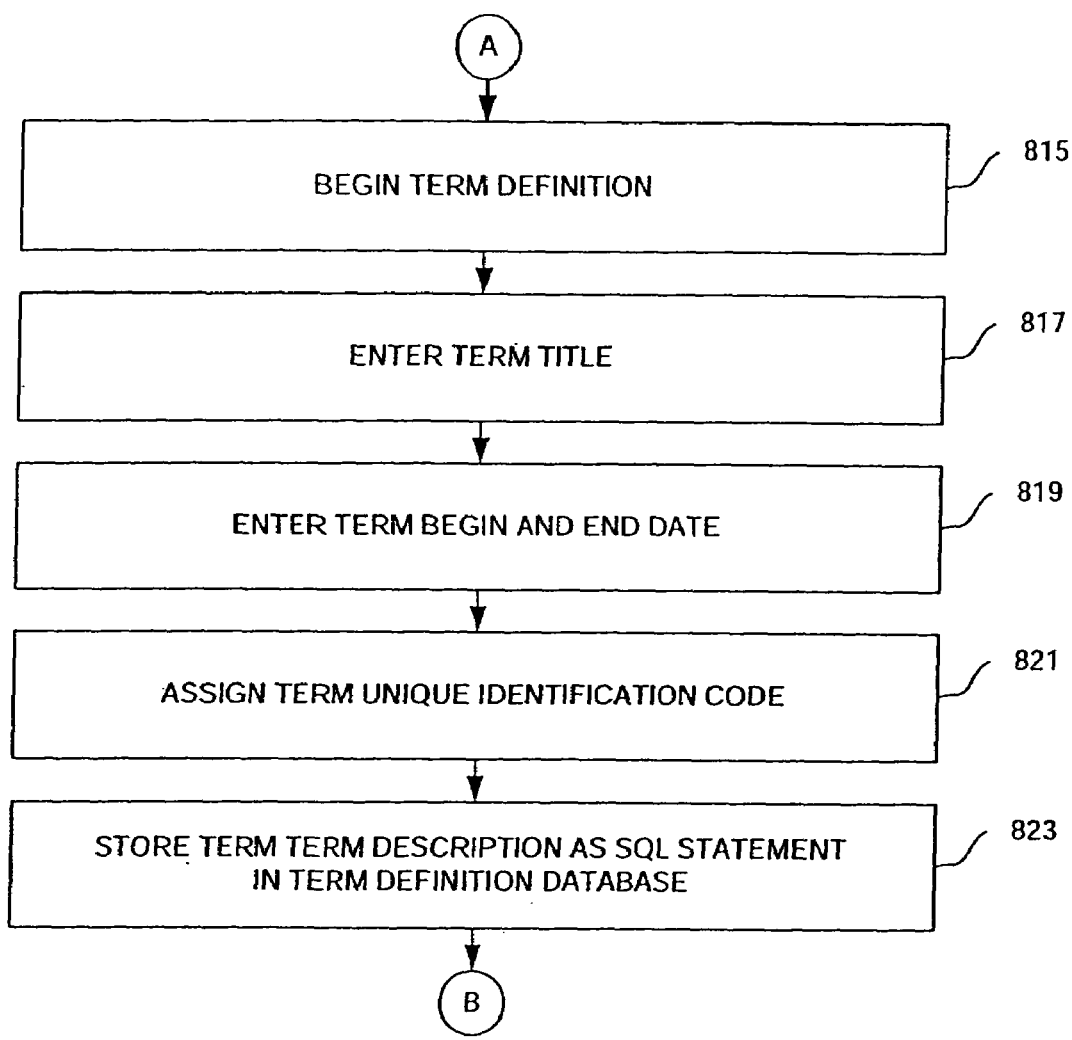
FIGURE 8.B
DEFINE CONTRACT AND PERFORMANCE TERMS

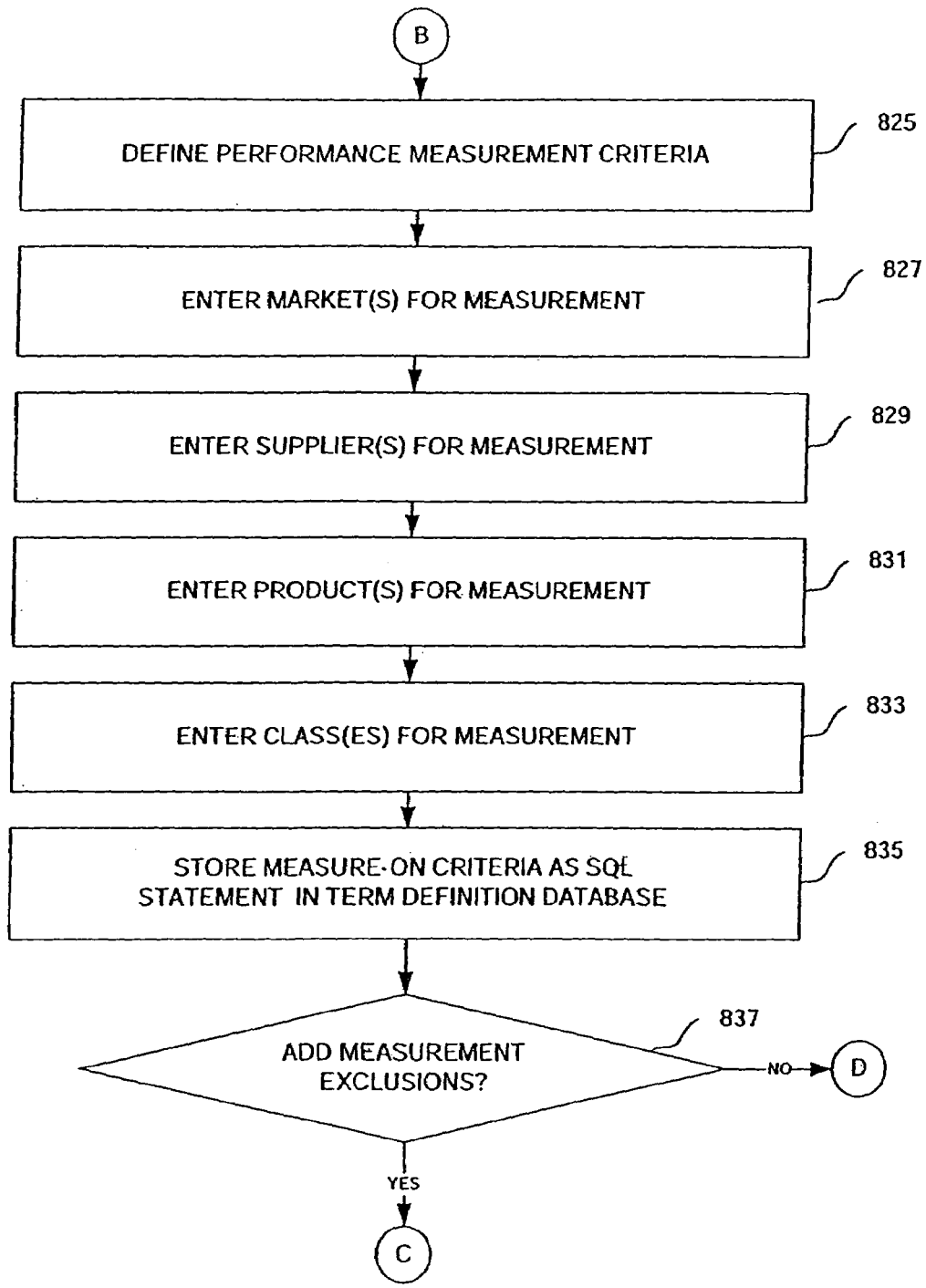
FIGURE 8.C
DEFINE CONTRACT AND PERFORMANCE TERMS

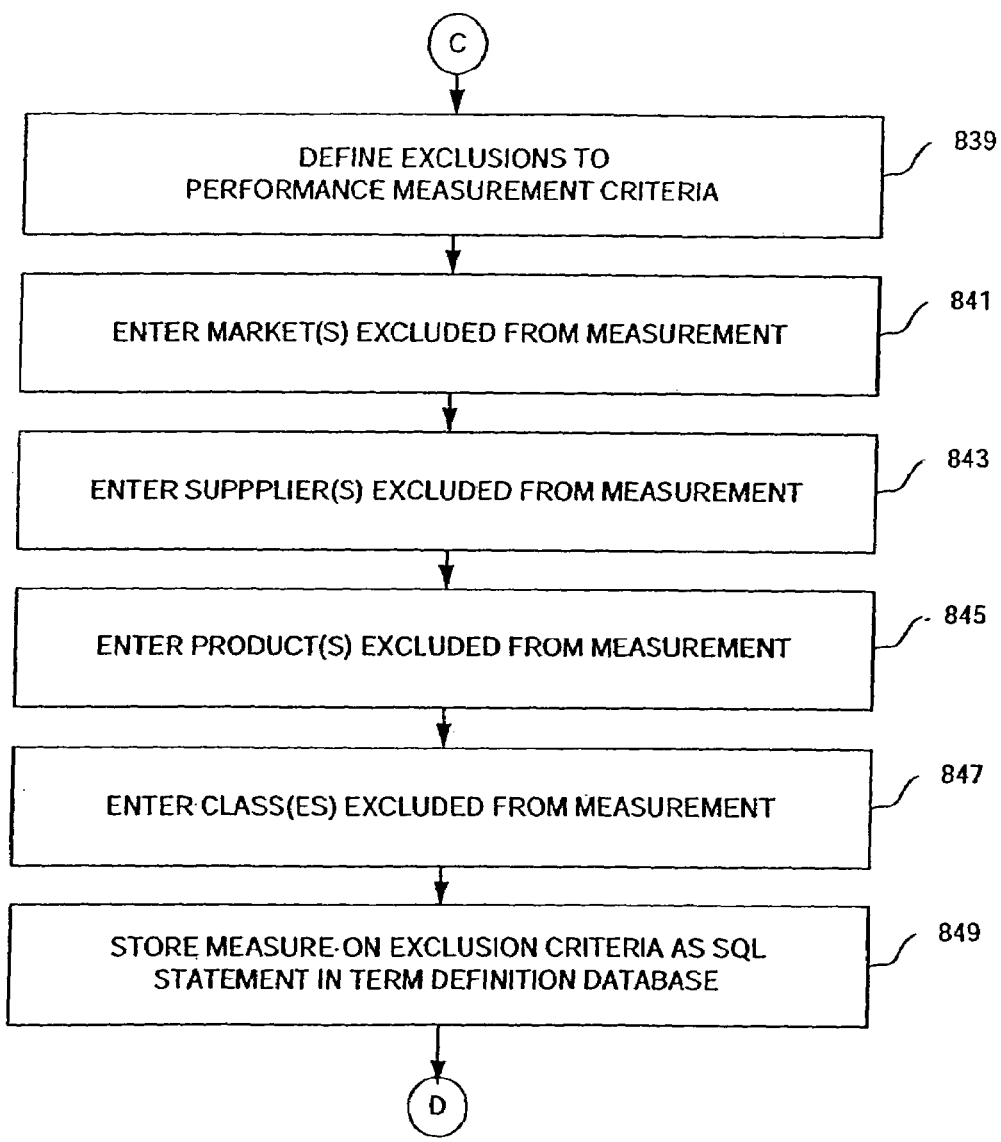
FIGURE 8.D
DEFINE CONTRACT AND PERFORMANCE TERMS

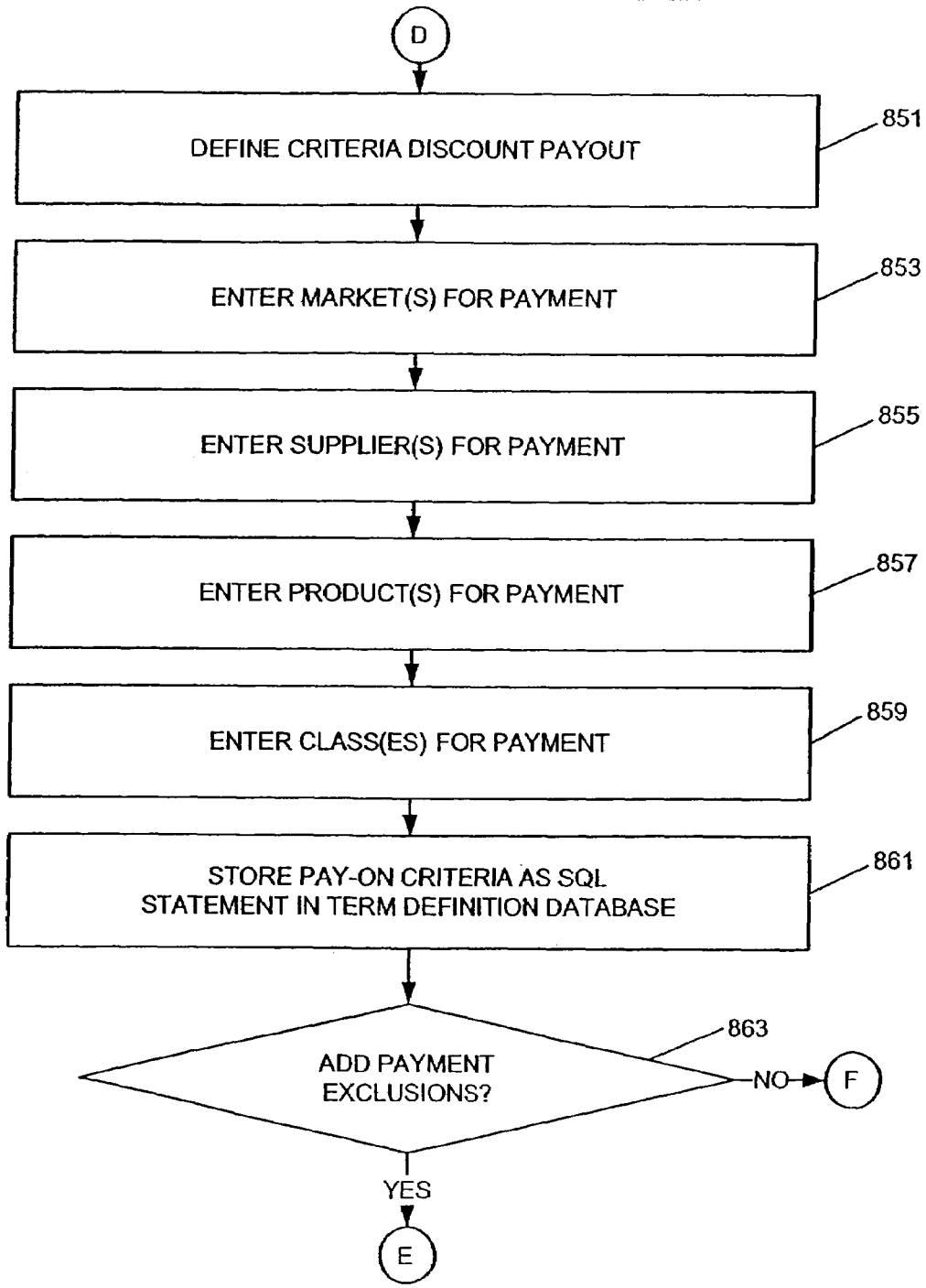
FIGURE 8.E
DEFINE CONTRACT AND PERFORMANCE TERMS

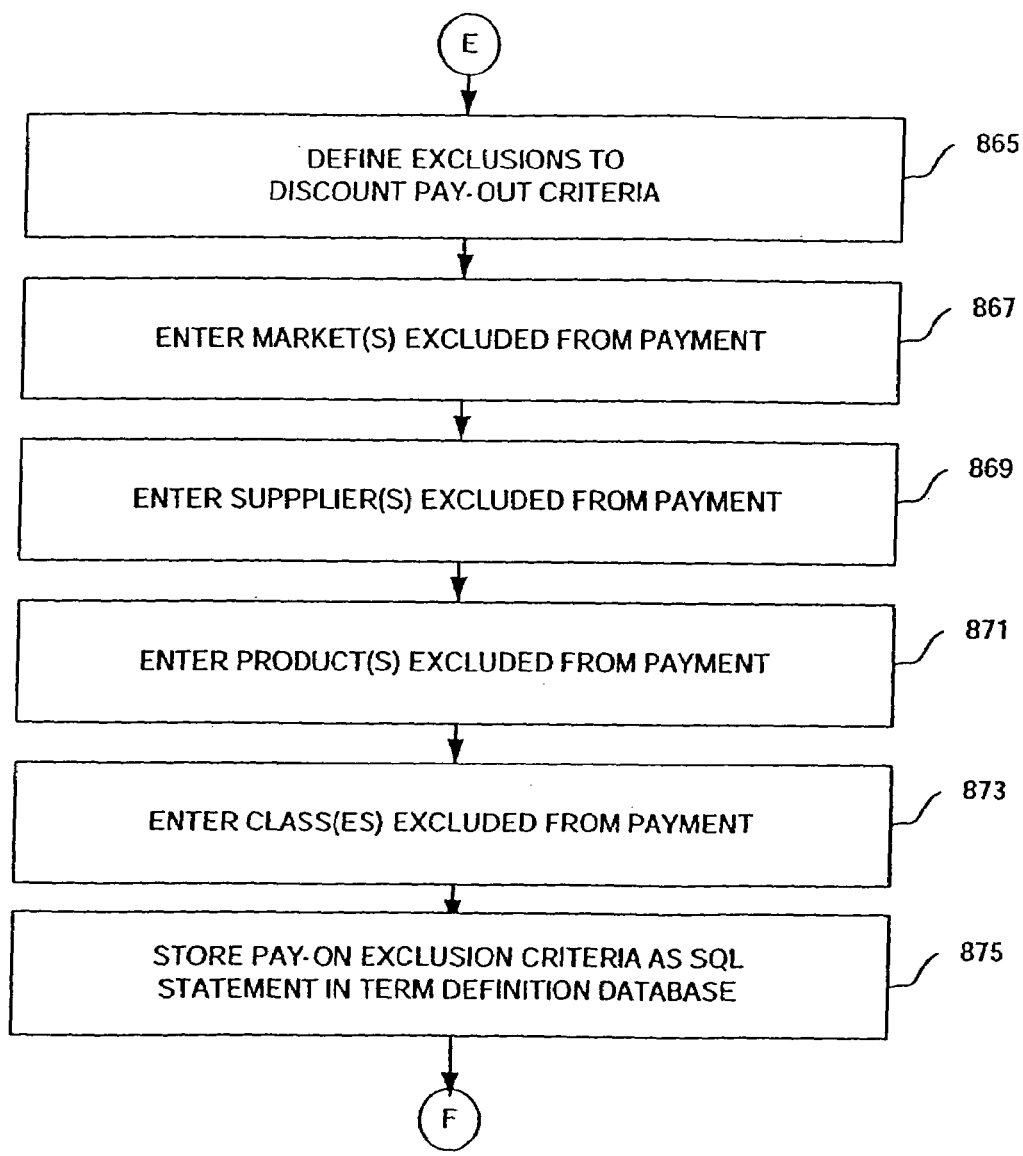
FIGURE 8.F
DEFINE CONTRACT AND PERFORMANCE TERMS

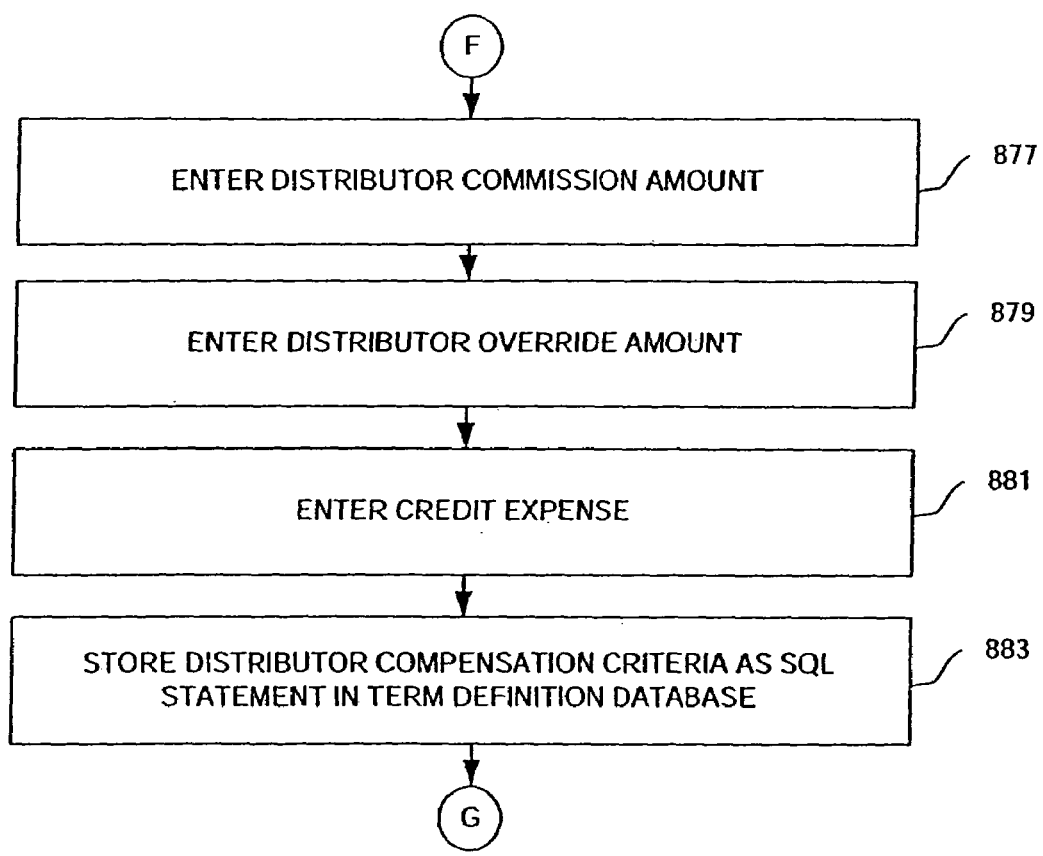
FIGURE 8.G
DEFINE CONTRACT AND PERFORMANCE TERMS

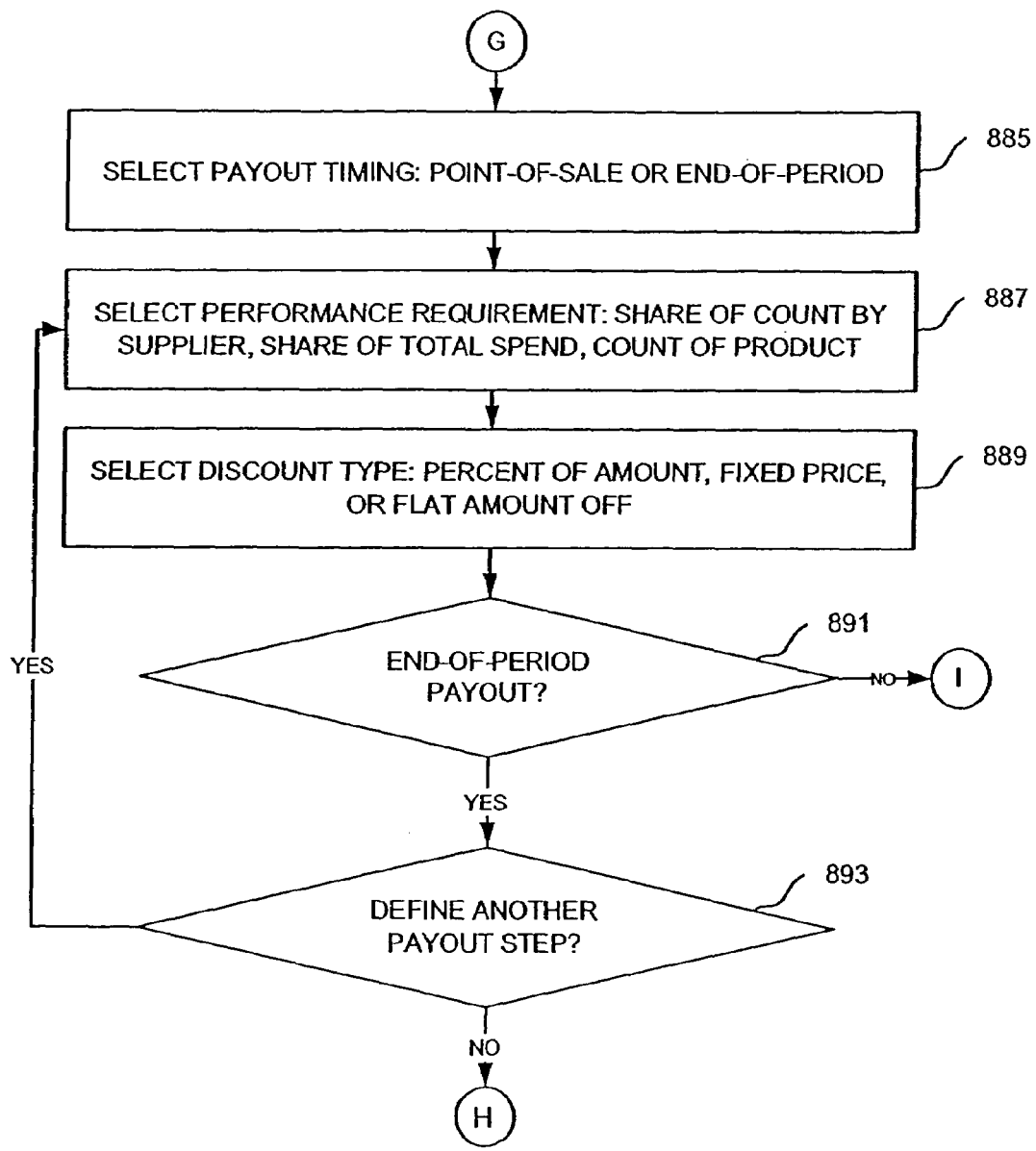
FIGURE 8.H
DEFINE CONTRACT AND PERFORMANCE TERMS

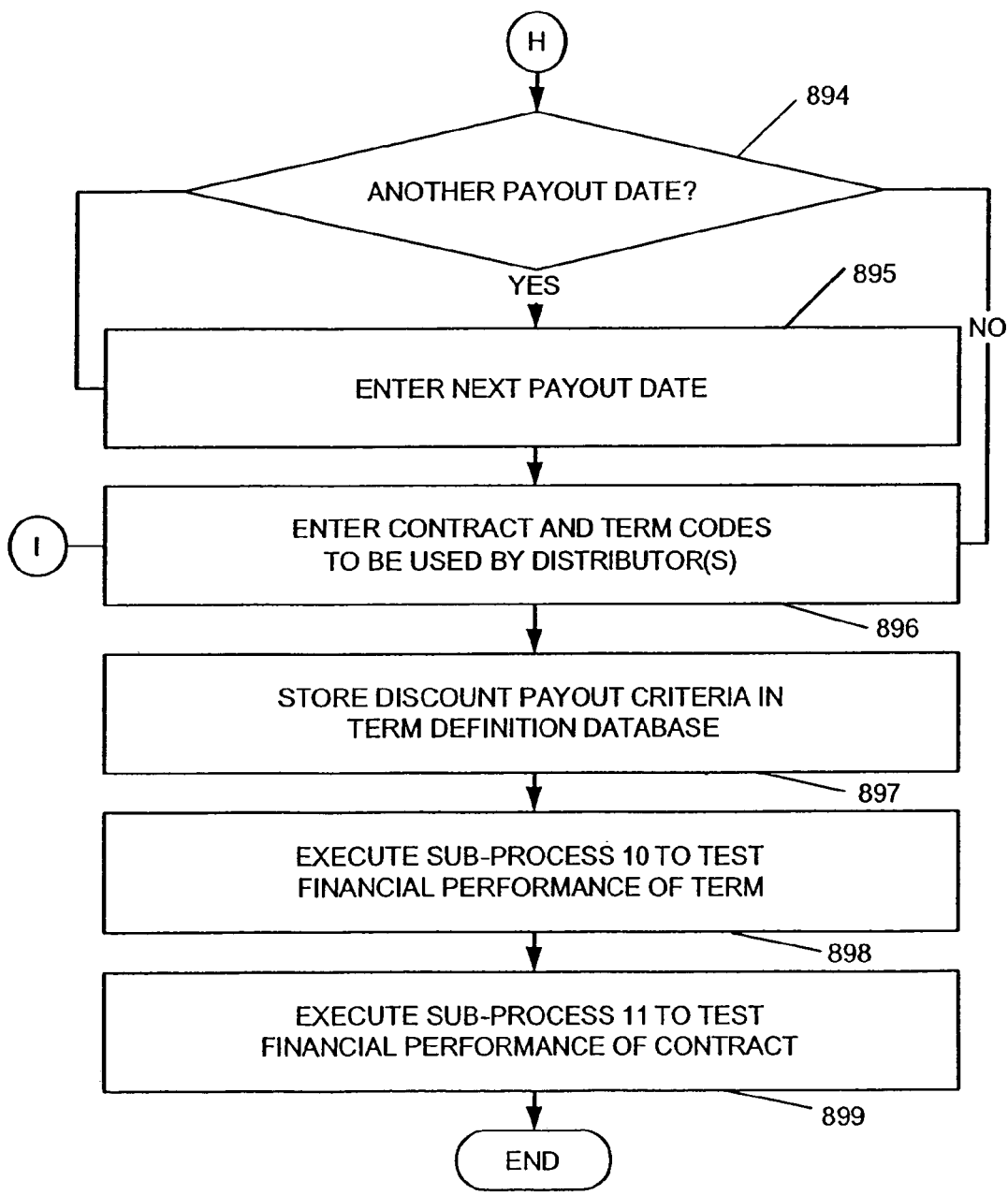
FIGURE 8.I
DEFINE CONTRACT AND PERFORMANCE TERMS

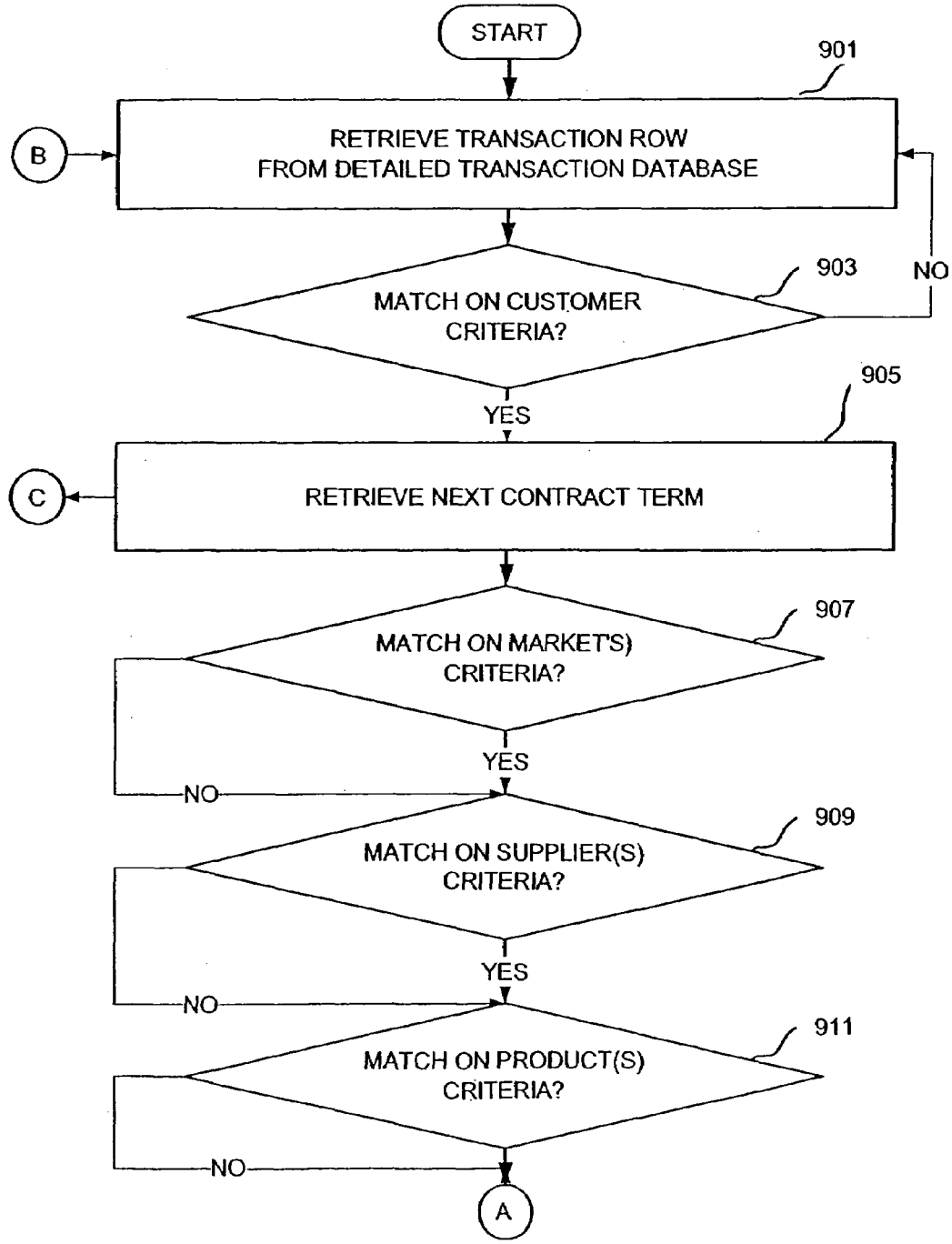

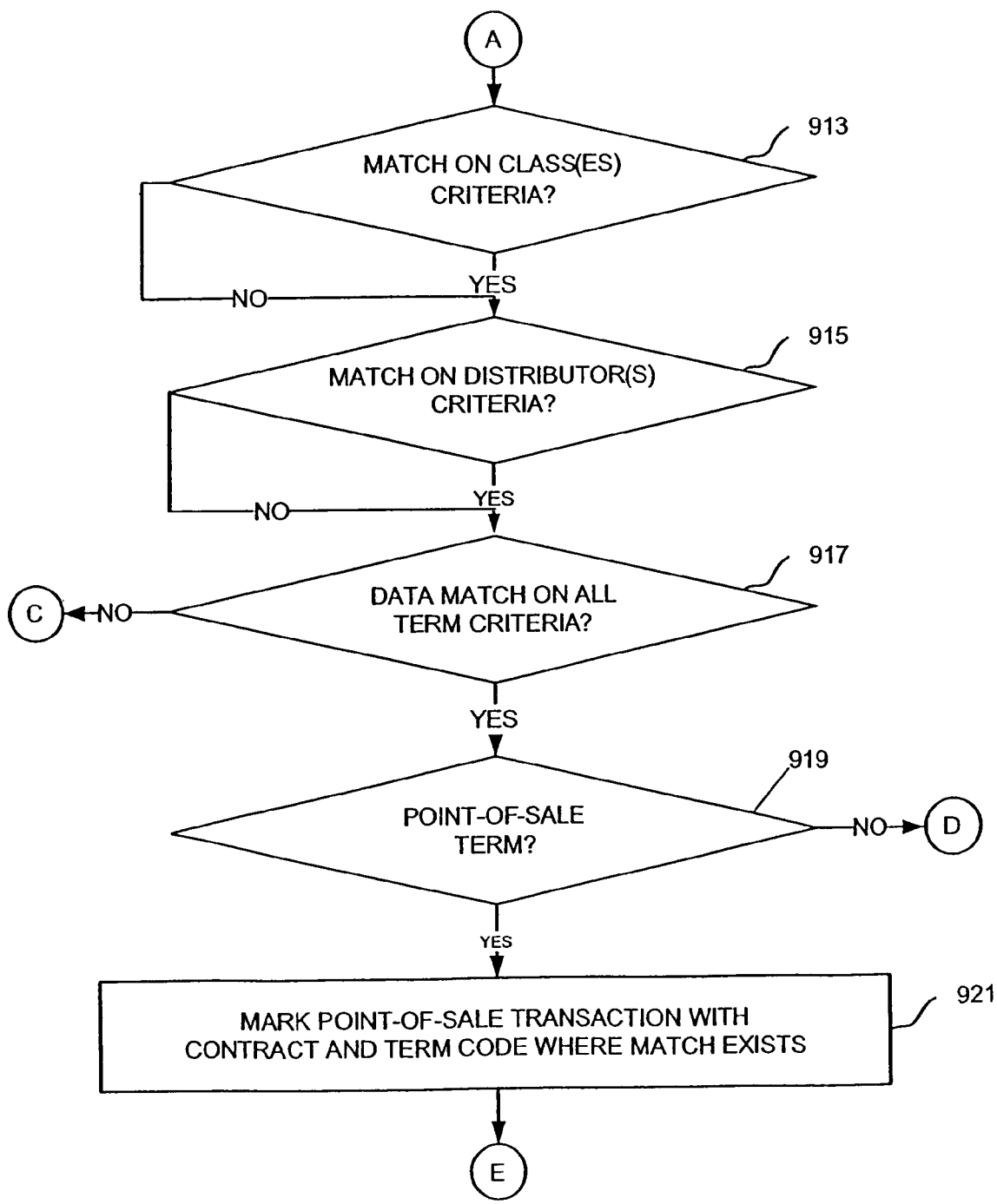

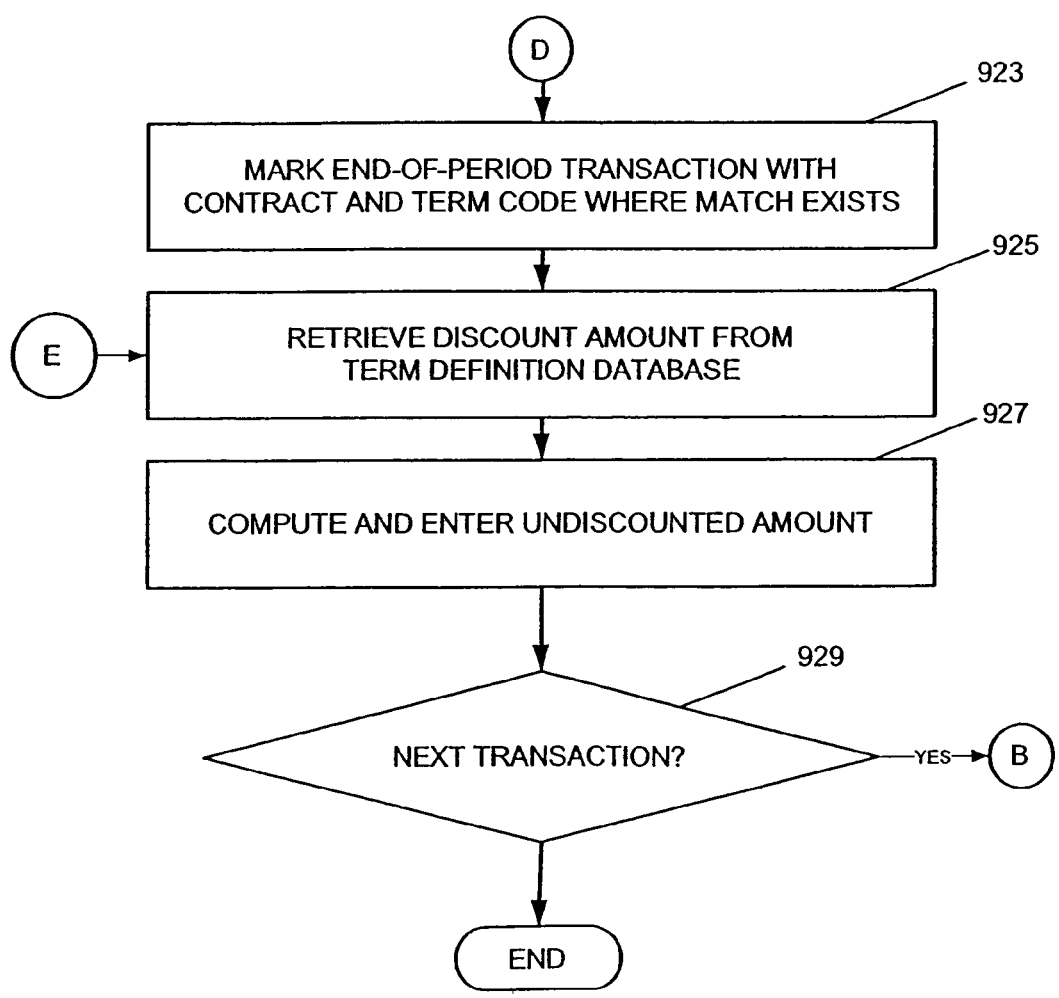

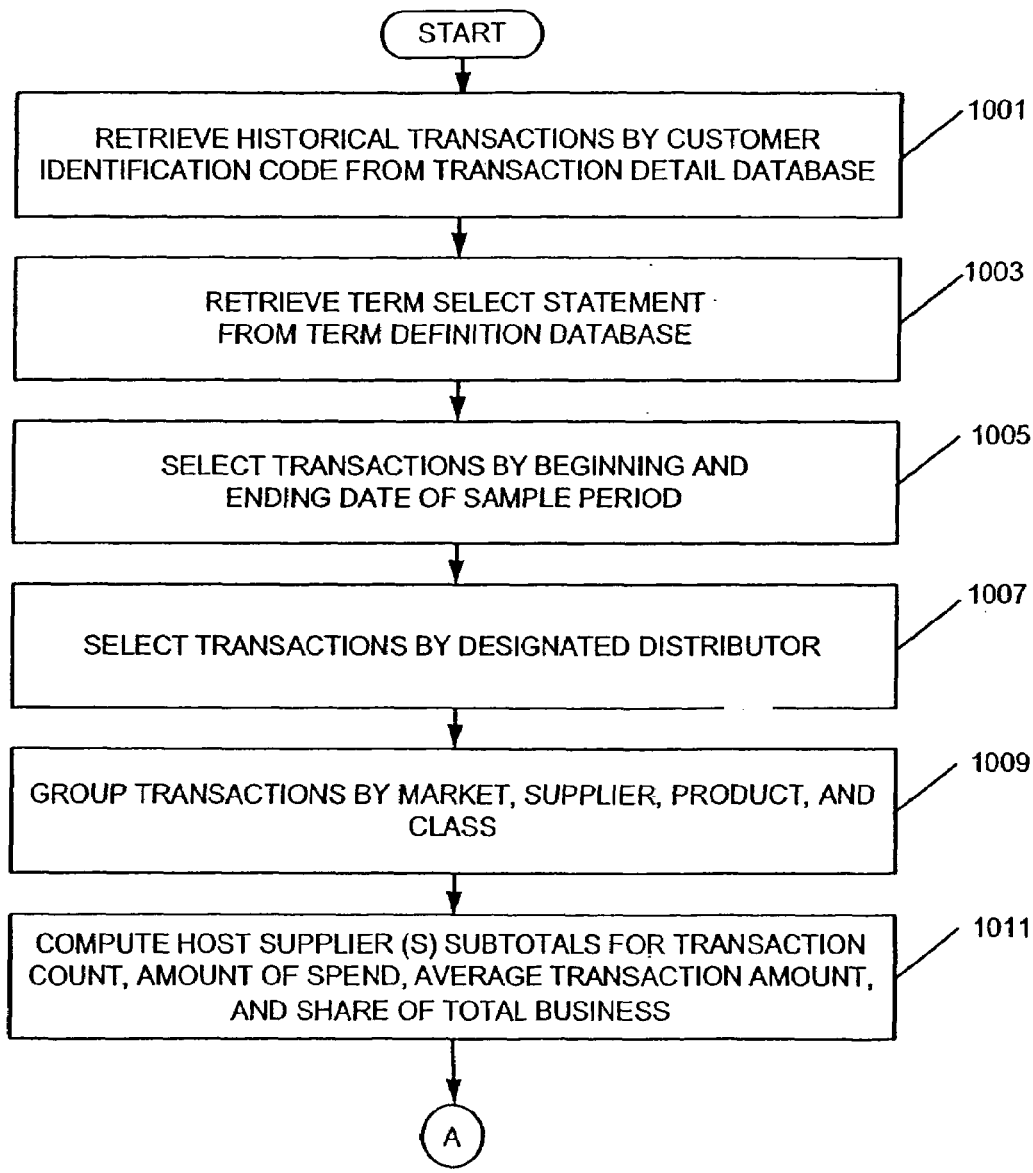

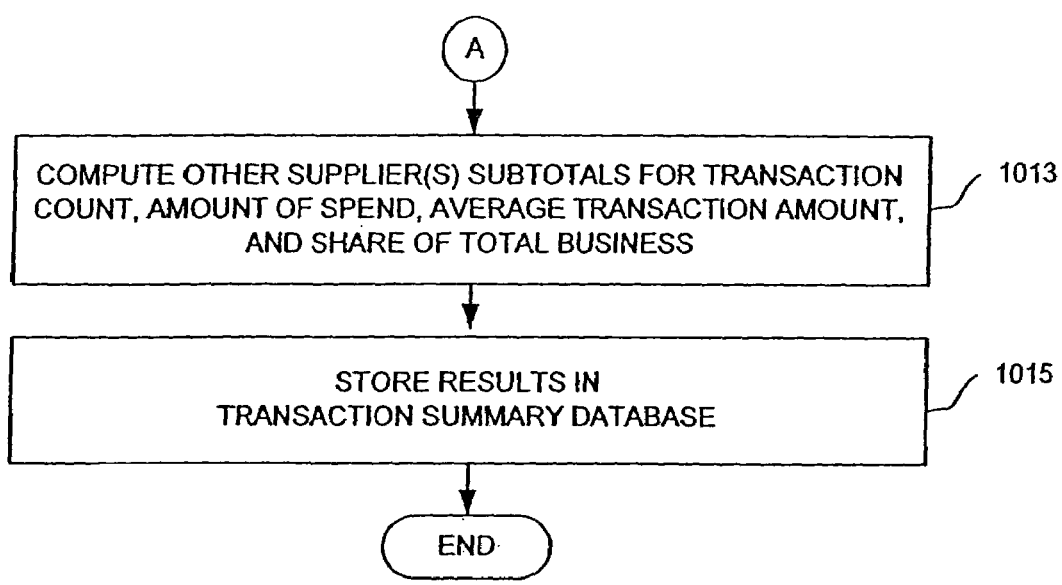
FIGURE 10.B:
CREATE TRANSACTION SUMMARY DATABASE

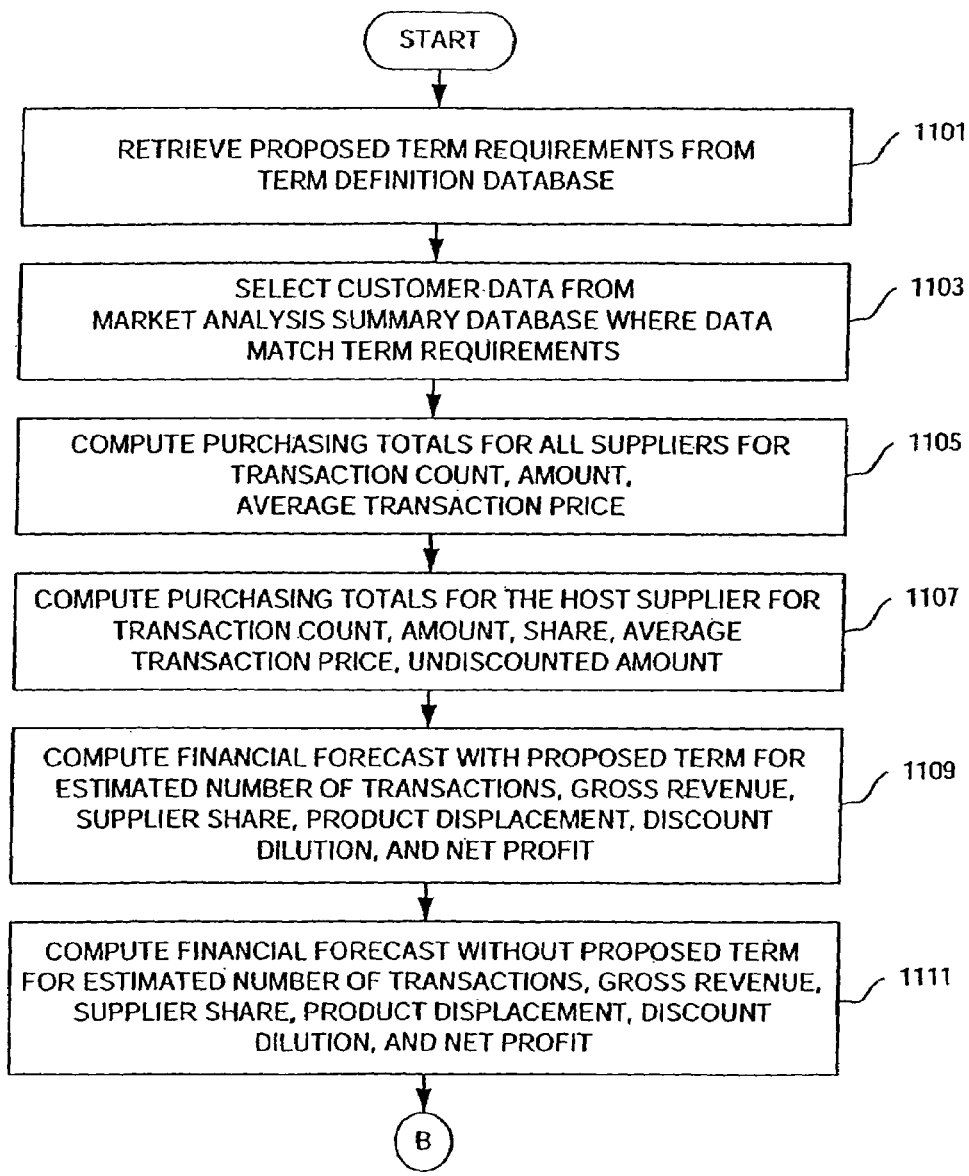
FIGURE 11.A
FORECAST TERM PERFORMANCE

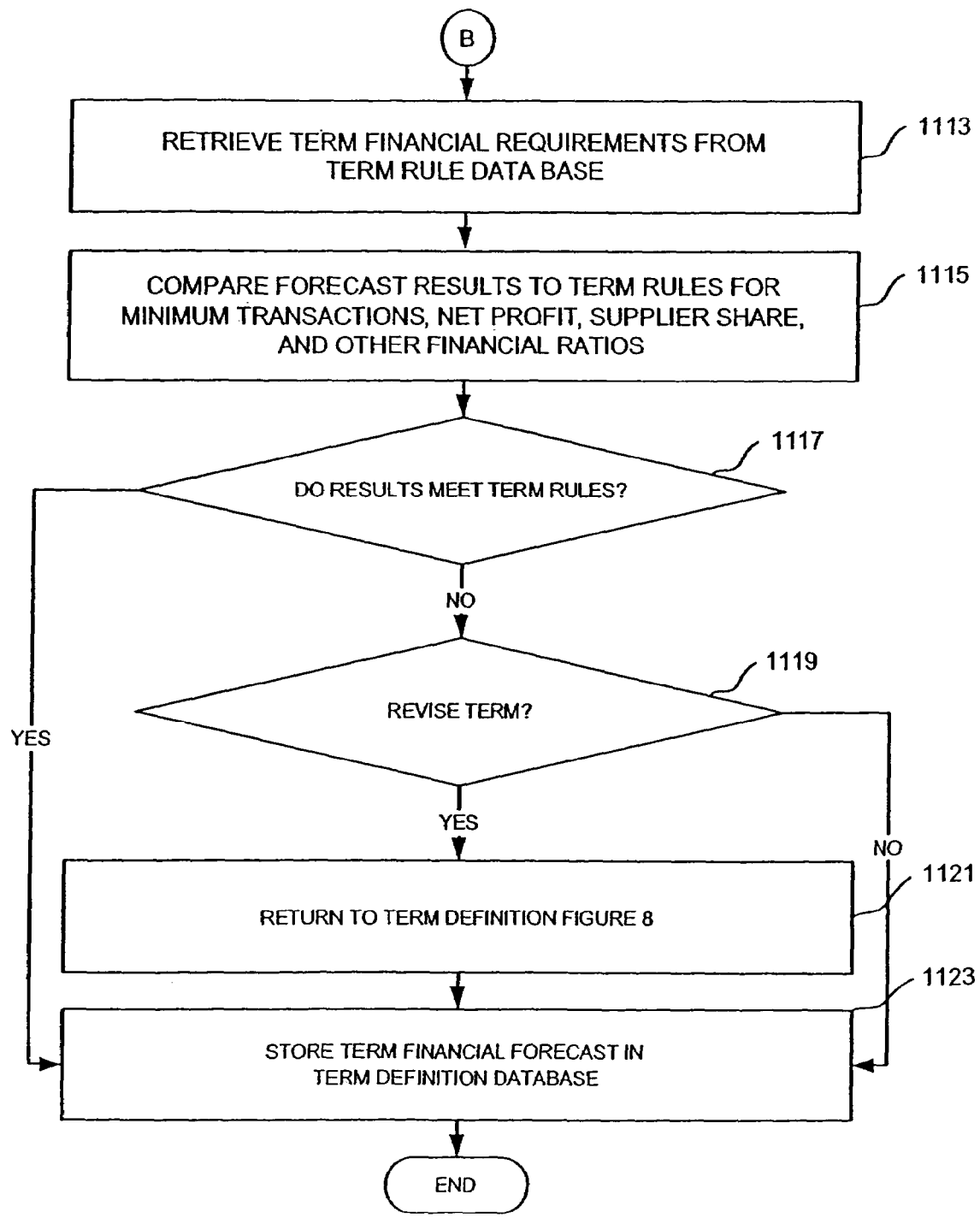

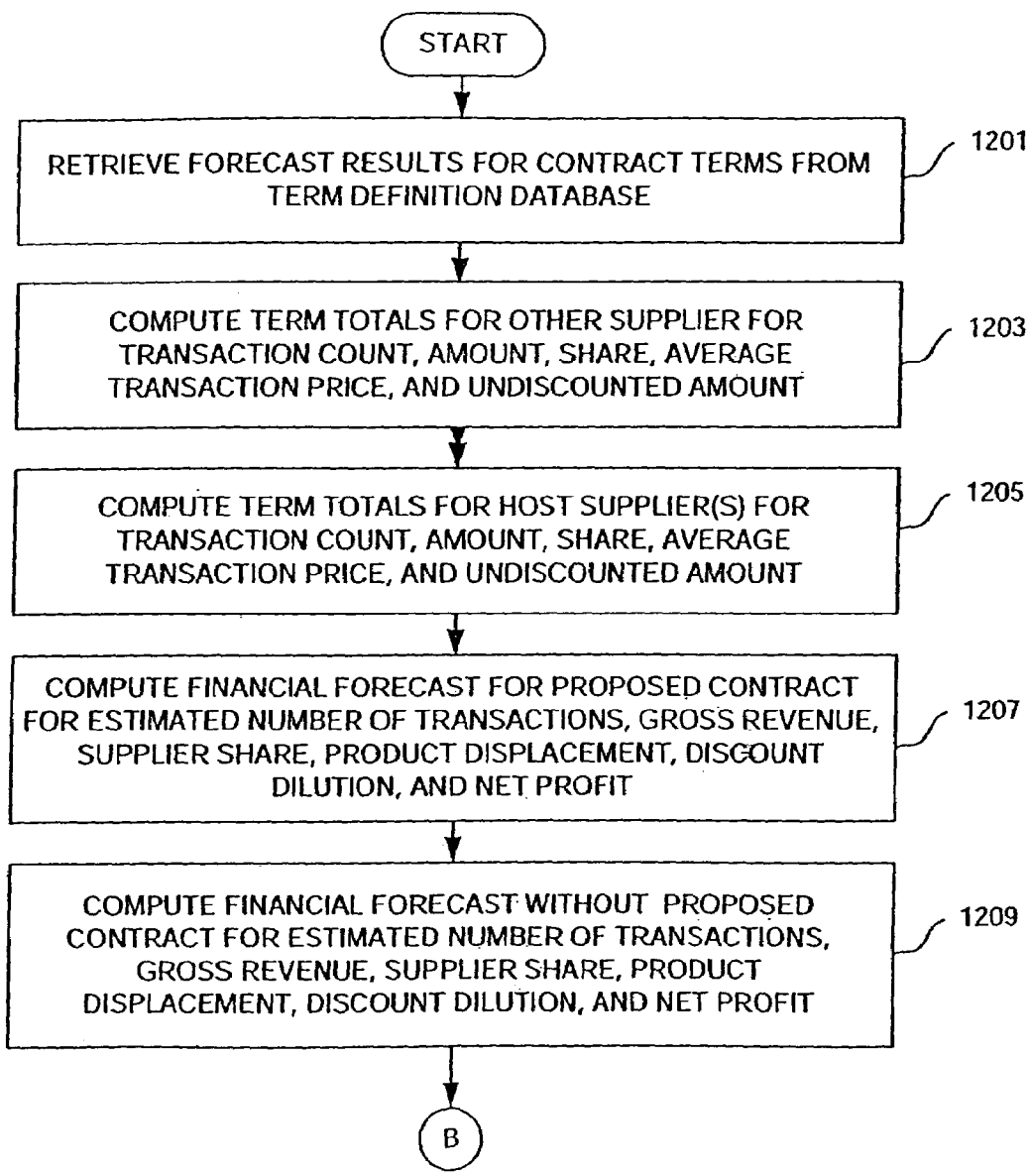
FIGURE 12.A
FORECAST CONTRACT PERFORMANCE

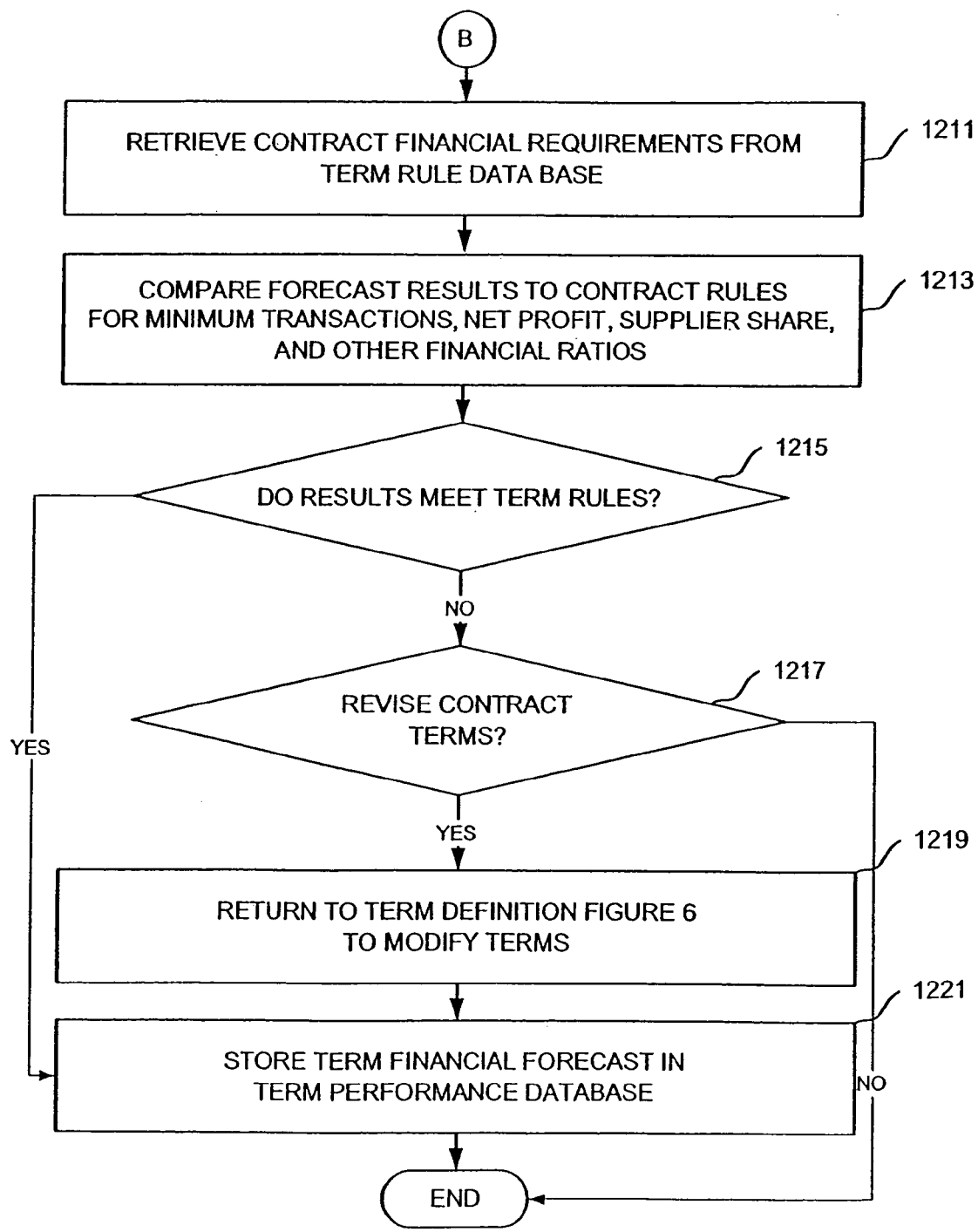

PRODUCE AND DISTRIBUTE CONTRACTS AND TERMS

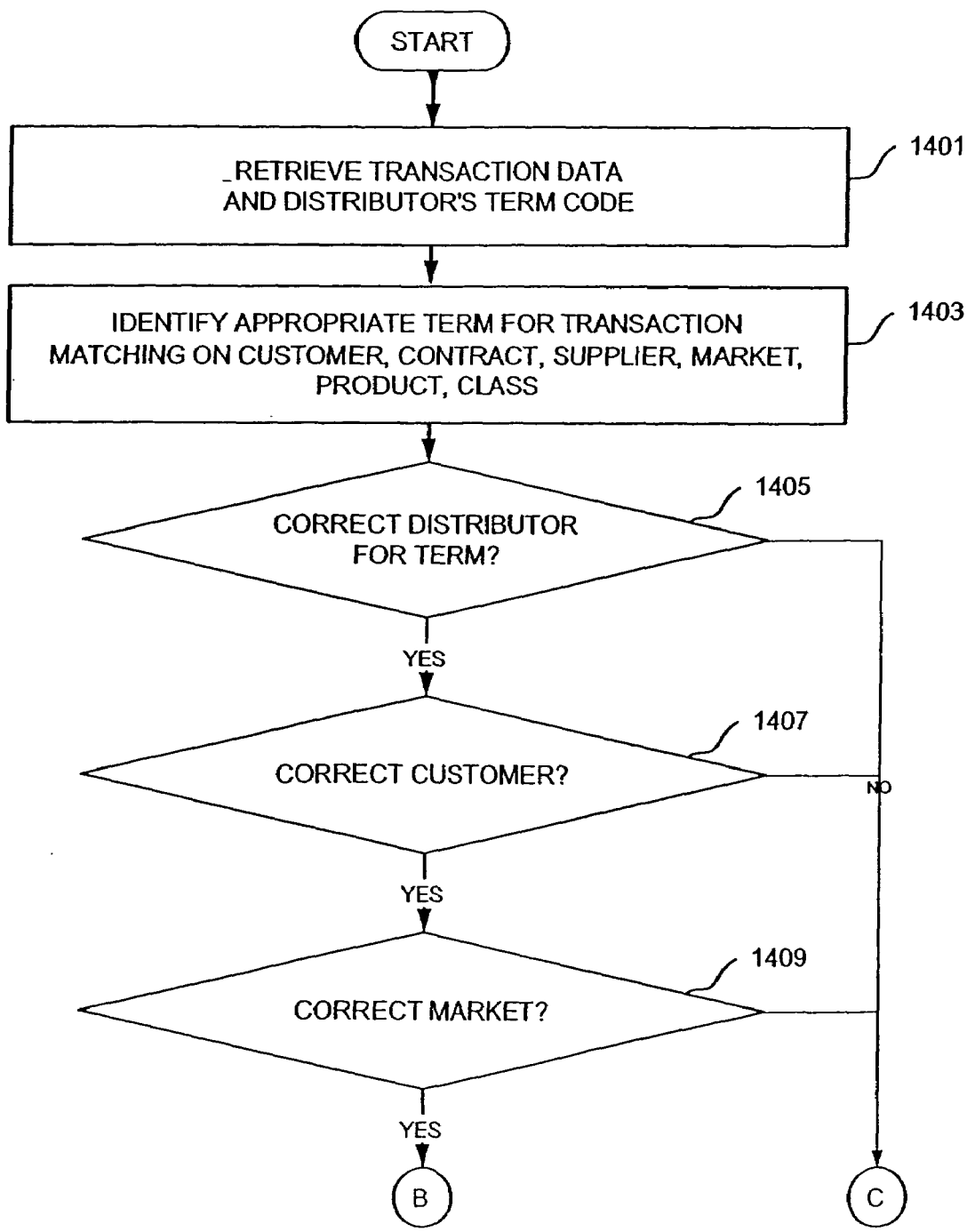

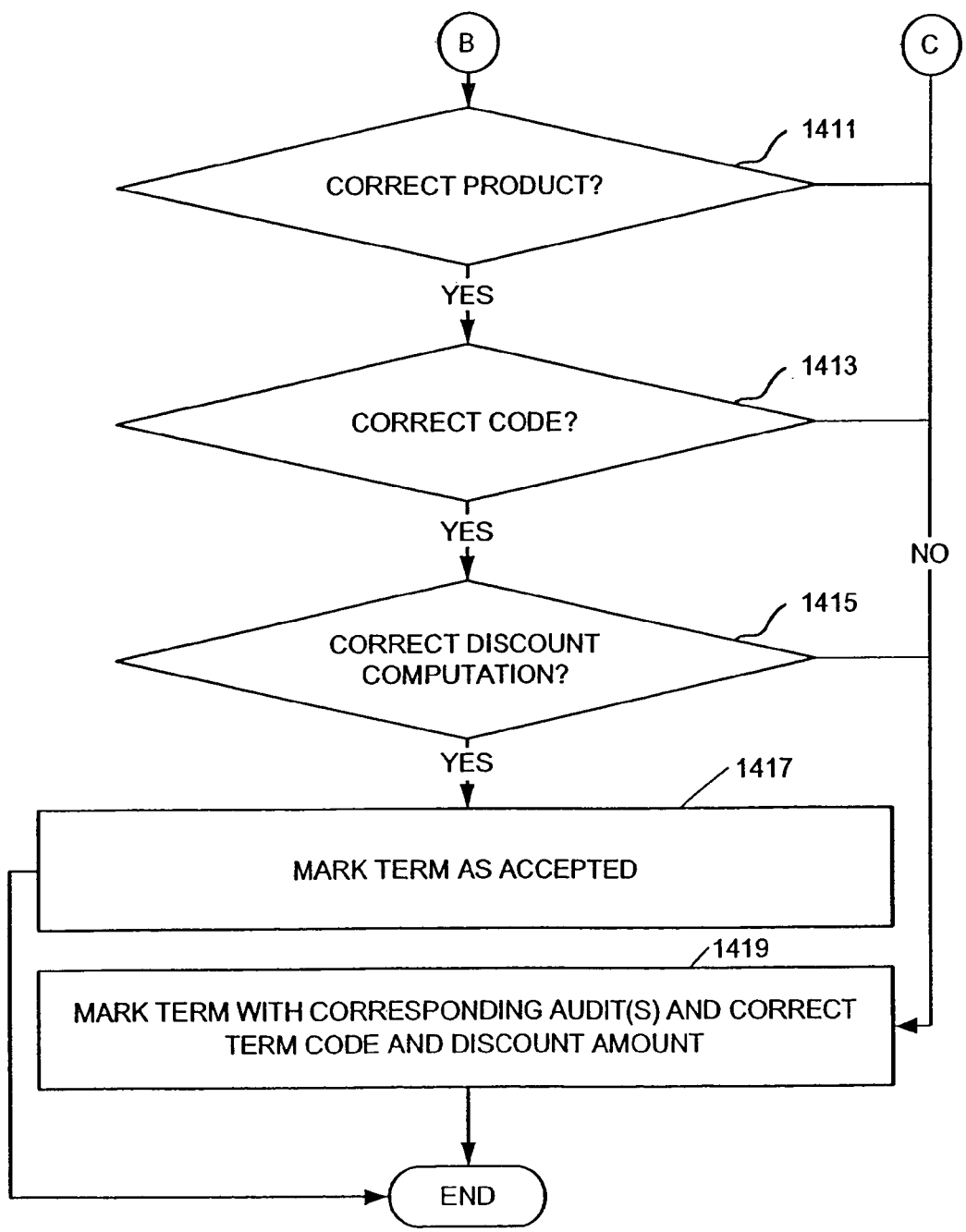
FIGURE 14.B
AUDIT DISCOUNTED TRANSACTIONS

MEASURE ACTUAL CONTRACT PERFORMANCE

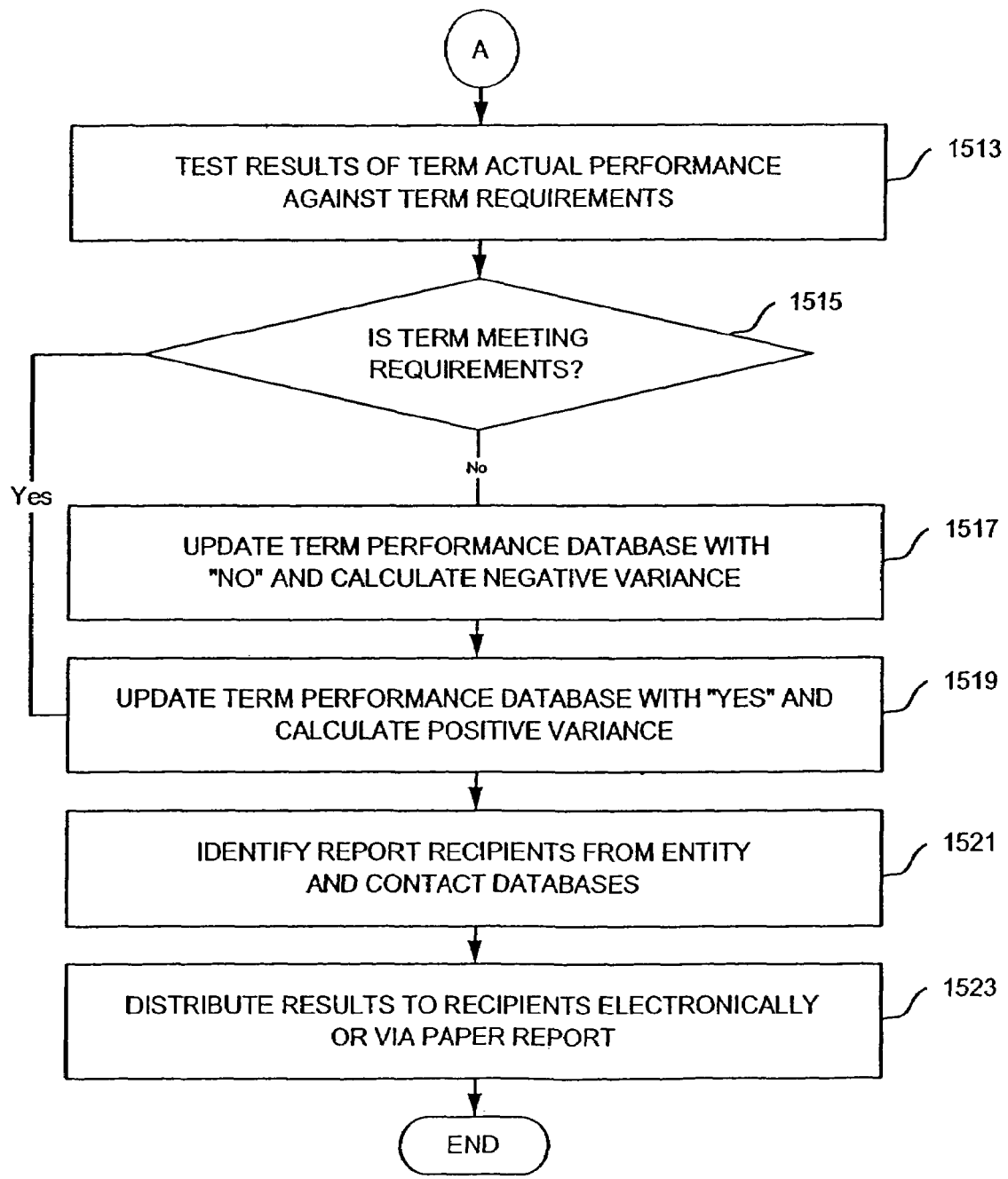

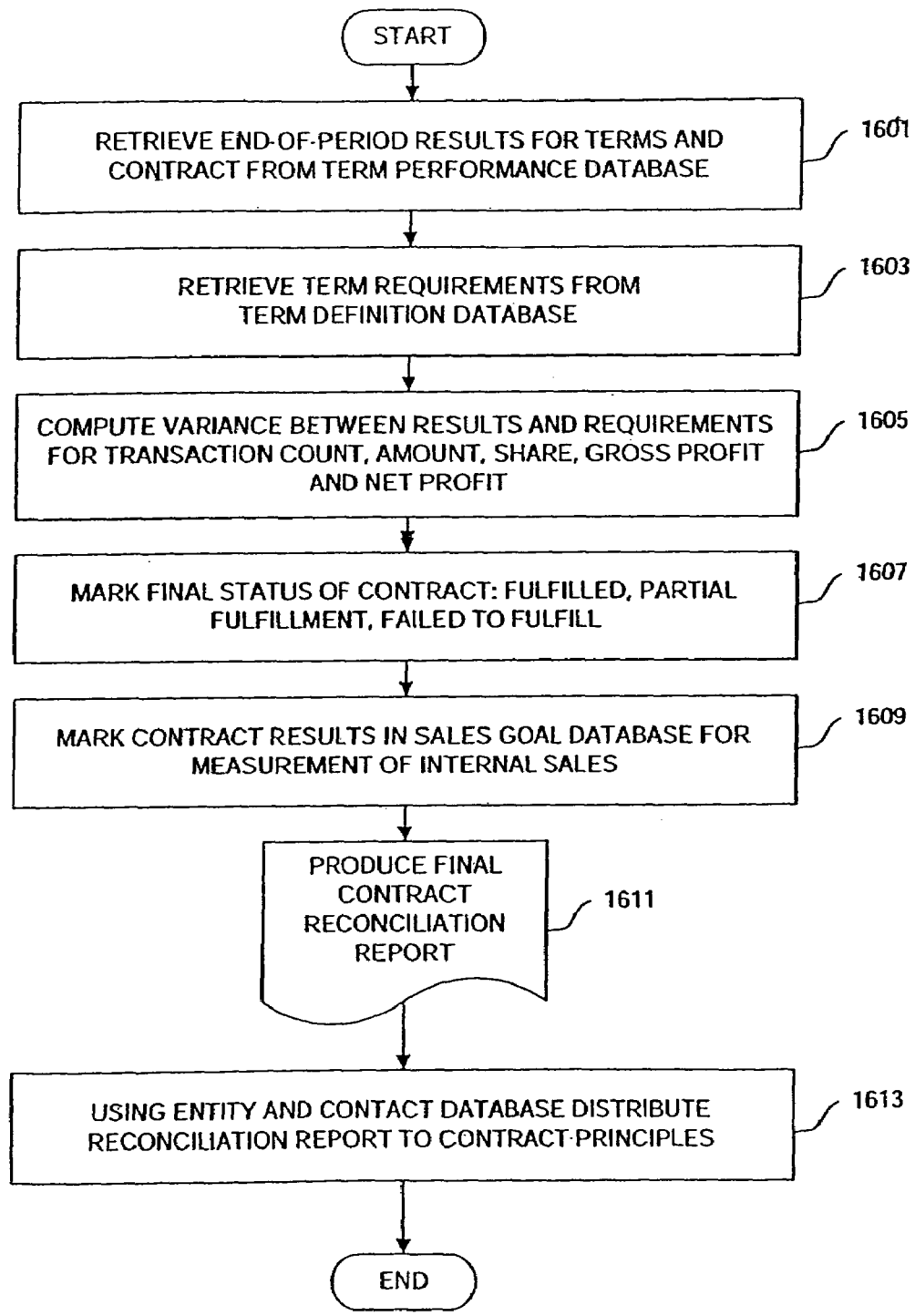

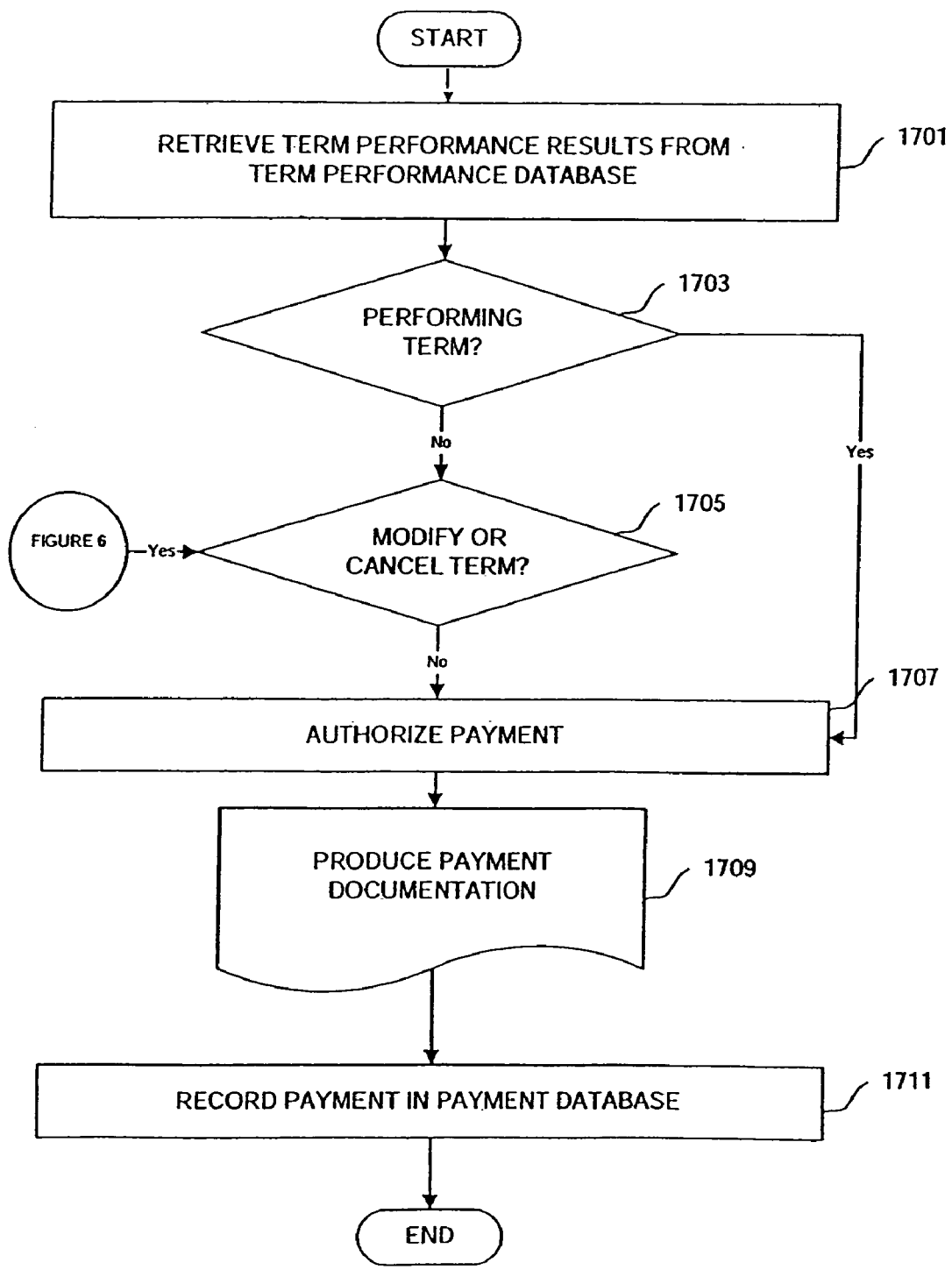

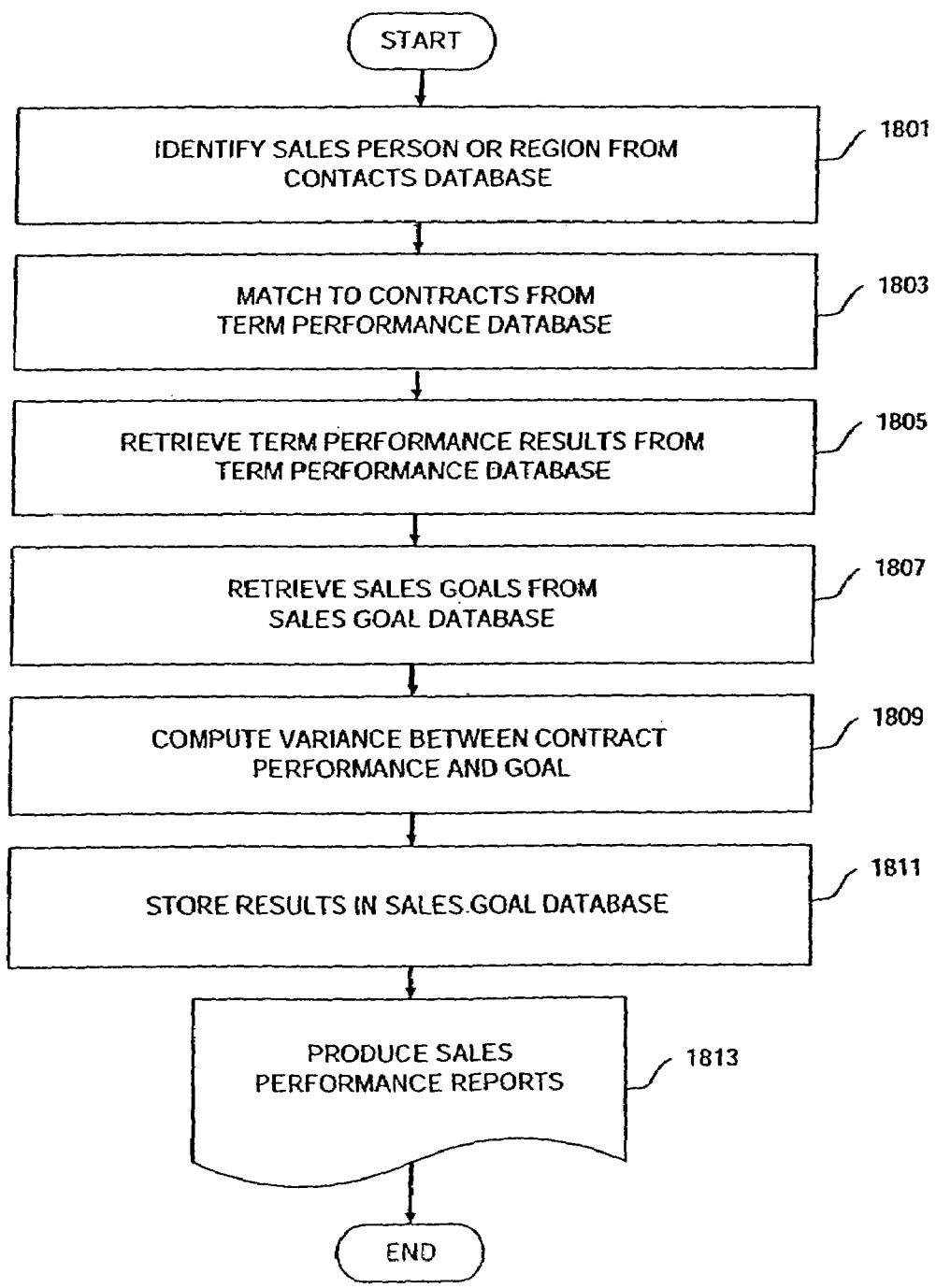

FIGURE 19
TRANSACTION DETAIL DATA SCREEN

| | 1903 | 1905 | 1907 | 1909 | 1911 | |
|---|---|---|---|---|---|---|

Ticket

| Ticket Number | 66044709xx | PNR Locator | BXY245 |
|---|---|---|---|
| Validating Carrier | British Airways | Credit Card | Visa |
| Issue Date | 01 Jan 2000 | Frequent Flyer # | BH12345678 |
| Passenger | Mr. John Doe | Tour Code | 14BV |
| Company | ABC Company | Commission | $112.00 |
| Data Source | Anywhere Travel, Inc. | Tax | $86.00 |
| Ticket Location | 212253xx | Amount | $1,200.00 |

1901

Origin & Destination

| Origin | Albuquerque | Cabin, Fare Type | Business |
|---|---|---|---|
| Connection | Houston | Fare Basis | J |
| Destination | Atlanta | Ticket Designator | 66044709xx |
| Carrier | Continental Airlines | Contract | ABC2000  Term  US to US |
| Operating Carrier | Continental Airlines | Net Amount | $557.00 |
| Depart Date | 16 Jan 2000 | Amount | $600.00 |
| Depart Time | 7:40 am | Full Fare | $800.00 |
| Arrive Date | 16 Jan 2000 | Low Fare | $0.00 |
| Arrive Time | 2:15 pm | Discount | $200.00 |
| Trip duration | 4:30 | Revenue Per Mile | .47 |

FIGURE 20
MARKET ANALYSIS SUMMARY SCREEN

DISCOUNT-ON REQUIREMENTS SCREEN

MEASURE-ON REQUIREMENTS SCREEN

FINANCIAL REQUIREMENTS SCREEN

CONTRACT FORECAST SCREEN

FIGURE 23:
ACTUAL CONTRACT PERFORMANCE SCREEN

| Contract Term | Host Flights | Market Share | Host Net Amount | Market Share | Measure | Requirement | Variance | Fulfilled |
|---|---|---|---|---|---|---|---|---|
| ABC Company | | | | | | | | |
| US48-US48 | 27,010 | 63% | $5,402,020 | 67% | Share of Flights | 74% | -11% | No |
| IAH-DomesticMarkets | 7,588 | 86% | 1,753,037 | 88% | Share of Flights | 87% | -8% | No |
| IAH-LGW/CDG/MAN Term | 1,854 | 83% | 3,461,248 | 82% | Share of Flights | 88% | 5% | Yes |
| US48-Canada/LatinAm/Mexico | 481 | 44% | 392,340 | 53% | No Requirement | 0 | 0% | Yes |
| US48-Europe | 250 | 38% | 444,832 | 34% | No Requirement | 0 | 0% | Yes |
| IAH-MTY/MEX | 103 | 100% | 38,442 | 100% | Share of Flights | 99% | 1% | Yes |
| IAH-BRU/FRA/CHR Term | 35 | 53% | 55,382 | 51% | Share of Flights | 60% | -7% | No |
| US48-AMS Term | 23 | 17% | 37,200 | 18% | Share of Flights | 20% | -3% | No |
| Total | 37,443 | 67% | $11,876,118 | 71% | | | | |
| Minimum | 42,775 | | $12,170,070 | | | | | |
| Contract Performance | -5,332 | -14% | -$302,954 | -4% | | | | No |

SYSTEM AND METHOD FOR MANAGING PURCHASING CONTRACTS

The present application claims the benefit of the filing date of U.S. Provisional Application Ser. No. 60/194,538, filed Apr. 4, 2000, (which is hereby incorporated by reference for all purposes).

BACKGROUND OF THE INVENTION

The present invention relates generally to a system and method for managing information or data and, alternatively, such a system and method for generating, monitoring, managing and/or otherwise maintaining certain aspects of a contract relationship. The present invention is particularly adapted to a system and method for generating, managing and/or monitoring a purchasing contract relationship such as a bulk purchasing contract between a common carrier entity such an airline operator and a customer entity. Further, the inventive system and method are particularly adapted for implementation via or on an electronic environment such as any client-server system including those incorporating terminals, personal computers, digital personal assistants and the like, the Internet, or an Intranet.

Businesses reward customer volume buying with discounts or deals. Contracted deals comprise one or more purchasing requirements, or terms, for volume buying. Contract terms may include commitments for the purchase of a specified number of units, or the expenditure of a monetary amount, or that a designated share of a company's purchasing be dedicated to a specified supplier. Each party seeks financial gain from the deal. The supplier seeks to increase volume and to generate higher unit sales and profits. The customer seeks to lower costs through discounts.

In a global business setting, suppliers often form alliances to provide services to customers worldwide. Alliance deals involve contract terms from two or more suppliers. Both suppliers and customers benefit from alliance deals. A supplier can extend its services into markets which it would not ordinarily serve but which may be served by an alliance partner. Customers, on the other hand, are able to consolidate their global purchasing volume to benefit from worldwide discounts with a reduced number of suppliers.

Many of such contractual relationships necessarily require management of certain aspects of contracts in an electronic or computerized environment. Although the utilization of electronic or computer networks facilitate the various contract management processes, it can present certain challenges as well. For example, more than one distributor will probably be authorized to sell products to a customer. Accordingly, a supplier will collect contract-related information from more than one source and will often receive the information in raw or non-standardized form. In addition, suppliers and distributors are often located in different parts of the world and may use different systems which produce incompatible electronic transactions.

SUMMARY OF THE INVENTION

It is, therefore, one of several objects of the present invention to provide a system and method for maintaining a contract including the tasks of generating, managing, and monitoring certain aspects of the contract (sometimes collectively referred to herein as "contract management"). More particularly, it is an object of the invention to provide such a system or method for managing a contract between one or more supplier entities and one or more customer entities. In this regard, a preferred system or method is one that is particularly adapted to a computerized or electronic environment and which allows for the collection, manipulation or management of information in a manner that facilitates the various contract management tasks. Various aspects of the system or method may be employed by the supplier entity (including a distributor), a customer entity or a third-party agent or facilitator.

In one aspect of the invention, there is provided a system and method of managing purchasing contracts between supplier entities and customer entities for the purchase of products. The method includes the step of generating at least one purchasing contract between at least one supplier entity (e.g., a product originator such as an airline company or a distributor such as a travel agency) and at least one customer entity. The purchasing contract generated would be one that governs, or is applicable to, one or more contracted purchasing transactions effected, at least partially, through a computerized system (e.g., the purchase of a ticket from an origination city to a destination city). The generating step includes identifying one or more contract terms, wherein each contract term has one or more term attributes, and storing a term data set of the term attributes associated with each contract term in one or more computer databases. For example, contract term attributes stored as term data set in an airline industry application described herein include contract and term unique identifier. The method also involves collecting transaction data relating to one or more purchasing transactions and storing the transaction data in one or more computer databases. For example, transaction data collected in an airline industry application described herein include origin and destination, supplier and customer information.

Preferably, a computer program is executed to identify one or more of the purchasing transactions as a contracted transaction (i.e., applicable to a specific contract) by selecting at least a portion of the transaction data received for a purchasing transaction and comparing the selected portion with the term attributes for a contract term. In this way, the transaction may be identified (i.e., marked) as a contracted transaction if the selected portion is identified with one or more of the term attributes. For example, in an application for the airlines industry, ticketing transactions are identified to a contract by examining the departure date, the customer identity, or ticket company or agency, among other attributes.

The method further includes the step of generating a collection of contract transaction data sets by associating at least a portion of the transaction data of each identified contracted transaction with at least a portion of each term data set with which the transaction is identified. For example, a unique contract term identifier or ID, a unique contract identifier or ID, and/or term requirement or discount designation may be associated with each identified transaction data set. Such a contract-specific and preferably computer-accessible collection of data sets may be utilized to measure contract term performance and also to generate reports and summaries for the contract.

The inventive system and method allow a supplier to manage a contract whereby the customer may transact with a plurality of distributors and/or the supplier. It should be noted that from hereon the term "supplier" or "supplier entity" may refer to a product originator (e.g., an airline) as well as a distributor (e.g., a travel agency). The present invention also facilitates the management of contracts wherein the product generator and distributors are located in different parts of the world and/or use systems which produce incompatible electronic transactions or transaction data. In this respect, one aspect of the invention is the creation of a standardized data format and also a contract-specific computer accessible data set for a contract or contract term.

The present inventive system and method also provide a means for a supplier entity to identify transactions to a contract or a contract term. Further, such a means is provided that is implemented through computerized systems and computer programs operable therewith. In this way, an automated method of contract management is provided.

In a system and method for measuring contract performance, i.e., for bulk purchases over a period of time, the present invention provides a system and method, which converts information or data, received for contracted transactions into a common or standardized format. The common format facilitates identification of transaction data sets applicable to a contract term, and generation of contract-specific transaction data sets from which performance of a contract term may be measured and from which performance reports may be generated. Accordingly, suppliers are more consistent and more accurate in their payment of discounts to customers. Also, the profitability of an account can be measured and tracked by all forms of revenue and taking into account the discount payments. Further, compensation and incentive programs based on amounts and/or totals of contracted transactions may be structured for internal sales personnel.

In yet another aspect of the invention, a method of generating a purchase contract is provided. The method is particularly adapted for use with a method of managing purchasing contracts between at least one supplier entity and at least one customer entity, wherein the purchasing contract is applicable to one or more contracted purchasing transactions for products effected, at least partially, through a computerized system. The method of generating the contract includes the initial steps of collecting transaction data relating to historical purchasing transactions by the customer entity and/or satisfying a particular market profile, and storing, in one or more databases, a set of transaction data for each historical purchasing transaction. The method also includes the steps of defining one or more proposed contract terms and defining one or more term attributes associated with each proposed contract term and storing the term attributes as a term data set in one or more databases. Then, the method requires the step of executing a computer program to qualify each proposed contract term. This qualifying step includes selecting one or more of the stored term attributes (e.g., total units requirement, or percent/share of total units or value), and identifying each transaction data set that satisfies the selected term attributes.

The inventive method further includes forecasting a performance result of the proposed contract term using, as input, at least a portion of each transaction data set identified and qualifying the proposed contract term if the forecasted result satisfies a predetermined performance criteria in the form of one or more term performance rules. For example, three rules may apply. A first rule may require a specified share of a company's purchasing be made from the supplier while a second rule may require a specified monetary amount be made from the supplier. A third rule may require a specified unit amount of purchases be made from the supplier. Before a term is deemed acceptable, or thus qualified, it must satisfy one or more, or a combination of these rules. Once terms are qualified, a purchasing contract incorporating one or more of the qualified terms is assigned between the supplier entity and the customer entity.

BRIEF DESCRIPTION OF THE DRAWINGS

FIGS. 2A–2C are simplified flow charts illustrating a method of generating a contract according to the invention;

FIGS. 4A–4B are simplified block diagrams illustrating the generation of a data format for a contract-designated transaction, according to the invention;

FIGS. 5A–5B is a simplified flow chart illustrating the creation of entity and contact databases, according to the invention;

FIG. 7A–7C are simplified flow charts illustrating a data normalization process, according to the invention;

FIG. 8A–8I are simplified flow charts illustrating a process of defining a contract and contract terms therefor, according to the invention;

FIGS. 9A–9C are simplified flow charts illustrating a process of marking detailed transactions, according to the invention;

FIGS. 10A–10B are simplified flow charts illustrating a process of creating a transaction summary database, according to the invention;

FIGS. 11A–11B illustrates a process of forecasting term performance, according to the invention;

FIGS. 12A–12B illustrates a process of forecasting contract performance, according to the invention;

FIGS. 14A–14B is a simplified flow chart illustrating a process of auditing discounted transactions, according to the invention;

FIG. 16 is a flow chart illustrating a process of final reconciliation of contract terms, according to the invention;

FIG. 17 is a simplified flow chart illustrating a process for the payout of the discount, according to the invention;

FIG. 18 is a simplified flow chart illustrating a process of the measurement sales goals, according to the invention;

FIG. 19 is an illustration of the exemplary use of detailed transaction data used for the purpose of contracting, according to the invention;

FIG. 20 is an illustration of an exemplary Market Analysis Summary table according to the invention, according to the invention;

FIG. 23 is an illustration of a report monitoring actual performance of a contract, according to the invention.

DETAIL DESCRIPTION OF THE DRAWINGS

Definitions

Figure 1:
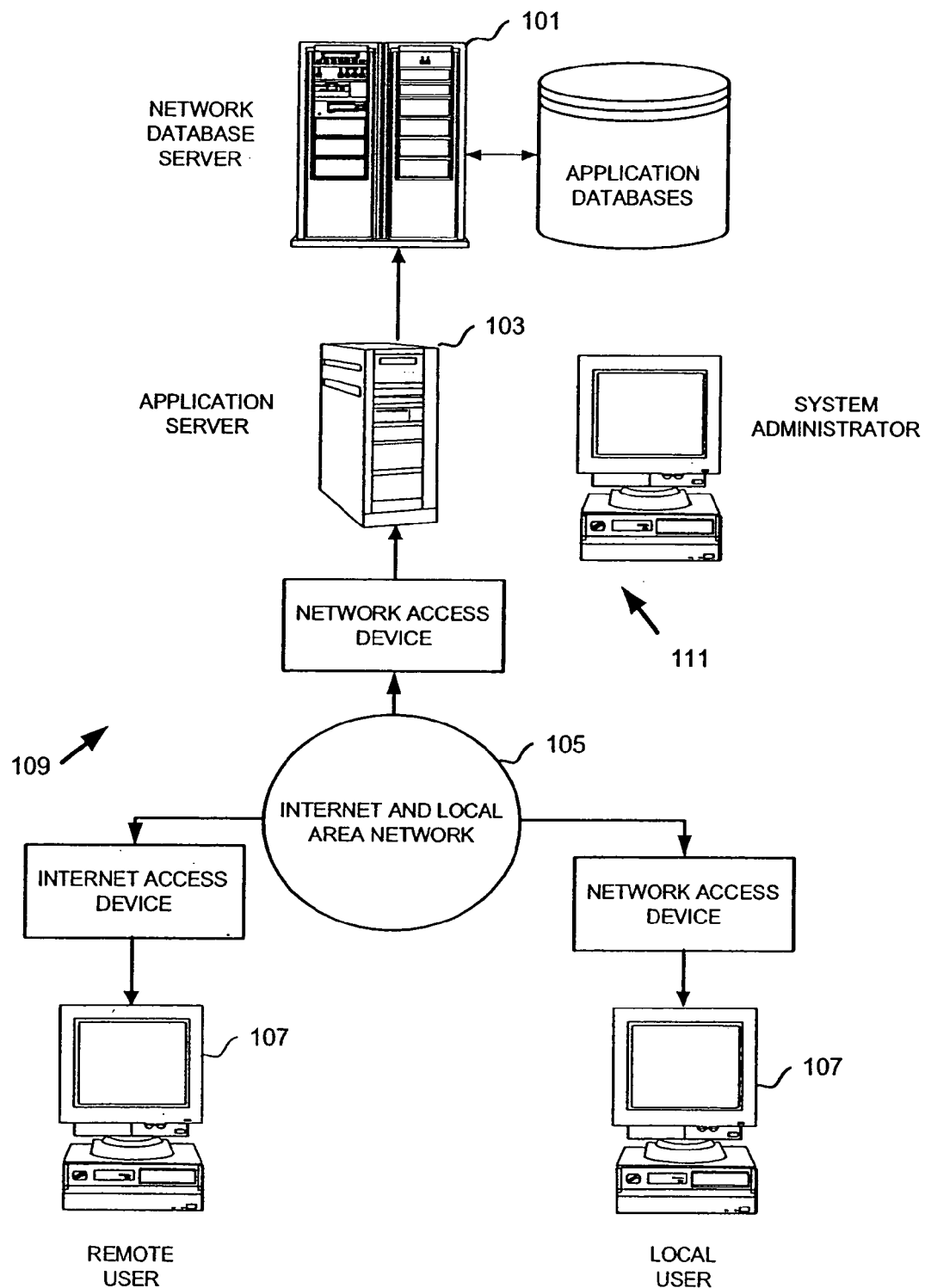
FIG. 1 is a simplified system configuration diagram for the inventive system.

To facilitate description of the embodiment of the invention illustrated in the drawings, brief explanations of certain operative terms and concepts follow. These explanations should not, however, operate to limit the scope of the invention.

As used heretofore, a "contract" establishes a legal relationship between a supplier entity (e.g., a supplier, distributor, originator, or alliance partner) and a customer entity. A contract is characterized by contract attributes including one or more contract "terms." A "term" defines an obligation on the part of one of the parties conditioned upon the satisfaction of term performance criteria. The term is, itself, defined by "term attributes."

The object of a contract between a supplier entity and customer entity are one or more "contract transactions" or "contracted transactions." These are transactions which effect the purchase of a supplier entity's product by the customer and which are governed by or apply to the contract. Records of these contract transactions include information related to the contract including a unique customer identifier, a unique contract identifier and contract term identifier. Identification of a specific contract transaction requires that information about the transactions be individualized. Sometimes, a record of a contract transaction will actually contain more than one contract transaction (as defined by the contract), i.e., a parent transaction. This information needs to be individualized to obtain each of the individual contract transactions. Conversely, a record may contain information that does not adequately identify the transaction as a contract transaction, i.e., a partial transaction. Similar to the parent transaction, this transaction must be individualized to obtain the individual contract transaction.

A "data set" is a collection of related information or data. A data set may reside on electronic storage media in a database or the data set may reside in the memory of the computer. A data set may comprise data stored in a plurality of databases but which are somehow associated for electronic access purposes. As shown herein, the data set may be displayed as rows in a database table.

A "definition" as used herein (e.g., "market definition", "term definition", "contract definition") may refer to the criteria that describes these items that are stored in a database in a computer language format, such as Structured Query Language.

A "data format" may refer to the unique collection, representation and arrangement of data in a data set. Typically, the data represents attributes. Although attributes are usually found within a row of a data set arranged in a particular order, the attributes may be arranged in any manner so long as the particular attribute type and value can be identified.

A "database table" as used herein refers to a means of storing structure data in an electronic media accessed by computerized processes.

An "identifier" is a data value or a combination of values that uniquely reference a particular entity or subject such as a Supplier, Customer, Contract, Contract Term, etc. The identifier may be any combination of characters, numbers, or any other representation so long as the value establishes the entity.

A "software module" or "module" as used herein means a component of the system that carries out instructions, rules, and processes of the inventive application.

"Structured Query Language" (SQL) is one form of computer language used to store structured commands to a database.

A "term rule" is an attribute that defines a performance requirement or criteria which must be satisfied before a contract term is deemed satisfied or fulfilled. In generating a contract, a proposed contract term may be required to satisfy, e.g., based on historical data, a specific term rule. For example, a term rule may be set up that specifies a numerical amount of product units purchased, a total purchase value or monetary amount, a percentage or share of purchased units or total purchase value. In other words, before a contract is created or qualified, each contract term may have to meet the specific requirements of the term rule. These term rules can later be used as a performance or term parameter to gauge the performance of the particular contract.

The following terms are used to describe the system and inventive method's application in the travel industry.

A "Directional Pair" describes the originating and destination airports but counts the originating airport twice. For example, a round trip between San Francisco (originating) and Chicago is indicated by the code SFO-ORD and recorded twice (as 2 flights).

"Front-end Terms" are contract terms which provide for a discount to the customer discount at the point of sale.

"Back-end Terms" are terms which, if satisfied, provide payment of the discount to the customer at the end of a contract period.

"Host" or "Host Carrier" is the contracting airline operating the system.

A "Market" as used herein, refers to the passengers true origin-destination on the same, or alliance carrier, which may be comprised of multiple segments (i.e. ABQ-HOU-AMS).

The "Market Share Database" is a summary database containing values establishing the minimum share the carrier requires for any market (to meet a contract term).

An "OD Pair" is an origin and destination pair describes the originating and destination airports in alphabetical order of the originating airport. OD Pairs are used to count the total number of flights between two airports. For example, a round trip flight between San Francisco and Chicago is indicated by the code ORD-SFO and recorded twice (as 2 flights).

Exemplary Application In a Common Carrier Industry

The present invention is particularly adapted for implementation in the operating environment of the airline industry or other common carrier industry. Airlines enter into contracts with companies for the volume purchase of airline seats at discounted prices for business travelers. The terms of these contracts may require commitments for the purchase of a specified number of seats, or the expenditure of a monetary amount, or a designated share of a customer company's purchase (count or monetary amount) to be dedicated to the airline. Accordingly, these contracts can represent large financial commitments by customers and involve significant ticket price discounts.

Airlines typically measure contract term performance by examining reports or data provided by the customer; or require a travel agency to manually input a term code in a travelers' data record; or rely upon internal data that are exclusive to the airline, such as revenue accounting data. The product data acquired are often raw and not in readily usable form for some contract management tasks. Typically, the information initially collected are in flight segment data form which does not properly reflect the traveler's ultimate destination. Among other things, the form of this data and the means by which the data are collected do not readily allow for a transaction to be matched or identified with a contract term (so that measurement of the contract term's performance reflect the occurrence of these transactions).

Moreover, without agent intervention, the record of these transactions do not automatically or readily indicate information relevant to a contract term such as the count of seats, amount of expenditure, the airline's share of business, and other transaction information or values. Contracted terms and fares are inconsistently displayed in the various airline booking databases. Agents typically enter special codes to designate fares and thus, since this is a manual operation, the information entered is often incomplete or inaccurate. Additionally, agents enter codes which apply to only one specified carrier, and which cannot be associated to other carriers. As a result, the measure of term performance may be inadequate since the total number of passengers, total expenditure, and share of flights for a given company may not take into account flights on other airlines. Thus, the inventive system and method provide for the collection, identification, and/or generation of transaction information or data which facilitate the measurement of contract performance for all carriers.

Airlines are also extending their reach to new markets by forming airline alliances comprised of two or more carriers. An airline within an alliance may "code-share" which is the practice of using the flight number or code of the alliance partner in addition to its own flight number or code. While a traveler's itinerary may show one airline to a destination, more than one airline may actually be flown. In a multinational setting, contracts often apply to code-share flights. Therefore, in one aspect of the invention, the inventive system and method are adapted to identifying transactions involving code-share flights with a contract term and/or converting transaction data relating to such flights into a form that is suitable for the management of a contract (including measurement of a contract term).

Airlines distribute their products (airline seats) through electronic systems such as Global Distribution Systems, travel agencies, or Internet booking portals. Tickets may be purchased through any one of thousands of travel agent ticketing locations located around the world. While ticket data may be collected in airline revenue accounting systems or in travel agent accounting systems, many of such systems create and use incompatible data formats. Thus, an airline examining data made available to it may not be able to recognize that a traveler is qualified for a corporate discount. Moreover, when airlines do recognize such a traveler or transaction, identifying tickets which qualify for discounts is done by entering a unique number into a computer system. Again, since this step is performed manually, it is subject to error. The present invention provides a system and method for identifying ticketing transactions applicable to a contract between airline and a customer company, collecting transaction data therefor, and storing and/or converting all of the transaction data in a common format. The stored/converted data may be referred to as transaction data sets and may be further manipulated or marked so as to be identifiable with a contract and/or contact term, or used for evaluating or qualifying proposed contracts or contract terms.

Accordingly, FIGS. 1–23 and the detail description of these Figures relate to an application of the inventive system and method to a contractual relationship between a supplier entity such as an airline company or its distributor, and a customer entity such as a large national corporation. The products which are the subject of the contractual relationship are seats or flights. These seats are identifiable by carrier, seat number, cabin class and flight segment (i.e., origin-destination or OD). The application of the inventive system and method to other types of contractual relationships will become apparent to one skilled in the art upon reading the description and/or claims and/or viewing the drawings, all provided herein.

Overview of Figures

FIGS. 1–23 depict systems and processes embodying various aspects of the invention. More particularly, FIGS. 1–23 illustrate one or more inventive systems and methods particularly adapted for use with or in regard to a purchasing contract between a supplier entity such as a common carrier (e.g., an airline company) or a distributor (e.g., a travel agency) associated with the common carrier, and a customer entity such as a large corporation.

Among other functions, the systems and processes illustrated in the Figures and described herein provide for the following functions: (1) identify and record information on business entities and contacts; (2) define performance term rules indicating the minimum and maximum financial performance requirements for the term and the contract; (3) acquire and normalize historical customer purchasing data; (4) input contract terms and forecast financial performance of the term and contract; (5) produce contract and term requirement documents; (6) mark current transactions by unique contract and term codes and produce a database to analyze contract terms; (7) produce performance information for supplier and customer personnel; (8) initiate customer discounts; and, (9) reconcile term requirements to term performance at or near the end of the contract. In one aspect of the invention, each of the above functions are provided automatically or by implementation of computerized processes. Some of the modules employed in a computer system and software embodying the invention are discussed herein for illustrative purposes. These modules are particularly adapted for employment by a representative of the supplier entity (e.g., airline).

Preferred System Configuration

FIG. 1 is a simplified system configuration diagram illustrating a system 109 with which various steps or subprocesses of the inventive method may be implemented. These steps and subprocesses are implemented by executing a program that resides on a computer or application server 103 (operable with a system administrator station 103*a*) connected via a network 105 (and network access device 105*a*) to a database server 101 having retrieval and storage access to application databases 101*a*. This allows the inventive processes(s) to be implemented in a client/server or multi-tier configuration. In one embodiment, the program runs on a computer. However, the program may also run on any other network connected device 107 capable of processing, displaying, and receiving data and transmitting the data over the network (e.g., cellular telephones, agent terminals, airline ticketing terminals, diskless workstations, personal data assistants, etc.). The database(s) are connected via a computer network 105 to the computer or the application server 103. Although in the preferred embodiment, the database resides separately from the computer, the database may reside on the same computer as the program. The computer network 105 shown is a local area network 105, but may also be any type of network capable of handling electronic communications between two devices on the network (e.g., the Internet, Wide Area Networks, Cellular networks, Microwave networks, etc.). The computer network 105 may have any arbitrary topology and can be comprised of a number of computers as well as network devices such as switches, routers, gateways, firewalls, etc., and other resources such as file servers, printers, etc.

General Method Of Generating a Purchasing Contract

FIG. 2 illustrates a flow chart generally describing a preferred set of steps for generating a purchasing contract according to the invention. The initial step of the method includes proposing a contract (201) between one or more supplier entities and one or more customer entities (although in the presently described method, the contract involves a supplier entity such as an airline and a customer entity such as a large national corporation). The inventive method will require the creation of, access to, and/or storing preliminary information in one or more databases. For example, the method includes the initial step 203 of creating a contract Entity Database, which entails collecting information on the supplier and customer entities and storing data relating to or representing this information in the Entity Database 303. Next, an entity Contacts Database 305 is created (205) which entails collecting information regarding employee contacts within the customer entity and information on the employee within the supplier entity assigned to the contract, and storing this information as data in the entity Contacts Database 305. Further, certain ancillary databases 403 are also provided (207) for purposes, which will be described below.

In another preliminary step 209, the proposed contract terms for the contract are defined. Such contract terms may be similar to terms in other contracts made between the supplier and customer entities, or between the supplier and other customer entities. The contract terms will have associated therewith certain contract term attributes (e.g., term performance criteria, discount, etc.). These term attributes are stored as a term data set 211, unique to the contract term, in the Term Definition Database 315. Additionally, the proposed term will have associated therewith term performance rule(s), which will be explained further below. These term performance rules are stored in a subsequent step 213 in a Term Rule Database 313.

Upon establishing the above parameters for the contract and contract terms, certain steps are taken to forecast and qualify the contract terms for the contract, and thus to produce the contract. Accordingly, the next step in the method is the step 215 of collecting historical transaction data (i.e., by the customer entity for the same or similar products which are the subject of the proposed contract). As mentioned previously, such transaction data may be in a form that does not correspond with the product unit(s) that the supplier entity, its programs or systems is familiar with. In addressing this, the inventive system individualizes the transaction data sets which are collected (217). This may involve deriving one or more individualized transactions from a parent transaction, or identifying less than a whole (percentage) of an individualized transaction from such a parent transaction. After collecting the transaction data sets, these transaction data sets are, in a further step 219, converted into a standard format and stored in a Transaction Detail Database 307.

In what may be referred to as the next stage in this method of generating the purchasing contract, certain of the proposed contract terms are qualified. In an initial step 221, one of the proposed contract terms is selected. This is followed by a step 223 wherein transaction data sets in the Transaction Detail Database 307 are examined such that those data sets which are identifiable or applicable to the proposed contract term are marked. Having identified the collection of the appropriate transaction datasets, the proposed contract term maybe defined 225 and then tested. Further, the performance of the term is forecasted using, as input, data from the identified transaction data sets. The forecasting step generates certain performance values or expected performance values and which are then (in step 229) compared to the appropriate term performance rules from the Term Rule Database 313. If, based on this comparison, the proposed term is deemed qualified; the method assigns a unique term code to the qualified term (231).

Upon qualification (or non-qualification) of the first term, the method further includes a step 233 of selecting another contract term, if desired, and qualifying that term.

After all of the selected proposed contract terms have been qualified, the method computes the financial result of the proposed contract with one or more of the qualified proposed contract terms (235). Based upon the results of this computation, the contract is either approved or disapproved (237). If the contract is approved, the contract and its contract terms are produced (239). Based on the contract type, the system selects the correct contract and produces a shell contract including the correct name and address of the business entities and signatories to the contract. Then, using data from the Contract Term Database, a term sheet is produced in standard language that mirrors precisely the term requirements stored in the computer.

The above is a brief, general overview of one general method according to the invention. The various subprocesses of this method and related methods are described in more detail in certain sections of the description below and in respect to an airlines industry application.

Computer System Databases

Figure 3:
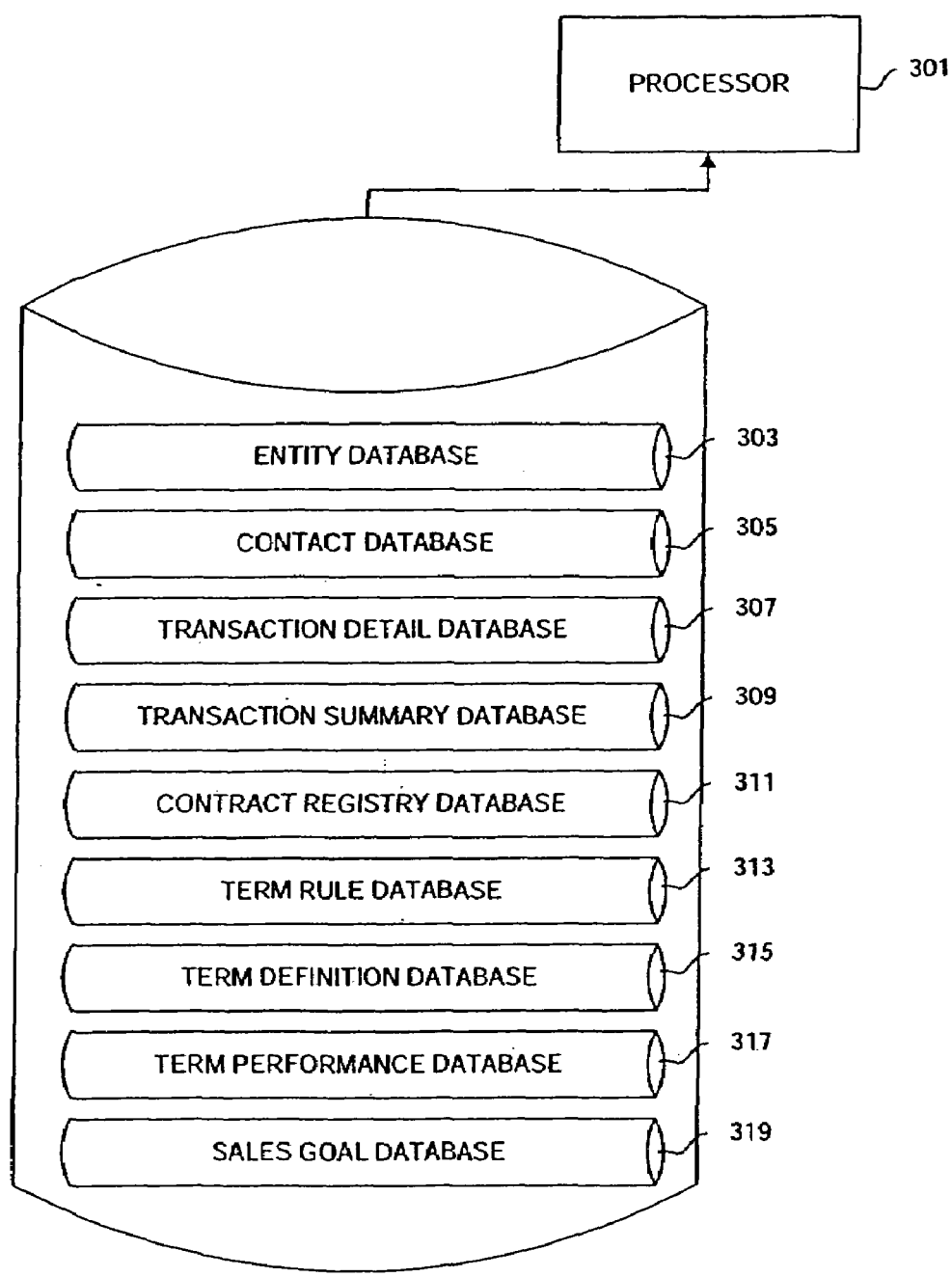
FIG. 3 is a simplified illustration of a plurality of databases which are generated and/or utilized according to the present invention.

FIGS. 3 and 4 illustrate the various databases which may be generated or utilized by a preferred system or software package according to the invention. The following are introductory explanations of each database.

1. The Entity Database 303 contains fact information relating to customers, suppliers, distributors, airlines, alliance partners and other entities. Information on these entities include legal business name, address, phone numbers, and tax number.

2. The Contacts Database 305 contains information relating to persons involved in transactions or contracts. These persons include persons who are responsible for sales, customer management, or purchasing contracts.

3. The Transaction Detail Database 307 contains information relating to a collection of purchasing transactions by a customer arranged in a common or standardized format. Each set of information or data may be referred to herein as a transaction data set.

4. The Transaction Summary Database 309 contains summary information relating to certain detail transactions stored in the Transaction Detail Database. Creation and use of this database is described in detail below.

5. The Contract Registry Database 311 contains information relating to contracts which have been created, i.e. through implementation of the invention.

6. The Term Rule Database 313 contains information relating to operator defined terms and include term requirements for minimum or maximum purchase amounts, supplier share, or the number of units to be purchased.

7. The Term Definition Database 315 contains information relating to the agreement for performance between the supplier and the customer. Some of the term attributes which are contained in the database includes items such as term effective dates, performance requirements, discount information, etc.

8. The Term Performance Database 317 contains summary information related to a particular term including such information as total unit counts, total amounts, supplier shares, and requirement status.

9. The Payment Database contains information relating to payments made for performing terms including payment schedule, start and end dates of payment period, payment amounts and discount amounts. Once the system determines that the requirements for a term are met, the Payment Database is used to process and record payments. These payments are also used in determining the actual discount paid and in computing the final financial performance of the contract.

10. The Sales Goal Database 319 contains information relating to specific performance related goals set by an entity such as a supplier.

11. The Supplier/Distributor Database 401 contains information relating to entities which provide products (e.g., goods or services). Supplier Entities can be entities such as the supplier, distributor, and affiliates of the supplier.

12. The Ancillary Database(s) 403 include one or more databases, which contain various information relating to flight segments, product and marketing information, operating carriers, actual flight pricing, arrival and departure times, and other information. The ancillary databases provide information that is in the public domain, but frequently contain data that are more reliable than data collected with the transaction. When the data do not match, the most reliable source is used.

The above databases may be provided on a single electronic storage medium or multiple electronic storage media, and linked/interlinked in communication with one or more processors 301. Although, the databases are shown as separate databases in the preferred embodiment, the databases may be created as a single database containing some, all or part of the information found in the other databases. In any event, a system or software embodying the invention will be able to create and/or access one or more of these databases.

Contract-Designated Transaction

Once the parties have agreed on their intent to negotiate a deal, the customer provides the supplier with detailed data for each purchase. Often these data are from disparate sources and arrive in incompatible formats. The inventive system and method sequesters data into a temporary database before it normalizes the data into a common transaction format. Data may reflect components of the actual purchase in which case the components must be constructed to reflect the actual (or whole) purchase, or data may reflect a transaction that comprises more than one product in which case the transaction must be deconstructed to identify the product. In either case, the inventive method performs the subprocess of individualizing transactions or transaction data.

Using the databases previously described, namely the Supplier/Distributor database 401, the ancillary database 403, the Entity and Contacts Databases 303, 305, the Contract Registry Database 311 and the Term Definition Database 315, the inventive method generates a new class or collection of data sets that ties the transaction to the various aspects of the contract (see FIG. 4). The following data elements (attributes) may be acquired for each customer transaction: a descriptive code of the item purchased at the term level; the date and time of purchase; count of units purchased; net and gross amount of the purchase; supplier's unique code; and, the distributor's unique code. These data elements are then used to lookup and derive information from the databases identified in FIG.4. Upon lookup and derivation of information from the various databases, the new class of data 409–415 is automatically created. The new class of transactional data in the preferred embodiment contains or represents the following attributes:

Product Description (405)
Product Code(s)
Supplier Code
Distributor Code
Unit(s)
Cost
Date & Time of Transaction(s)
Entity and Contact Information (407)
Supplier Entity
Supplier Contacts
Distributor Entity
Distributor Contacts
Customer Entity
Customer Contacts
Contract Information (411)
Contract Code
Term Code
Transactional data may be analyzed by contract criteria embodied in the Term Definition database that includes the data elements which define the contract term.
Term Requirement Information (413)
Market, Product, Class Requirement
Market Product, Class Discount
Begin and End Dates
Unit requirement and/or
Cost requirement and/or
Share requirement
Term Performance information (415)
Count
Amount
Share
Discounted and undiscounted amount
The system processes that create these data are illustrated in FIGS. 5–18 and described below.

Input Contract Entities and Contacts

When an airline and a customer first discuss the possibility of a deal, the business entities in the proposed deal are identified. Entities may include the corporate or agency customer, the airline, and the airline's potential alliance partners. Facts on each party are required for the contract such as legal business name, address, and tax number. The inventive system stores this data in an Entity Database 303. While contracts are between entities, individuals are responsible for the management of the contract. Airlines assign individuals who are responsible for sales, customer management, and contracting. Likewise, companies assign individuals who are responsible for purchasing and contracting. Information on these individuals are stored in the Contacts Database 305.

The flow charts illustrated in FIGS. 5A and 5B provide the creation (or update) of the entities and Contacts Databases 303 and 305. The process begins with the operator inputting contract entity data (501) and inputting supplier data (503). Supplier entity and customer entity data may include such information as legal name, address, phone, email address, and web site. Further, the customer information may include such additional information as corporate division, industry, and applicable sales region. A determination (505) is then made whether another supplier is to be added. If so, the operator inputs supplier data for that supplier and for subsequent suppliers until no more suppliers are to be added. The operator inputs distributor data (507), which is followed by a step 509 of determining whether another distributor is to be added. This is followed by operator inputting distributor data for that distributor and for subsequent distributors until no more distributors are to be added. The operator inputting data source data (511) for a first data source, and, if it is determined (513) that there are additional data sources, for each of those data sources as well. Upon completion of the above steps, the entered data is stored in the Entity Database 303 (step 527).

FIG. 5B further illustrates the creation of a database 15 that may be characterized as another Entity database. The Entity Contact Database 305 contains information regarding the sales person responsible for the contract, employees of the supplier entity and employees of the customer entity who are relevant to the contracts or contract terms. First, the identity of the sales person responsible for the contract is entered (515). Next, the identity of the customer contacts are established (517). Then, employee or personnel contacts within the customer entity are identified followed by the step of loading or inputting contact data into the Contact Database 305. Contact data may include such information as the name of customer(s), address, phone numbers, and personal information for work and home. In the case of generating a proposed contract and contract terms, the customer information will relate to a potential customer and the potential customer's employee(s).

In a second step 519, supplier entity employee data is loaded into the Contact Database 305. This step is preceded by a step of identifying supplier entity employees who are responsible for the contract or proposed contract. This identification step preferably includes associating a function and/or hierarchical position to each employee (e.g., sales supervision, contracting, payment). The contact data loaded will, of course, include such information as name, address, phone numbers, and personal information for work and home. The subprocess may further include the step 321 of collecting and inputting distributor contact data, when applicable. Additionally, the subprocess preferably includes the step 523 of inputting data source contacts and entering the names or designations of responsible personnel for providing transaction data on what has been purchased. All of these data is then stored in the Contact Database (305) (step 525).

Establish Contract and Term Rules

The process of term qualification is conducted by matching or comparing the financial results obtainable with a proposed contract term (e.g. based on historical transaction data) to predefined term criteria or term rules. These rules are operator defined and may include requirements for minimum or maximum purchase amounts, supplier share, or the number of units to be purchased.

Figure 6:
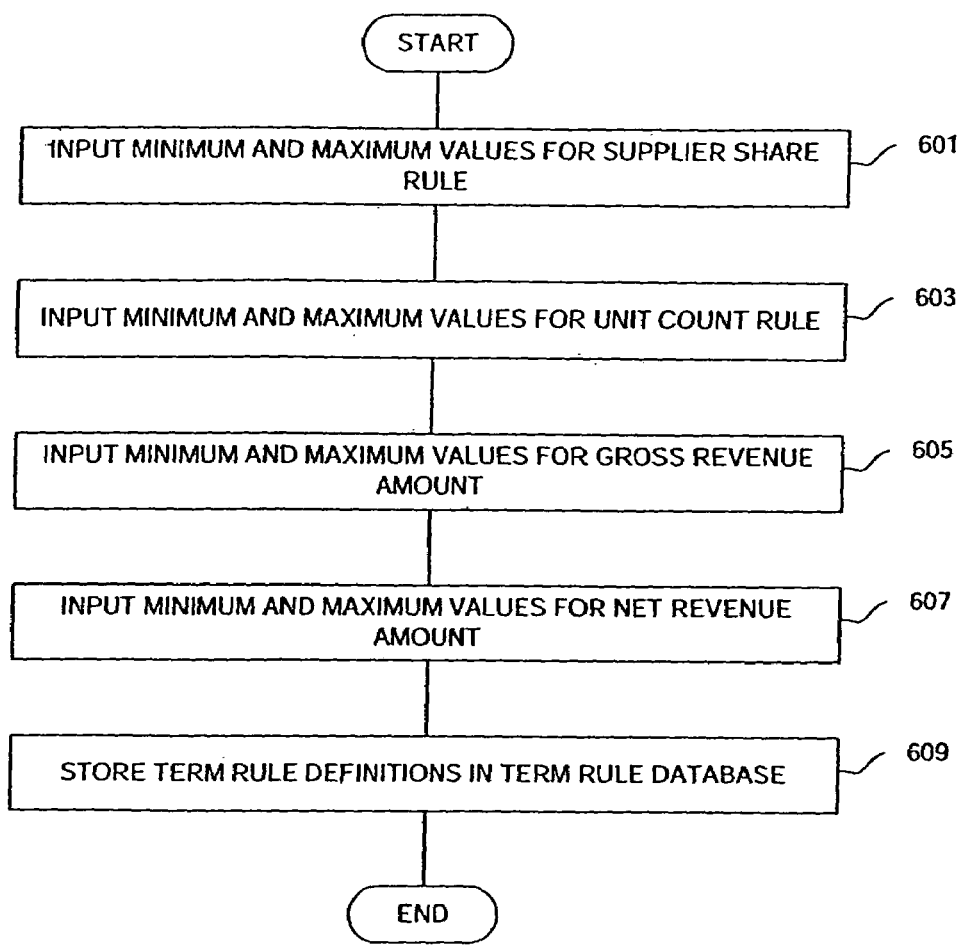
FIG. 6 is a simplified flow chart illustrating the creation of a term rules database, according to the invention.

The flow chart of FIG. 6 illustrates in simplified form a process of inputting, and thereby creating, term rules in the Term Rule Database 313. In a series of steps, the minimum and maximum values for the supplier share and the minimum and maximum values for unit count are inputted (601, 603). Then, the minimum and maximum values for gross revenue amount and the minimum and maximum values for net revenue amount are inputted (605, 607). These steps may, of course, be performed in various orders or sequences. The term rule definitions are then stored in the Term Rule Database 313 (step 609).

Normalize Data into Standard Transaction Format

It should be noted that, in one respect, the new class of data 409 (or contract-specific transaction data set) is derived from at least three other data sets: a transaction data set 307, entity data set 303, contact data set 305, and contract data set 311, and term data set 315. The creation of each of these data sets is further described below.

Airline data is derived from travel agencies, Global Distribution Systems, third-party data consolidators, or the airline's internal sources. The data is exported from distributor's sales information systems in different formats. A first subprocess of the inventive method is to collect transaction data from such various sources and to convert (i.e., normalize) the collected transaction data into a transaction data set 307 stored in accordance with a common format.

Data taken from the point of sale may not reflect the individual items measured in a term. Point of sale data may comprise individual product components that must be constructed into the applicable unit product purchased in a term, or point of sale data may comprise multiple contracted products that must be deconstructed to identify the individual product. In either case, the true item being measured by the term must be constructed (or de-constructed) from the data provided. Airline systems store product data as flight segments. Using standard industry practice, the many segments that comprise an itinerary are constructed into origin and destination rows (ODs) reflecting the true destination the traveler, or a group transaction may include many travelers, in which case it is deconstructed to provide one transaction per traveler. Ancillary databases 11 are used to confirm the accuracy of the data, e.g. to determine, or correct, the designation of the carrier, the actual price of the flight, or the arrival and departure times. Typically, if the transaction data differ, data in the ancillary database are given preference and written in. Once the data is converted into the standard format, it is loaded into the Transaction Detail Database 307. Then, refunds and exchanges are netted against the original transactions so an accurate transaction count is maintained. Once the data is normalized, it is ready for contract term modeling and the qualification of financial performance.

The flow chart diagram in FIGS. 7A–7C illustrates in simplified form a preferred data normalization process (i.e., a process of receiving transaction data and storing at least a portion of the data in accordance with a common format). The process begins with steps 701–711 of inputting the following information: a count of units of product purchased, a cost of units of product purchased, a unique code or identifier for the product, a unique code or identifier for the customer, a unique code or identifier for the supplier, a unique code for the distributor. Then, the input data or data set is compared with information in the ancillary databases 403 (step 713). If the input data does not match or correspond with data in the ancillary database 403 or satisfy some other identifying criteria stored therein, the correct elements in the data set are then used to lookup and correct the incorrect elements (715). For example, if the value for the departure time of a flight for the data source differs from value in the authoritative ancillary database, the value from the ancillary database will be used to over write the incorrect value.

If the input data does match, it is determined whether the product description represents the unit the customer purchased (717). If the product does represent the unit the customer purchased, then the process continues by loading data into the Transaction Detail Database 307 (step 727). If the product does not represent the unit the customer purchased, then it is determined whether the transaction is a component of the product purchased (719).

If the transaction is found to be a component of the product purchased, the true product is first constructed from the data 721 before the process continues with the loading the data (527) into the Transaction Detail Database 307. If the transaction is not a component of the product purchased, it is determined whether the transaction is comprised of multiple products (723). If the transaction is not comprised of multiple products, the data is loaded (727) into the Transaction Detail Database 307. If the transaction is comprised of multiple products, however, the true product is first deconstructed from the data (725). Either of the above series of steps is referred to as individualizing the transaction data set collected for a transaction. For example, more than one traveler may be indicated on one airline ticket. Each traveler represents one person traveling to that destination, and each traveler may receive a contracted discount. The system, therefore, creates and stores an individual transaction for each individual traveler (although one ticket was issued).

Now referring to FIG. 7C, the next step 729 in the method is determining whether the transaction is an exchange. If the transaction is found to be an exchange, a pseudo refund is issued for the exchange (731). A refund is issued to cancel the original transaction. This is critical for the true net transaction count. Then, in the next step 733, or if the transaction is not an exchange, it is determined whether the transaction is a refund. If the transaction is a refund, the transaction is marked (735) as a refund and the original transaction is identified. Then, if the transaction is not a refund, the method proceeds directly to loading the data (step 737) into the Transaction Detail Database 307.

Define Contract and Performance Term

Purchasing contracts are agreements between supplier and customer. Performance requirements for the contract are stated as one or more contract terms (which are one of the contract attributes). In one aspect of the invention, the method enables the user to input and store these terms in the computer as Structured Query Language (SQL) definitions or its machine language equivalent. Thus, by using the SQL definitions, the computer can readily compare the data elements associated with the term requirements with corresponding data elements associated with a product purchase, i.e., the transaction. When the data elements match, the contract and term are automatically identified and marked. Each term may include, as its attributes, a unique title, beginning and end dates for which the term is effective, performance requirements, discount amount and method (e.g., if term is satisfied), special purchasing instructions, a user-defined code for the term, and identification of the distributors who are authorized to sell the product at the stated discount and how much they are compensated. Each contract is also given a unique code. Likewise, terms are given a unique code that groups them under the appropriate contract. SQL definitions for a term are stored in the Term Definition Database 315.

By using the term definition, the inventive method can identify each transaction or data set in the Transaction Detail Database 307 with a designated unique contract code and term code, as well as the appropriate entity codes. In this way, a collection of contract-specific transaction data sets are generated. Further, the inventive system and method provides a supplier entity an improved means of storing a unique class of information pertinent to a supplier-customer contract and, a means of generating, from data sets representing this information, transaction summaries and contract measurement reports.

FIGS. 8A–8I illustrate a method of defining a proposed contract and its contract terms for use in a supplier-customer environment of the airline industry and designated for a customer such as large national company. The steps of the preferred method are implemented through various operations of inventive software by an operator representative of the supplier entity. In FIG. 8, the method is initiated by accessing or starting a Contract Definition module of the software and prompting the program to start a contract definition operation (801). The user selects and enters a name of the proposed contract name (803) and then the beginning and end dates of the proposed contract (805). Next, the user selects one of several choices of contract types provided on the module (807). The selections may include: agency; agency cluster; alliance; corporate; corporate cluster; meeting; or combinations of these. In yet another aspect of the invention, the user may enter more than one participating supplier (i.e., carriers) and identify these suppliers with the proposed contract. Among other things, this allows customer purchases of tickets on carriers which are not the primary carrier for the contract or customer but can be later credited to the customer and the customer's contract. Then, the program assigns the proposed contract a unique identification code (811) and stores the contract description (which include the unique contract ID and the rest of the above-entered information) in the Contract Registry Database 311 (813). The information provided above is, therefore, accessible by using the contract's unique identifier.

Preferably, the operator will access a second module to initiate the definition of the terms for the contract (815). In initial steps, the operator enters a title or description for the term to be defined (817) and the beginning and end dates within which the term is to be applicable (819). The system then assigns the term a unique identification code (step 821) and stores a term description in the Term Definition Database 315 (step 823).

Figure 21A:
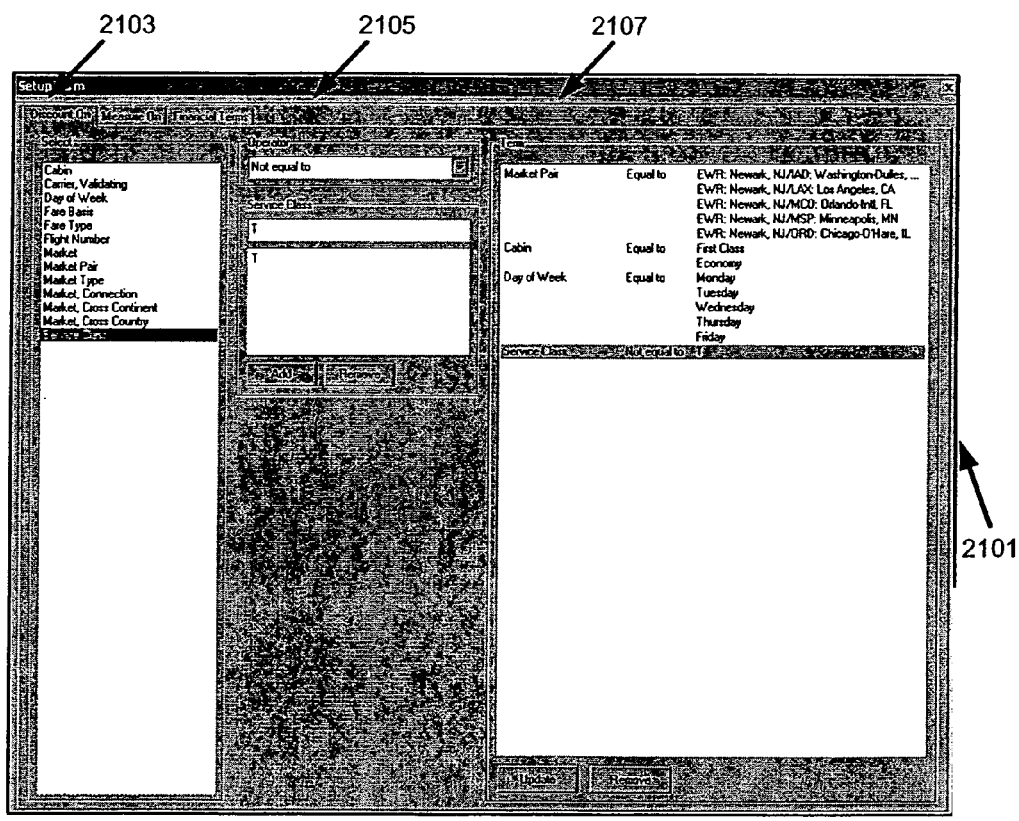
FIGS. 21A, 21C are illustrations of a Term Definition Module, according to the invention.
Figure 21B:
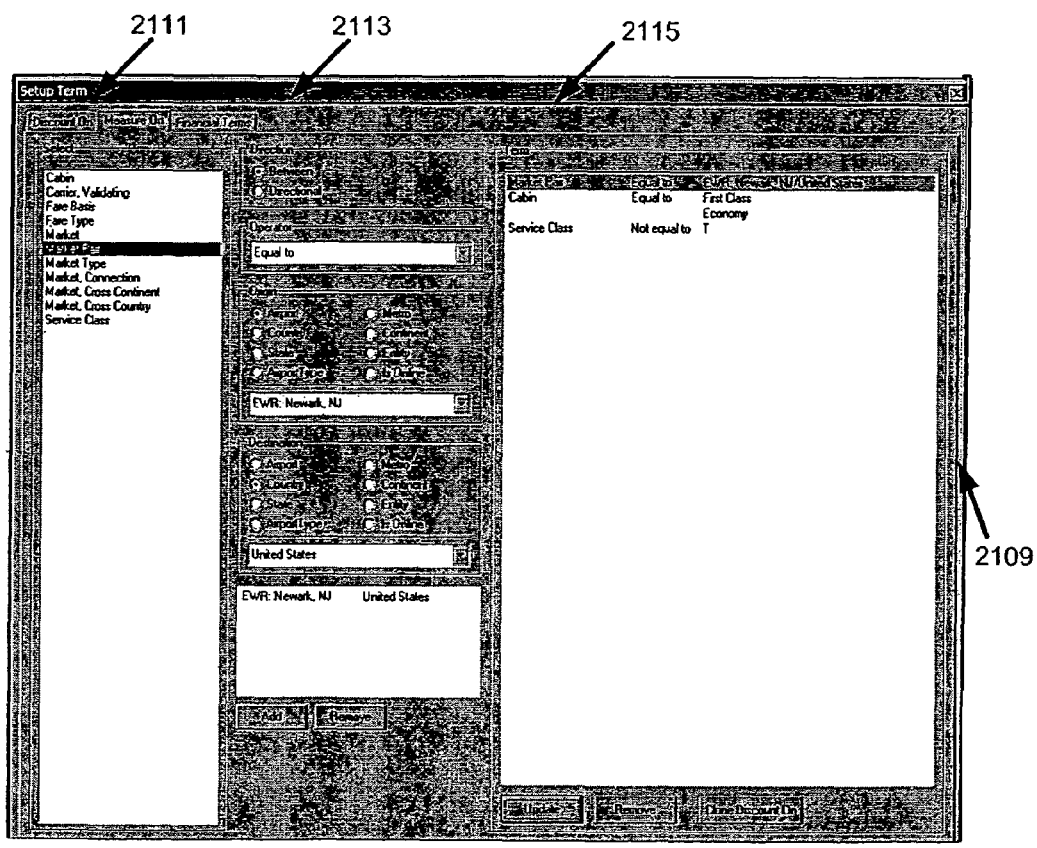

Referring to FIG. 8C, in a subsequent stage of the method, measurement criteria is defined for the contract term. The term measurement criteria is used to identify which historical transactions or records are to be identified with the term and thus, used to measure the performance of the term. FIG. 21A provides a screen shot of a module 2101 used to define the performance measurement criteria of a proposed term. After initiating the process (step 825), the operator enters the markets for measurement (step 827) and then, the suppliers (step 829), products (step 831), and the classes (step 833) applicable to the term. For example, in the airline industry contract, markets are identified by flight origin-destination pairs, such as Washington, D.C.,-Chicago, O'Hare (IAD-ORD). Products are seats on the flight types which may be identified as non-stop, one-stop, or direct. Classes of service, or cabin type, may be identified as first class, business, economy and discount. The term measurement criteria are then stored as a SQL statement in the Term Definition Database 315 (step 835).

Next, the system queries whether measurement exclusions are to be defined (839). These exclusions are used to identify transactions which are not to be used in term performance measurement (but may, otherwise, qualify under the measurement criteria). Referring to FIG. 8D, the measurement exclusion definition process is initiated by the operator. The operator defines the transactions to be excluded by specifying the market(s) to be excluded (step 841), the supplier(s) to be excluded (step 843), and the product(s) to be excluded (step 845), and/or the class(es) to be excluded (step 847). The resulting measure-on exclusion criteria are then stored as an SQL statement in the Term Definition Database 315 (step 849).

Figure 21C:
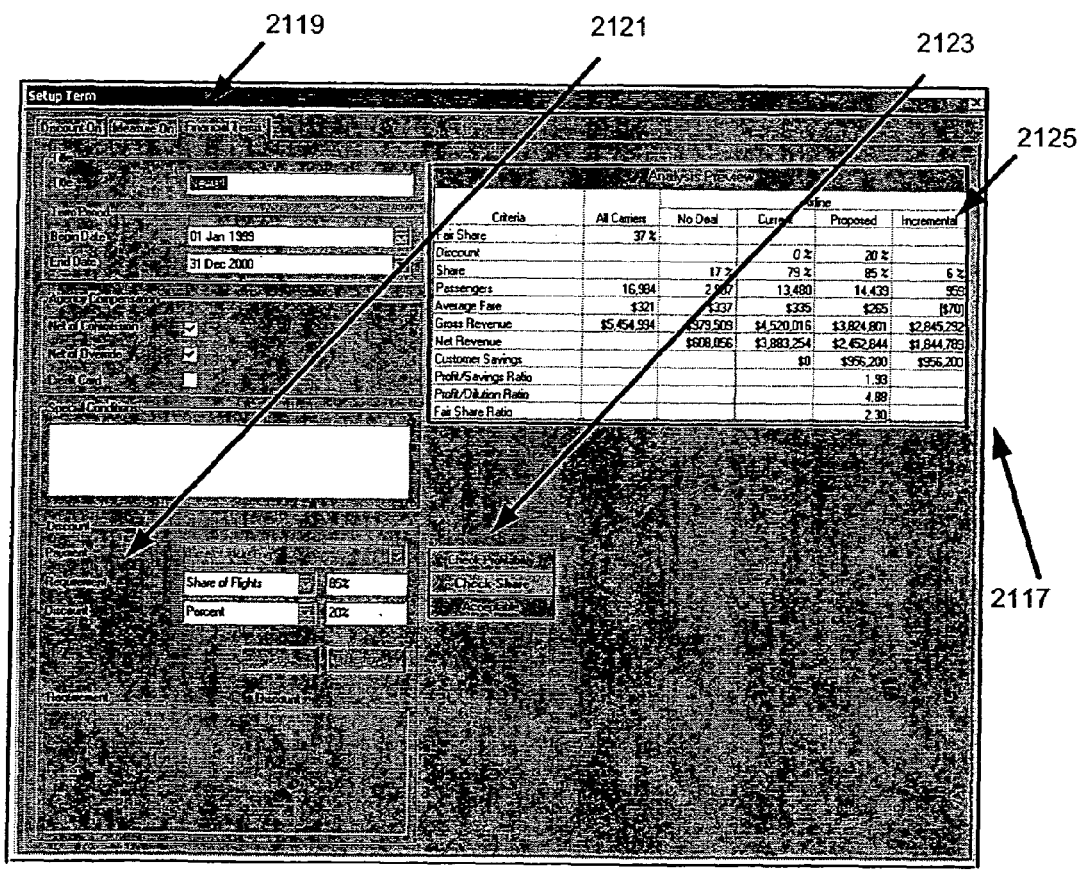

If there are no exclusions to the performance measurement criteria to be defined or all such exclusions have been defined, the operator begins definition of the discount payment criteria (851) by accessing the appropriate payment criteria module (see, e.g., FIG. 21C). The payment criteria provides the means by which to identify those transactions for which a discount is to be applied. The operator defines the payment criteria by entering the required market(s) (step 853), required supplier(s) (step 855), required product(s) (step 857), and/or required class(es) (step 859) for transactions to be discounted. The system then stores this information as SQL statement in the Term Definition Database 315 (step 861).

As with the term measurement criteria, the system also allows the operator to define payment exclusions (865), thereby identifying the ticketing transactions for which no discount will be applied. The operator initiates this process (see FIG. 8F) also through operation of the payment criteria module. Then, the operator enters the market(s) (step 867), the supplier(s) (step 860), the product(s) (step 871), and/or the class(es) (step 873) defining those transactions for which no discount is to be paid. Then, the payment exclusion criteria is stored as an SQL statement in the Term Definition Database 315 (step 875).

Term definition according to the invention also requires distributor related expenses to be accounted for. Airlines pay distributors, such as travel agents and credit card companies, commissions for taking reservations and selling airline tickets, and processing payments. In the inventive method and system, these payments can be accounted for when analyzing a contract term or contract. The user can define the term to include or exclude distributor commission, and to define the ticketing locations that are permitted to sell tickets with the discount.

Referring to FIG. 8G, the operator initiates definition of these distributor-related expenses or distributor compensation using the term definition module (step 877). For each distributor, the operator enters the distributor's commission amount for each ticket (step 877), any distributor override amount or additional incentive commission that is paid or credited to the distributor (step 879), and any credit expense (i.e., credit card transaction fees paid to the credit card companies) by the distributor (step 891). The above are amounts ordinarily deductible from revenue generated from the ticket transaction and not received by the airline supplier. Thus, these amounts may not be measured in the term's performance. The distributor compensation criteria are then stored as an SQL statement in the Term Definition Database (step 883).

Now referring to FIG. 8H, the system further allows the operator to define the discount payout criteria, still using the term definition module (step 855). The operator defines the discount payout criteria by first selecting the payout timing (885), which may be selected to occur at the point of sale or at the end of one or more periods (step discount). Next, the operator selects the performance or purchase commitment requirement for the term, which may be entered as a share of count (total of customer's or supplier's transactions), share of total expenditure, or total count of transaction (or product units) or dollar amount for transactions (887). Then, the operator selects the discount type to be employed, which may be a percent of the transaction(s) amount, a fixed price, or flat amount off (889).

If the payout timing selected is end-of-period, as queried to the operator (891), the operator is prompted to define another step 893, in which case the operator returns to step 887 to select the performance requirement for the next step. Otherwise, if the payout timing selected is end-of-period, the operator is queried as to whether there is another payout date and to define the applicable payout dates (894), until all payout dates are defined. After the payout periods are defined, or if the payout timing selected is point of sale, the operator has the option to enter codes used by the distributors to track product inventory in other management systems (896). The results from these criteria are stored as an SQL statement in the Term Definition Database 315 (step 897).

With the above information for proposed contract and its terms, the financial performance of each term can now be tested or projected (see process illustrated in FIGS. 11A–11B (step 898)) and the financial performance of the overall contract may be tested or projected (see process illustrated in FIGS. 12A–12B (step 899).

Marking Detailed Transactions

In an electronic environment wherein many purchases occur from many sources, and perhaps from many distributors, it is advantageous for suppliers to be able to predict the financial performance, or profitability, of their contracts. Accordingly, the present system and method, using criteria from the Term Definition Database (315), marks each transaction in the Transaction Detail Database with its unique entity codes, contact codes, contract code and term code. In doing so, the inventive method creates a new class of data or collection of data sets that ties the transaction to the various aspects of the contract (i.e., see FIG. 4). These contract-designed or contract-specific transaction data sets are then used to create unique business processes throughout the inventive systems and methods. For example, processes are employed to qualify, monitor, pay discounts, and reconcile the financial performance of the deal.

During the course of the contract, the customer agrees to provide data to the supplier to measure purchasing performance. These data are consolidated and normalized in transaction data sets as described in detail earlier. As transactions are loaded into the Transaction Detail Database, the computer executes a routine that employs the SQL term definitions for the Term Definition Database 315 to mark each term with its unique entity codes, contact codes, contract code and term code. The inventive method computes the summary totals for each term including the total unit count, total amount, supplier share for the period measured, and whether the term requirements were met or not. These data are loaded in the Term Performance Database 317.

In an exemplary subroutine for collecting current airline transactions and marking the transactions applicable to a specific contract, the databases illustrated in FIG. 3 are utilized. The result of the subroutine is an OD transaction table listing each OD as identified with the contract information it meets. From the contract term table, the time of purchase or end of term discount contract term ID and contract ID are applied to the OD rows which are to be marked. The query ID defines the OD rows which are to be counted towards the requirement (this value may be a percentage, count or monetary amount) of the contract term. The financial query ID defines OD rows which are to receive the specified discount of the contract term. It is noted that the query ID and financial query ID are separate and may define different OD rows.

Furthermore, only the OD rows which are within the begin (departure) and end dates of the contract term, and which are associated with a company or company clients specified by the contract term are marked. The subroutine begins by selecting from the contract table a contract that is active and which has contract begin and end dates that encompasses the subject date range for the ODs. Then, a temporary table is created to hold all transaction numbers (associated with ODs) which match the contract date and the ticket company and agency for the contract. Then, the ticket source company and the ticket customer company are identified based on the contract type (i.e., Agency, Agency Cluster, Alliance, Meeting or Corporate, or Corporate Cluster).

FIG. 9 illustrates, in simplified form, a process of collecting current detailed transactions and marking certain of the detailed transactions with the appropriate or designated customer, contract, and term codes, thereby generating a collection or set of contract-specific data sets. Initially, the system loads current normalized transactions into the Transaction Detail Database 307, and retrieves the appropriate term criteria from the Term Definition Database 315. This begins the comparison of each detail transaction row with the term criteria. First, the system retrieves a detailed transaction row (representing an individualized transaction) from the Transaction Detail Database (901), and compares or matches data in the detailed transaction row with the customer criteria associated with the contract term (903). If the customer criteria is not met, the system retrieves the next detailed transaction row (901). If the customer criteria is met, however, the system or program retrieves the next contract term from the Term Definition Database (905). Then, the program compares the market criteria (step 907), the supplier criteria (step 909), and the product criteria (step 911), which are associated with the contract term, with the corresponding data from the detailed transaction row. Similarly, the program compares the class(es) criteria (step 913) and the distributor(s) criteria (step 915) with the corresponding data from the detailed transaction row.

If the program finds a match on all of the term criteria (917), it then determines whether the term is a point of sale term (step 919), in which case, the system marks the transaction with the appropriate contract and term code (step 921). On the other hand, if the transaction is found to be an end-of-period transaction, the transaction is appropriately marked as such and identified with the contract and contract term codes (923). After either case, the system retrieves the discount amount from the Term Definition Database 315 (step 925) Then, the system computes and enters the undiscounted amount for the transaction (927).

At this point, the system inquires whether another transaction row (from the Transaction Detail Database) is available for marking (929). At the end of the process, all applicable transactions have been marked using SQL criteria as defined and stored in the Term Definition Database 315. These data are unique to the invention because, among other things, these have been normalized and automatically designated by contract and term.

Create Transaction Summary Database

FIGS. 10A–10B illustrates, in simplified form, a process of creating a Transaction Summary Database utilizing the unique transaction detail generated in the process illustrated by FIG. 5. For a given contract term, in a first step of the process, the system retrieves pre-contract or historical transactions by customer identification code from the Transaction Detail Database 307 (step 1001). The system then retrieves the appropriate contract term identifier and the appropriate select term statements from the Term Definition Database 315 (as identified by the term identifier) (step 1003).

Figure 20:
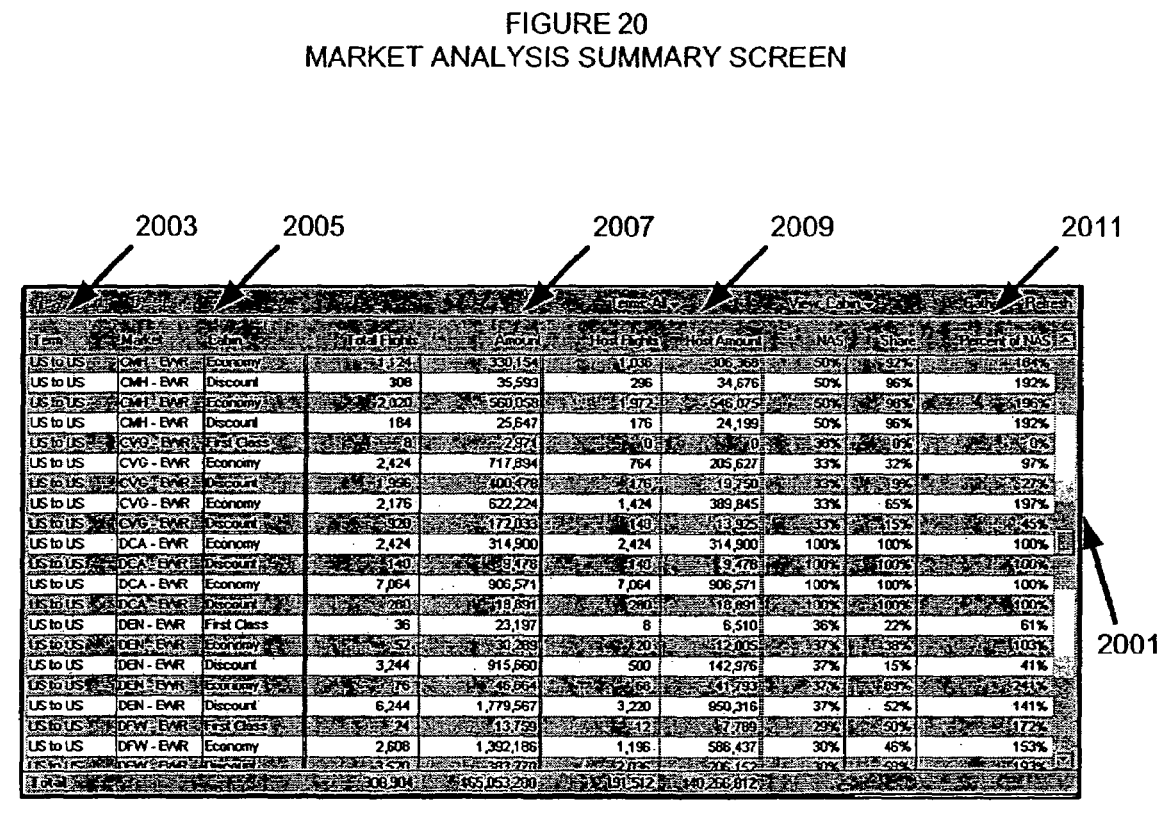

With this information, the system is then able to select transactions from the Transaction Detail Database which match the beginning and ending date of the sample (1005). Further, the system selects transactions by the designated distributor (1007). Using SQL criteria from the term definition, the system groups the transactions by market, supplier, product and class. With these groupings, the system computes preferred supplier(s) subtotal for transaction count, amount of spending, average transaction amount, and share of total business (1011). Thereafter, the system computes other supplier(s) subtotals for the same columns (1015). The results of these computations are stored in the Transaction Summary Database 309. FIG. 20 provides an example of a screen illustration of a market analysis summary generated by the above-described process.

The Transaction Summary Database from which the display module 2001 is derived is generated for a term entitled "US to US" as indicated in the term column 2003. The table displayed contains summary market rows 2003 identified by OD Pair and cabin type. These summary market rows 2003 have each been identified by the specified term stored in the Term Definition Database 315. Each market pair that qualifies for a term is grouped by Markets, Directional Pair, and Cabin 2005. The total count of flights and amount spent by all suppliers in the market is tallied 2007. The system then computes the flight counts, amount of spend, and share of flights for the designated supplier in the contract, the "host." 2009. Based on this data, the system can compute the variance between expected share, "NAS" and Actual Share 2011. These summary, historical data may now be used to forecast term performance (see FIG. 11) and forecast contract performance (see FIG. 12).

Forecast Term Performance

FIGS. 11A–11B illustrate, in simplified form, a process of generating the Term Performance Database 317 for a proposed contract term. In an initial step 1101, the system retrieves a customer's data from the Transaction Detail Database 307. Customer data from the Market Analysis Summary which match the proposed term requirements stored as an SQL statement are selected (1103). Next, purchasing totals are computed for all suppliers including product count, amount of spend, and average transaction price (1105). Next, purchasing totals are computed for the supplier for the designated contract, the "host" supplier, including product count, amount of spend, average transaction price, undiscounted amount, and its share of the products purchased (1107).

The system next retrieves the proposed term requirements for the contract term from the Term Definition Database. The system forecasts the customers estimated number of transactions, gross revenue, supplier's resulting share of business, displacement of existing non-discounted business, discount dilution due to lost revenue from the discount, and net profit (1109). The system then computes the same results without the discounted term to forecast financial results without the proposed deal (1111).

Financial minimum requirements for all terms are retrieved from the Term Rule Database 313 as previously defined in FIG. 6. The forecasted results of the term are compared to the term rules on such criteria as minimum number of transactions, net profit, supplier share of business, or other financial ratios (1115). The system informs the user whether the proposed terms meet the requirements of the term rules (1117). If the term fails, the user may elect to revise the term (1119) or over-ride the rule and accept the term. Once the term is accepted, the financial results of the forecast are stored in the Term Definition Database (1123).

A screen print of the results of the financial analysis of the proposed term is displayed in the Financial Terms tab in FIG. 21C. The term name, date range, and distributor compensation method are identified in the under the term column 2119. The requirement for the term, including payment method, requirement type and amount, and payment type and amount are defined 2121. The financial projections for the term may be calculated from the Transactions Summary Database 309 (FIG. 10). The analysis compares results for no discount, current discount, and proposed discount 2123. The financial results are tested for minimum Profitability, Share, and Volume (2121) to determine if these meet the rules in the Term Rule Database 313.

One advantage provided by the present system and method is that it enables suppliers to measure customer contract performance by user-defined periods such as by month, quarter, and annually. Based upon the Term Performance Database produced from data derived from the Transaction Detail Database, the inventive method computes an analysis that provides the period average, contract-to-date average, and compares these amounts with the performance requirement. The system then alerts the user of any non-performing term; that is, any term that is not meeting the requirements stated of the contract.

Forecast Contract Performance

FIG. 12A–12B illustrates, in simplified form, a method for forecasting contract performance. This is accomplished by analyzing the overall financial results of each of the combined individual terms. The system first retrieves the forecast results of each term from the Term Definition Database 315 (1201). Term totals are computed for all suppliers including product count, amount of spend, and average transaction price (1203). Term totals are then computed for the supplier for the designated contract, the "host" supplier, including product count, amount of spend, average transaction price, undiscounted amount, and its share of the products purchased (1205).

Using the term totals, the system makes two sets of forecasts. The System forecasts the customer's estimated number of transactions, gross revenue, supplier's resulting share of business, displacement of existing non-discounted business, discount dilution due to lost revenue from the discount, and net profit (1207). The system also computes the same results without the discounted term to forecast financial results without the proposed deal (1209).

Financial minimum requirements for the contract are retrieved from the Term Rule Database 313 (as previously illustrated by way of FIG. 6) in step 1211. The forecasted results of the contract are compared to the contract rules on such criteria as minimum number of transactions, net profit, supplier share of business, or other financial ratios (1213).

The system then informs the user whether the proposed contract meets the requirements of the contract rules (1215). If the contract fails, the user may elect to revise the contract terms (1219) and return to the term definition process (see FIG. 6) or over-ride the rule and accept the contract. Once the term is accepted, the financial results of the forecast are stored in the Term Definition Database (1221).

Figure 22:
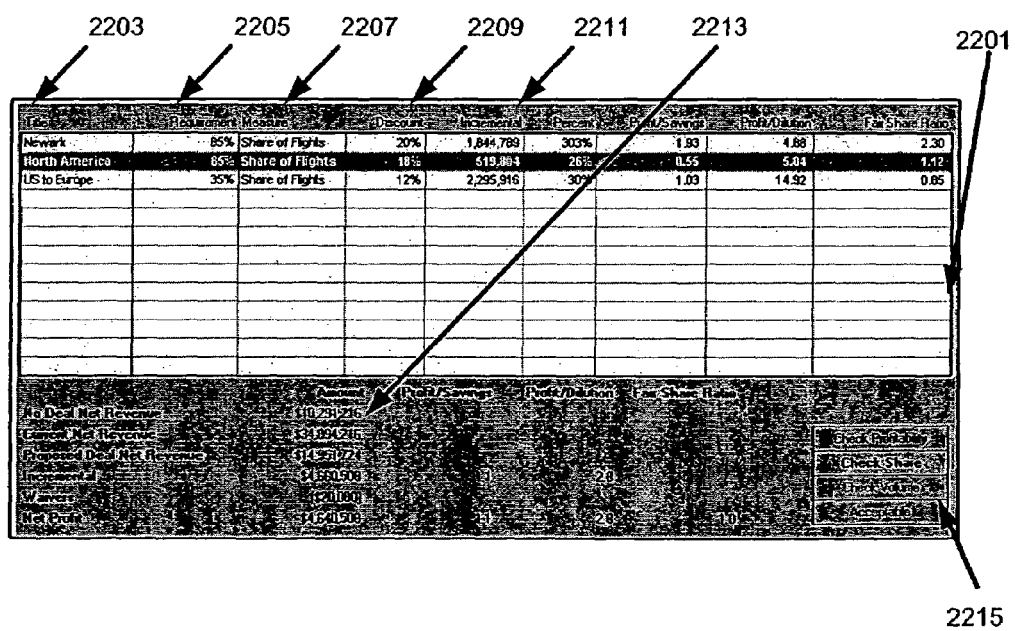
FIG. 22 is an illustration of the financial forecast for terms and a contract; according to the invention.

A screen print 220 of the results of a financial analysis of a proposed contract is displayed in FIG. 22. Each term is identified under a Term title column 2201. Columns for the requirement for the term (2205) and measurement method (2707) are provided. Also, a financial projection Column 2211 is made for each term including Incremental Revenue and Percent. Detailed financial results and ratios are displayed for the contract in another area 2213 of the screen. The module also provides an indication box 2215 for the financial results of testing on minimum Profitability, Share, and Volume 2215 to determine if they meet the rules in the Term Rule Database 313.

One advantage provided by the present system and method is that it enables suppliers to measure customer contract performance by user-defined periods such as by month, quarter, and annually. Based upon the Term Performance Database produced from data derived from the Transaction Detail Database, the inventive method computes an analysis that provides the period average, contract-to-date average, and compares these amounts with the performance requirement. The system then alerts the user of any non-performing term; that is, any term that is not meeting the requirements stated of the contract.

Produce and Distribute Contracts and Terms

Figure 13:
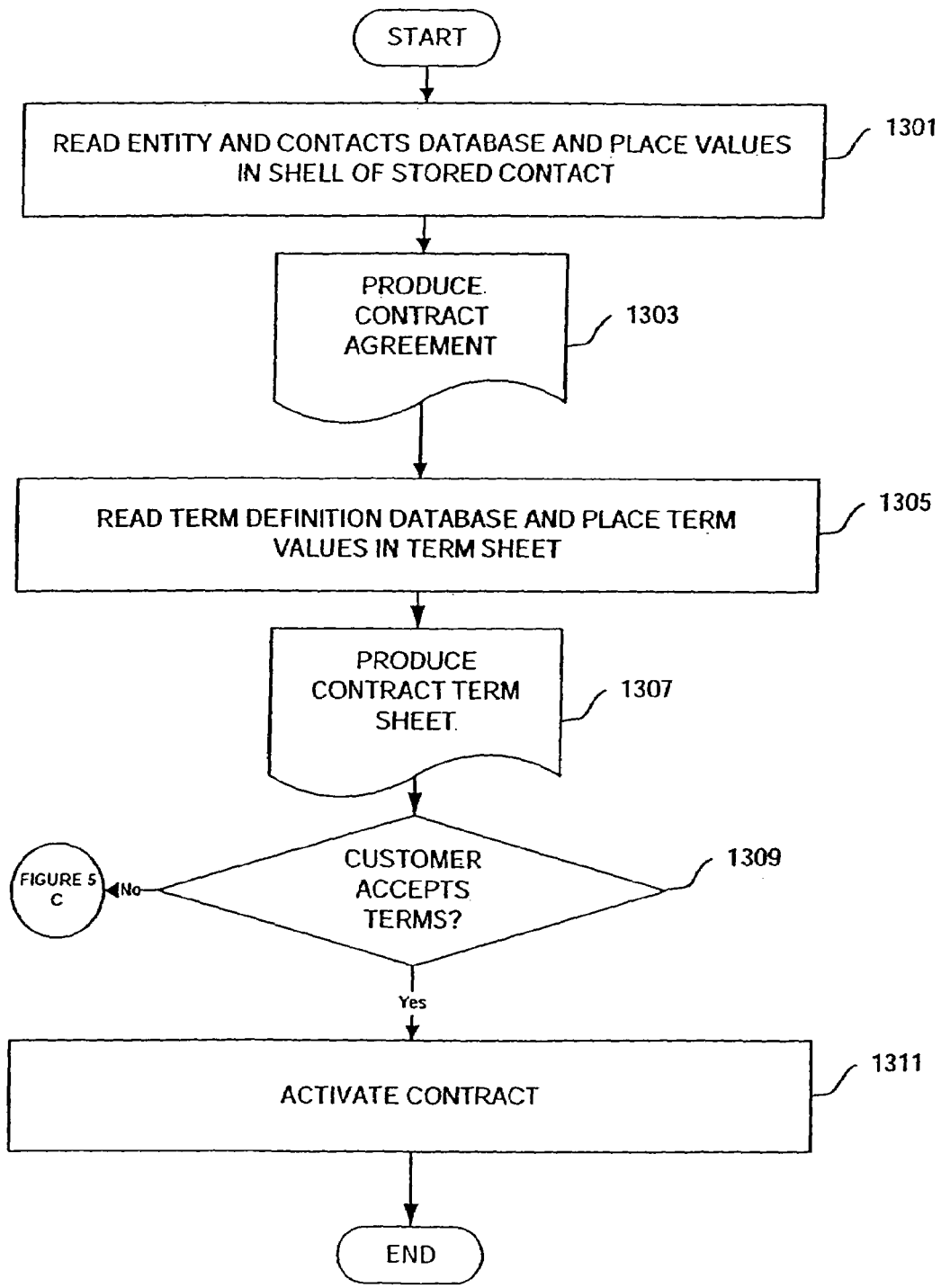
FIGS. 13 is a simplified flow chart illustrating a method of producing and distributing contract performance information, according to the invention.

The flowchart diagram in FIG. 13 illustrates preferred procedural steps for the production and distribution of performance information. The process begins with the step 1301 of gathering information from the Entity Database 303 and Contact Database 305 and placing these in a contract shell (such as a word processor template file). The inventive system then produces a paper copy of the contract agreement (1303). In a subsequent step 1305, the term values are gathered from the Term Definition Database 315, and then written into the contract term sheet (1307). A copy of the contract and terms sheet are presented to the customer who may decide to renegotiate agreement or accept the terms of the agreement (1309). If the agreement is renegotiated, the term definition process begins again FIG. 8. If the agreement is accepted, the contracted is activated in the system (1311).

Audit Discounted Transactions

Suppliers run the risk of distributors applying the discount from one customer to an unauthorized customer. The system protects against the abuse of discounts by auditing each transaction to determine if the discount has been applied to the correct customer, discount, and product. The audit begins by retrieving a transaction and the code of the distributor (1401). The system reads the pertinent data the distributor and customer to the approved terms by contract, supplier, market, product, and class (1403). The system then determines if the transaction was sold by the approved distributor (step 1406), to the approved customer (step 1407), for the correct market (step 1409), for the correct product (step 1411), with the correct discount code (1413), and if the discount take was correct (1415). If any of these criteria fail, the system marks the record with the corresponding audit number and indicates the correct term code and discount amount (1419).

Measure Actual Contract Performance

Figure 15A:
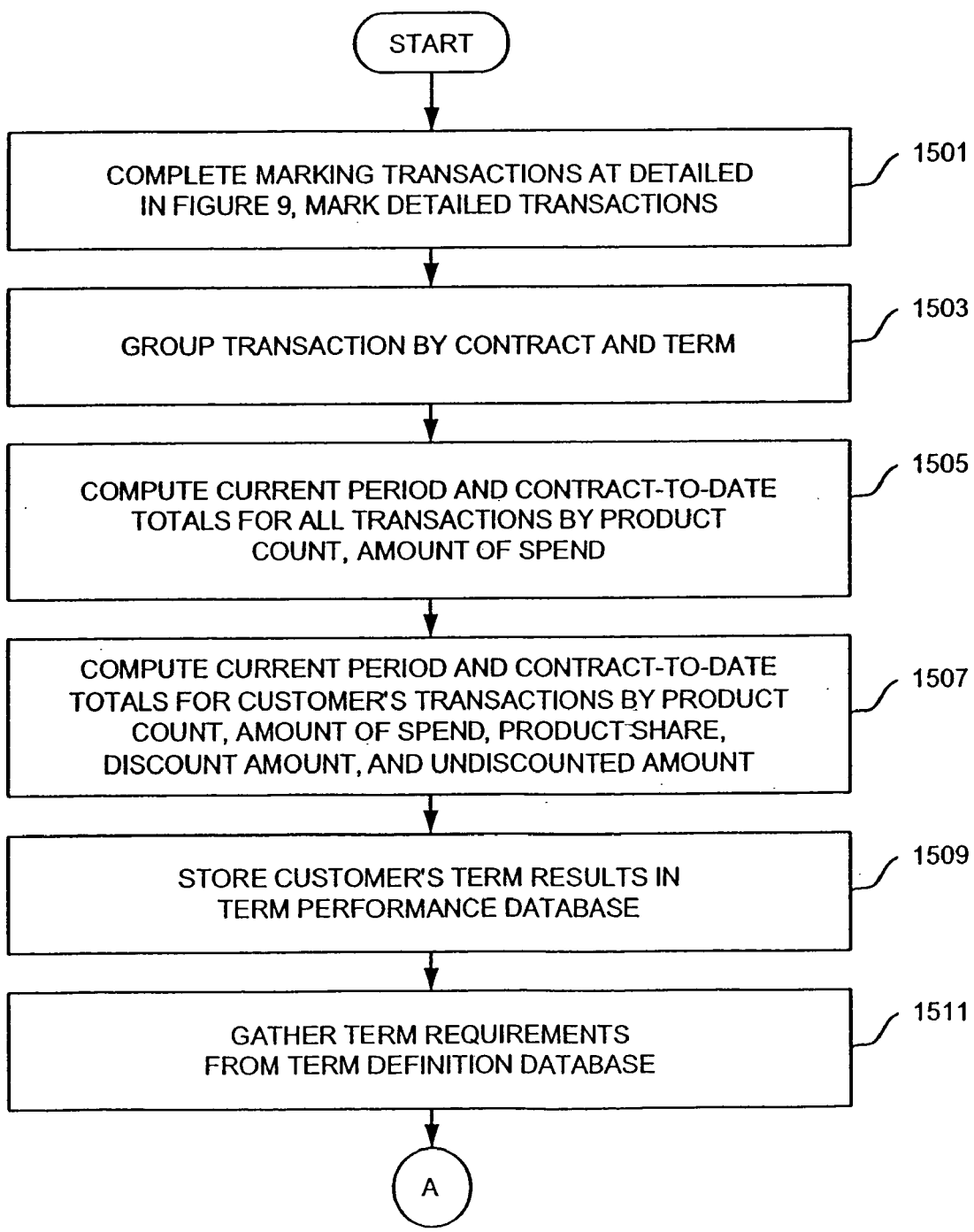
FIG. 15 is a simplified flow chart illustrating a process of the measurement of actual contract performance, according to the invention.

Once supplier and customer have agreed to the contract, on-going measurement of performance is critical to the success of the deal. FIGS. 15A–15B illustrate, in simplified form, how the inventive system monitors and may measure actual contract performance. The process begins with the detailed transactions being identified and marked by customer, contract, and term as described in FIG. 9 (step 1501). Performance is tracked by contract period, such as by month, and from contract begin date to the current date. All of a customer's transactions are grouped by contract and term (1503). This collection includes transactions from the contracted supplier and non-contracted suppliers and provide grand totals for product counts and amount of spend (expenditure) which are essential for computing share of business (1505). The system next computes the customer's purchasing figures including count of products purchased, amount of spend, designated supplier's share of products and spend, the discounted amount for purchases, and the undiscounted amount which will be used to compute the amount of savings provided to the customer (1507). The results of the computations are stored in summary fashion in the Term Performance Database 317 (1509).

The system next gathers the term requirements from the Term Definition Database 315 (step 1511). Using those term requirements, the system tests the term requirements against the actual summary results for the term stored in the Term Performance Database 317 (step 1513). If the contract to date summary results indicate that the term has not met the term requirements, performance for the term for the period is marked as not fulfilling in the Term Performance Database (157). If the contract to date summary results indicate that the term has met the term requirements, performance for the term for the period is marked as fulfilling in the Term Performance Database (1519).

The system then gathers the contact information for the parties of the contract from the Entity Database 303 and Contacts Database 305 (step 1521). An electronic message, such as an email or fax, can then be prepared and sent to inform the parties of the contact status (1523).

The Term Performance Database 317 is the major outcome of the above-described process. This summary level database may be used for quickly monitoring and evaluating term performance, and for the production of reports and financial analysis.

Reconcile Final Contract Performance

At the end of the contract, the final performance of the terms is computed. The inventive system and method facilitates the determination of which terms are fulfilled and which terms failed and, additionally, provides variance and financial impact. Final financial performance of each term may be further compared to a term summary prediction model. In this way, a recommendation as to how future contracts can be improved for suppliers and customers may be provided. Results may also be compared to the goals stored in Sales Goal Database 19 to measure sales performance. Results of this analysis are distributed electronically to the contacts identified and recorded in the Contacts Database 305.

FIG. 16 illustrates preferred procedural steps for the final reconciliation of the terms and contract. The process begins with the operator or program retrieving end of period results for the contract terms and the contract; from the Term Performance Database 317 (step 1101). Also, the term requirements for the particular terms are retrieved from the Term Definition Database 315 (step 1103). The results from the Term Requirements Database and the Term Performance Database can now be compared. In particular, the inventive system computes the variance between the term results and the term requirements (1605), for such information as transaction count, transaction amount, percent share, gross profit and net profit. Based upon this comparison, the final status of the contract is then marked (1607). In this step 1607, the contract may be marked with the status of FULFILLED, PARTIALLY FULFILLED OR FAILED TO FULFILL. Next, the contract results are marked (1609) in the Sales Goal Database for the measurement of internal sales, and the final contract reconciliation reports are produced (1611). Reconciliation reports are then distributed to entities in accordance with the information from the Entity Database and the Contact Database (1613).

Payout Discount

As a contract period comes to a close, the system enables a supplier to reconcile a customer's performance with the contract requirements and prepare the payout of the discount. For example, airline customers take a discount either at the point-of-sale when a ticket is purchased or when the airline pays on the deal at the end of a designated term. The inventive system and method provides for confirmation whether a term requirement has been met, the amount of discount that has been taken at the point-of-sale, or the amount that is due to the customer at the end of the term. FIG. 17 illustrates preferred procedural steps for this process.

The process begins by determining whether the term is performing (1701). The system is able to do this by examining whether the term is marked in the Term Performance Database 317 as performing or failing (see marking step 903). If the term is performing, the step 1707 of payment authorization is conducted. If the term in not performing, the term may be modified or canceled in a subsequent step 1703. The inventive method also generates payment documentation (1707) and records payments in a Payment Database (step 1709). Contract performance information is produced from the Term Performance Database 317 and is distributed to the contacts identified in the Contact Database 305. These reports provide the performance status of each term and may be distributed to both airline and customer contacts electronically and automatically.

Manage Sales Goals

Suppliers measure the sales staff performance against predetermined goals established for a period (such as a year). Goals may represent the sum production of all contracts managed by that sales person. By totaling the summary results of the contracts assigned to a sales person, the inventive system determines the fulfillment status of a sales person's contracts, whether or not their goals have been attained, and the variance to goal. Similarly, suppliers can measure production and contact results by region, contract type, or industry. For purposes of example, FIG. 18 describes in simplified form the process used to manage sales person's goals.

A process for providing the above begins by identifying the sales person (1801). The identified sales person is matched to the contracts for which he or she is responsible (1803). The system then retrieves the performance results from the Term Performance Database 317 (step 1805) and retrieves the sales goals for the sales person from the Sales Goal Database 319 (step 1807), then computes the variance between actual and goal (1809). The results of this comparison are stored in the Sales Goal Database 319 (step 1811). Once the data have been stored, reports for monitoring past performance and projecting future goals are run (1813).

Exemplary Database Tables

FIGS. 3 and 4A–4B illustrate an exemplary set of database tables generated by the system. These tables are used in the software application of the inventive method for the airlines industry. In one application, the tables are used in analyzing a proposed contract between an airline (supplier entity) and its clients (customer entity). These tables and the processes which employ and/or generate these tables are described in more detail below in the description of a software application in the airline industry.

| Table Name | Description |
| --- | --- |
| Entity Database 303 | The contracting entities including airlines, customers, and travel agencies. Data includes such elements as business name, legal name, and addresses. |
| Contact Database 305 | The individuals responsible for the contracted relationship between the customer and airline. |
| Transaction Detail Database 307 | Detailed, normalized transactions, or flights, sold by the airline and purchased by the company as a condition of contracting. |
| Transaction Summary Database 309 | Summarized data derived from the Transaction Detail Database, identified by contract term in the Contract Registry Database and Term Definition Database, reflecting purchasing totals by contract term. |
| Contract Registry Database 311 | Data associating the entities and parties in the contracted relationship. |
| Term Rule Database 313 | The supplier-defined rules for the judging the minimum financial performance of terms including count of products, amount of spend, or share of business. Rules are stored using SQL language to test the acceptability of term definition. |
| Term Definition Database 315 | The terms of contract including products to be discounted, performance measures and type, and discount type and amount. Terms are stored in SQL to be used to identify and mark transactions as they are loaded in the Detail Transaction Database. |
| Term Definition Database 317 | A summary database that includes totals for flights, amount of spend, and share by customer. The Term Performance Database also tracks whether or not a term is performing. |
| Sales Goal Database 319 | The sales goals established for the airline's sales persons stored as either a number of products, amount of spend, or share performance. |

The Entity Database 303 and Contact Database 305 work together to store information on the business entities, such as customer, airlines, or agencies, and the individuals that participate in contracting relationships. In an airline-contracting environment, entities would include corporate customers, a contracting airline, often an airline alliance partner, and one or more travel agencies. Entities can change roles. For example, an agency serving as a distributor for one customer may also be a direct customer of the airline. This is why the database permits entities to change their role in any given contracting situation. Contacts are associated to the entities for which they work, such as a corporate customer or an airline employee. Many contacts may be associated with any business entity. Contacts may also move between entities if their job changes. By associating contacts and entities dynamically, the system creates a history of the business relationship with both business entities and the contacts that work for them.

Detail transaction data are derived from many sources including travel agencies, credit card providers, or customers. Since airline data arrive in different formats, they are normalized into a standard origin and destination structure. For example, a two-segment flight originating in Albuquerque and connecting in Houston and arriving in New York La Guardia airport would be written as one origin and destination (ABQ-IAH-LGA). Errors that are common in airline data are corrected to ensure reliability. Last, the true amount paid for the destinations is computed from the segment detail and verified with actual the actual ticket amount. These data form the foundation of the Transaction Detail Database 307.

Once a contract has been established between an airline and its customer, transactions are marked by customer, contract, and contract term as they are loaded FIG. 9A–9C. Customer identification in the airline industry is particularly difficult since travel agencies that do not disclose their customers account numbers. The system maintains look-up tables matching agency account numbers to the corporate identity. Once the company has been identified, the system uses the Term Definition Database 315 to determine if the transaction qualifies for a contract. Using the structure query language description of the term, each transaction is processed. Where the transaction matches the term definition, it is market by contract and term code. These new, detailed transactional data, normalized in structure and designated by contract and term, are the foundation of the system.

The Transaction Detail Database includes, but is not limited to, the following data elements:

| Name | Description |
| --- | --- |
| Transaction Number | The number of the transaction. |
| OD1 | The first ODPair in the itinerary. |
| OD2 | The second ODPair in the itinerary. |
| Uni1 | The first directional OD pair. |
| Uni2 | The second directional OD pair. |
| Carrier Code | The industry standard code for the airline. |
| Service Class | The class of service flown. |
| Fare Basis Code | The carrier's code for the flight. |
| Ticket Designator | The unique code often put in by travel agents to identify a contracted fare. |
| Cabin | The plain language identification of the cabin type: Supersonic, First, Business, Economy, or Discount |
| Depart Date and Time | The departure date and time of the flight. |
| Arrive Date and Time | The arrival date and time. |
| OD Amount | The gross amount paid by the passenger for the flight, including taxes and surcharges. |
| Net OD Amount | The net amount paid by the passenger for the flight, excluding taxes and surcharges. |
| Distance | The point to point distance flown. |
| Elapsed Minutes | The point to point time for the flight. |
| Cross Boarder | Identifies transactions that contain flights that cross country boarders. |
| Company ID | The unique number given to designate the customer. |
| Contract ID | The unique number given to designate the contract. |

| Name | Description |
| --- | --- |
| Term ID | The unique number given to designate the Term of the contract. |
| Discount | The amount of discount applied to the transaction. |

The Transaction Summary Database 309 contains summary transaction data derived from the Transaction Detail Database above. Summary data are grouped by market, cabin, and class of service and are used for an analysis performed for a contract (i.e., used in qualifying or otherwise analyzing the performance of a contract). In this particular application, there is one market analysis per contract and thus one set of definitions for each contract. The table includes columns for the contract ID, the analysis begin date, the analysis end date, and the top number of markets which are included in the analysis. The supplier often limits the contract analysis to certain of the customer's markets or top markets. Sometimes, only these top markets are used in the analysis. Specific discounts are determined for these top markets while a general discount is applied to all other markets.

A Transaction Summary Database contains a summary of origin and destination rows which are those detailed transactions applicable to or identified with the proposed contract (see e.g. FIG. 20). After the top number of markets for a customer is identified, this table is generated for those markets. Among other information, this table contains rows of OD Pairs and Directional Pairs and includes the number of flights, amount, and share of flights for the designated carrier or alliance and other carriers. With this data available, terms may be applied to groups of markets and a forecast can be made using the proposed terms and to judge the financial results of the contract.

Other columns of information provided in Transaction Summary Database include sums or totals for all ODs for the company of the contract and in the date range of the market analysis. Information includes sum of the net OD accounts (system flights), sum of the OD amount (system amount), sum of the net OD count for ODs flown by the contracting carrier or carriers, sum of the undiscounted OD amounts, amount paid out in back end discounts, and front end and back end carrying costs and dilution costs. Other columns of information include market share, weighted average manage share, commission percentage, override percentage, carrying costs, high and low fares, and other financial information.

The Data Transaction Summary Database includes, but is not limited to, the following data elements:

| Name | Description |
| --- | --- |
| OD1 | The ODPair1 that this result is computed for. |
| OD2 | The ODPair2 that this result is computed for. |
| Uni1 | The UniPair1 that this result is computed for |
| Uni2 | The UniPair2 that this result is computed for |
| Cabin ID | The ID of the cabin type that this result is computed for |
| Service Class | The class of service that this result is computed for |
| Front End Term ID | The term ID assigned if the row meets the requirement or discount query criteria for a front end (time of ticketing) term. Once a term ID is assigned, it cannot be overwritten by a subsequently defined term. If the term ID is zero, then no term is assigned. |
| Front End is Discounted | Flag determining whether the discount criteria or the requirement criteria for the front end contract term is met. |
| Back End Term ID | The term ID assigned if the rule meets the requirement or discount query criteria for a back end term. |
| Back End is Discounted | Flag determining whether the row meets the discount criteria or the requirement criteria for the back end contract term. |
| Market Type Code | The unique, user-defined code that enables suppliers to group markets for the purpose of analysis. |

Thus, the Transaction Summary Database provides a collection of transactions (ODs) applicable to a current or proposed contract and its contract terms. The table also includes all the pertinent attributes of those transactions. Using some of these attributes as input, the performance of the proposed or current contract may be analyzed and various performance reports generated. FIG. 19 depicts a software display module 1901 providing some the information in the Market Analysis Summary table.

The Contract Registry Database 311 contains information on all the contracts between the supplier and its customers. The Contract Registry Database includes, but is not limited to, the following data elements.

| Column Name | Description |
| --- | --- |
| Contract ID | The unique system generated ID for the contract. |
| Company ID | ID identifying the company to which the contract applies. |
| Contract Type ID | ID of the contract type, e.g., agency, agency cluster, alliance, corporate, corporate cluster, and meeting. |
| Contract Status ID | E.g., active, canceled, pending. |
| Contract Begin Date | Beginning date for a valid contract. |
| Contract End Date | End date for a valid contract. |

Thus, given a contract ID, the company, contract type, status, and begin and end dates may be associated the Contract table.

Airlines often permit field sales persons to define their own contract terms. When this occurs, contracting officers require a means to ensure that the deal falls within acceptable parameters. The application establishes these parameters within the Term Rule Database 311. Rules may be established for any financial or performance criteria measured in the data. For example, performance may be measured by a required total number of flights within a market, or by a required amount of expenditure, or a required share of business. Performance ratios may also be entered, such as profitability, dilution, or fair market share. As terms are modeled using historical data summarized in the Transaction Summary Database, rules from the Term Rule Database are applied. Users are notified when the parameters of any term fail the test of a rule.

The Term Definition Database 315 also includes columns which identify whether the contract is net of commission, net of override, and/or a net of credit card commission. Whenever any of these flags are triggered during a contract analysis, a payment or deduction to a transaction amount (or contract amount) is usually effected thereby decreasing the totals for that contract. The database also contains information of the payout schedule table for back end contract terms. Back end deals may be paid out incrementally throughout the contract. The columns in this database table include contract ID, contract term ID, payment date, pay period start date, requirement achieved for the pay period, actual discount percentage paid for the period, and payment amount. Where back-end payouts are based upon performance steps, the Term Definition Database contains data these steps for back end contract terms. Back end deals may pay different amounts based on the share that is received. This database includes columns for contract ID, contract term ID, step requirement, and step discount. Note that the step requirement of value may be a percentage, account or dollar amount, depending on the requirement measure ID of the term. Similarly, the step discount may be a percent or amount of discount per ticket for this step. The Data Definition Database includes, but is not limited to, the following data elements.

| Column Name | Description |
| --- | --- |
| Contract ID | System generated unique ID for this particular contract. |
| Contract Term ID | System generated unique ID for this particular term of contract. |
| Term Begin Date | Starting Date for which this particular term is effective. This date is used when marketing ODs. |
| Term End Date | The ending date that this term is effective. This date is sued when marketing ODs. |
| Discount Type ID | The ID of the discount type for this term, e.g., front end (time of ticketing) or back end. |
| Discount Measure ID | The unique ID for this measure, e.g., by amount, no discount, one-way base fare, or percent. |
| Discount | Percent or amount of discount per ticket for this term. |
| Requirement Measure ID | The ID of the measure for this term, e.g., by amount, flight, no requirement, share of amounts, or share of flights. |
| Requirement | The requirement value for this term. This value may be a percentage, a count or dollar amount, depending on the measure ID. |
| Query ID | The ID of the criteria for the query which defines the OD rows which count towards the requirement of the contract term. The corresponding SQL is stored in the term definition database. These rows are marked with the contract term ID. |
| Financial Query ID | The ID of the criteria for the query which defines OD rows to receive the discount of the contract term. This query is stored in the Term Definition Database. These rows are marked with the contract term ID. |

Upon the implementation of a contract, transactions are marked by company, contract, and term in the Transaction Detail Database. From these data, a summary database is created, the Term Performance Database 317, that is used to monitor the performance of contracts. Grouping the data by term within periods, the system compiles totals required for the measurement of contract performance. These data include total flights, total amount of spend for all carriers. Total flights, amount, share, discounted and undiscounted amounts are then determined for the contracted carrier. Comparing these totals to the requirements stored in the Term Definition Database, the system determines whether or not the term or contract is fulfilling. The data elements in the Term Performance Database includes, but is not limited to, the following data elements.

| Column Name | Description |
| --- | --- |
| Contract ID | System generated unique ID for this particular contract. |
| Contract Term ID | System generated unique ID for this particular term of contract. |
| Contract Period | Measurement period within the contract, such as a month or quarter. |
| System Flights | Total number of flights for all suppliers that meet the term criteria. |
| System Amount | Total number of spend for all suppliers that meet the term criteria. |
| Host Flights | Total number of flights for the host supplier that meet the term criteria. |
| Host Amount | Total for the host suppliers that meet the term criteria. |
| Host Flights Share | Share of host flight of total flights. |
| Host Flight Amount | Share of host flights amount. |
| Status | Status of contract performance for the period; that is, whether the contract is fulfilling or not fulfilling. |

The Sales Goal Database 319 stores sales goals for an airline's sales staff. These goals may be expressed as a number of flights, amount of spend, or share of business, or any combination of these. Companies are assigned to sales persons to manage contracted relationships. At the end of a performance period, the actual production of the contracts is compared to the sales-person's goals to measure performance. Since sales goals are stored for any period, performance may be measured year over year or projected for an upcoming year.

While these nine tables server as the foundation of the inventive system, other tables are required for look-ups, indexes, and scheduling. All data are linked to provide an application for the comprehensive management of contracted relationships. An example of an airline application follows.

More on Exemplary Airline Application

The present description now provides more specific examples of applications of various portions of the inventive system and method in the airlines industry is provided. The various processes are implemented by a system and software operable by an operator-employee of the airline carrier or a distributor, and used to analyze proposed and current contracts and to generate reports therefor. The software application preferably includes several modules which are user-interactive to generate and analyze proposed contract and terms. FIGS. 19–22 provide screen shot examples of these.

FIG. 19, provides an illustration of a normalized detailed transaction 1901. All of the data provided must be constructed from multiple data sources including travel agency invoice data and airline segment data. Ticket level data are typically constructed primarily from travel agency invoice data 1903. This data also provides the information to identify the customer 1905. While customers may have many agency account numbers, the system groups these many accounts into one, discrete customer number. One number is essential for purposes of mapping a customer to a designated contract. The bottom half of the record includes an example of one origin and destination 1907. These data are derived from airline segment data. Segments are the individual flights a passenger flies to reach a destination. In the example, the passenger departs from Albuquerque, connects in Houston, and arrives in Atlanta. While the passenger flew two segments, he actually bought one origin and destination, ABQ-HOU-ATL. Normalized data in the origin and destination data format is essential because it reflects the product the customer bought under the contracted relationship FIG. 7A–7C. Once data that identifies the product has been created, the data may be tested to determine if it qualifies for a contracted discount. Using SQL criteria stored in the Term Definition Database 315, each origin and destination loaded into the system is tested to see if it qualifies for a term. If it does, the transaction is marked by contract and term 1909, as described in the data marking procedure FIG. 9A–9C. Last, the system determines the true origin and destination value by assessing, and if needed correcting, the segment amounts to ensure that the segments and all other charges equal the full ticket amount. This step provides the true origin and destination cost 1911 which is essential to determine the amount of discount.

FIG. 20 provides an illustration of the Market Analysis Summary module 2001. Prior to developing the terms of a contract, the user polls the Transaction Detail Database 31 to create a Market Analysis Summary table. These data include a column in which the term name will be applied (2003), the Market (2005), the total Flights and Amount for all carriers in the market (2007), the Host's Flights and Amount (2009), and the Host's share of businesses (2011). As terms are constructed, terms are applied to the Market Analysis Summary, and the Term name is written into the Term name column. Terms are individually added until all markets that the airline wants to discount are committed. Data from the Market Analysis Summary is used to forecast the financial performance of the term.

In an airline industry software application, the inventive system and method enables the user to define individual contract terms which provide for discounts to be paid for tickets booked to specified destinations. The definition of individual contract terms is performed in the Term Definition Module of the software (see FIG. 21A–21C). The system process is described in detail in FIG. 8A–8I.

From a list of term criteria, the user or operator first selects the criteria for the Discount 2103. By selecting market and cabin criteria, the system displays the appropriate form for the user to fill in the discount requirements 2105. Each term comprises different combinations or carriers, markets, and cabin. The results of the discount requirements are displayed in plain language in the Term column 2107. The system then converts the criteria into a structured query language format stored in the Term Definition Database 315 that is used by the computer for identifying and marking flights that apply to the term. The discount requirements are stored as SQL statements that will be applied to the historical data stored in the Transaction Summary Database 309 to forecast the term's financial performance, and to mark new transactions loaded into the Transaction Detail Database, as they are loaded into the system. The use of the computer to identify these terms eliminates the requirement for manual input of unique supplier codes and also enables the matching of the term for other carriers.

In a next stage, the user defines the Measure-on 2109 requirements, or what the customer is expected to produce for the discount defined above. In consideration of these commitments, the airline agrees to pay a discount. In the inventive method, the user defines the discount as a percent off of the actual fare, a monetary discount per ticket, or a designated flat fare. Discounts to be paid to the customer are also defined by way of the Term Definition Module. By selecting the form of payment, either at the point of sale or end of contract period, the user may then define the type and amount of discount and performance requirement. At the completion of the Measure-on screen, the results are stored as SQL statements in the Term Definition Database 315.

In a subsequent stage, the user selects the financial requirements of the term. FIG. 21C depicts the Term Definition Mode 2119 and the Financial Requirements selection mode 2121. Selection windows provide for selection of the various term attributes, including term period, agency compensation, and discount parameters. A forecast of the term's performance is displayed in window 2125. The process is described in detail in FIG. 11A–11B. Once the financial forecast is complete, a box 2123 displays alerts if the term falls below the required minimums established in the Term Rule Database 313 as described in FIG. 6. By modifying requirements for share and levels of discount, the operator can adjust the financial performance of the term until it satisfies the Term Rule requirements.

Once the individual terms have been defined, the system produces a financial forecast of the contract in its entirety in the Contract Performance screen 2201. Each term is identified by name 2203, requirement 2205, method of performance measurement 2207, and the discount to be provided 2209. Based upon the financial results stored for each term in the Term Definition Database 315, the system forecasts the incremental revenue above current revenue for the term 2211 and its percentage. Ratios judge the financial benefit of the term include profit/dilution and fair share ratio. The system displays a forecast for the overall financial performance of the contract including No Deal Revenue, Current Revenue, and Proposed New Revenue. Based upon these figures, the system calculates the Net Profit of the deal 2213. The overall worthiness of the contract is tested with criteria established in the Term Rule Database 2215. Where profitability, share, or volume fails a test, the system displays an alert. Based upon actual, normalized data, the system has provided a forecast of the financial performance of each term and the overall contract.

After the contract has been implemented, the inventive system uses data from the Transaction Detail Database 307 to construct the Term Performance Database 317 described in step FIG. 15A–15B. The operator my run reports that display the actual financial performance of a contract at any time during or after the contract period 2301. The report displays by Company, Contract, and term the financial results of the contract 2303. The Host Flights and Market Share columns reveal the number of flights and the Host's share of the total flights 2305; the Host Net Amount and Market Share reveal how much has been spent and the Host's share of the total expense 2307. The Measure column describes the method of measuring the customer's performance and the requirement 2311. The actual performance compared to the requirement provides the percentage Variance between actual and requirement 2313. Based upon these results, the system determines whether or not the term has been fulfilled or not with a "yes" or "no" designation 2315.

The overall results of the contract may also be assessed using the sum of the term requirements. The Minimum flights amount is computed and compared to the actual Contract Performance 2317. The variance between the two described by flights displays the overage or underage of performance 2319. Likewise, the difference between the minimum amount and actual amount displays the variance by amount. In the final analysis, using the variance of flights and amount, the system determines whether or not the contract is fulfilling 2323.

The foregoing description is presented for purposes of illustration and is not intended to limit the invention to the forms disclosed herein. Although the description is primarily directed to an application of the inventive system and method to the airline industry, the system and method may be employed in other common carrier applications and in other industries. For example, the system and method may be adapted for application in other volume buying contractual relationships and with respect to other services and/or products (e.g., purchase of raw construction materials or utilities). Variations and modifications commensurate with the above teachings, and the skill or knowledge of the relevant art, are within the scope of the invention. The embodiments described herein are further intended to explain the best mode known for practicing the invention (i.e., as applied to the carrier industry) and to enable others skilled in the art to utilize the invention in such, or other, embodiments and with various modifications required by the particular applications or uses of the present invention. It is intended that the claims be construed to include alternative embodiments to the extent that is permitted by prior art and within the spirit of the invention.

What is claimed is:

1. A method of managing purchasing contracts between supplier entities for a common carrier and customer entities for the purchase of ticket products, said method comprising the steps of:

generating a ticket purchasing contract between a supplier entity and a customer entity, the purchasing contract being applicable to a plurality of contracted purchasing transactions that effect the purchase, by the customer entity, of a ticket on the common carrier for travel (ticketing transactions), the transaction being effected, at least partially, through a computerized system, said generating step including defining a plurality of contract terms for the purchasing contract, each contract term being defined by a plurality of term attributes, wherein a contract term defines a purchasing obligation of the customer entity, storing a term data set of the term attributes (term attributes data set) associated with each contract term in a computer database, collecting historical transaction data sets representing ticketing transactions by the customer entity;

identifying a proposed contract term having a set of term attributes;

identifying historical ticketing transaction data sets applicable to the proposed contract term by comparing contract term attributes with at least a portion of each historical ticketing transaction data set;

qualifying a contract term by, forecasting the performance of the proposed contract term using, as input, at least a portion of each identified historical ticketing transaction data set, and qualifying the proposed contract term based, at least partly, on the forecasted performance;

assigning the contract term to a proposed contract; and evaluating the proposed contract with a plurality of qualified contract terms;

collecting sets of ticketing transaction data for a plurality of historical ticketing transactions;

storing the ticketing transaction data in at least one computer database;

identifying, among the population of stored ticketing transaction data sets, a plurality of the stored sets of transaction ticketing data as relating to a ticketing transaction under the purchasing contract (contract transaction data sets), by comparing the stored ticketing transaction data with term attributes of a contract term including executing a computer program to identify historical ticketing transactions as a contract transaction by comparing transaction data sets with the term attributes data set for a contract term, whereby the historical ticketing transaction is identified as a contract transaction when the transaction data set is identified with the term attributes of the contract term; and generating a collection of contract transaction data sets by associating the transaction data set of each identified contract transaction with each term data set of a contract term with which the transaction is identified.

2. The method of claim 1, further comprising the step of executing a computer program to measure the performance of a contract term, whereby the computer program inputs data from at least one contract transaction data sets associated with the contract term.

3. The method of claim 1, wherein the supplier entity and the customer entity have, associated therewith, a plurality of entity attributes, said method further comprising the steps of:

specifying entity data representing each of the entity attributes or a combination thereof; and including the entity data in each term data set such that the contract transaction data set includes entity data.

4. The method of claim 3, wherein the specifying step includes specifying entity data representing an entity attribute from the group of entity attributes consisting of: customer entity organization information, designated customer employee contact information, supplier entity organization information, designated supplier employee contact information, and combinations thereof.

5. The method of claim 1, wherein the step of storing a term data set for each contract term includes selecting term attributes from the group of term attributes consisting of: supplier entity identifiers, customer entity identifiers, contract identifiers, contract term identifiers, term performance rules, term discount, term requirements, and combinations thereof.

6. The method of claim 1, further comprising the steps of:

for each contract, specifying entity data including supplier entity data designating one or more individuals associated with the contract for the supplier entity, and customer entity data designating individuals associated with the contract for the customer entity; and associating the entity data with each of the contract terms for the contract such that the contract transaction data sets generated include the entity data.

7. The method of claim 1, wherein the step of generating a collection of contract transaction data sets includes generating a contract transaction data set including a supplier entity identifier, a customer entity identifier, a contract identifier, and a contract term identifier.

8. The method of claim 1, wherein the step of collecting transaction data includes, receiving, at one or more client stations, transaction data relating to a partial purchase transaction, wherein the partial purchase transaction embodies less than a whole portion of a predetermined individualized transaction for a product;

deriving an individualized transaction from at least one partial purchasing transaction, the individualized transactions being associated with an individualized transaction data set; and storing the transaction data set for the individualized transaction in a computer database.

9. The method of claim 1, wherein the step of collecting historical transaction data includes collecting historical transaction data from a plurality of distinct data sources.

10. The method of claim 1, wherein the step of collecting historical transaction data includes collecting historical transaction data in a plurality of data formats and converting each of the collected transaction data into historical transaction data sets in accordance with a common data format, the common data format being defined by the data collected, the representation of the data, and the arrangement of the data in the data set.

11. The method of claim 1, wherein the step of qualifying a proposed contract term includes designating the proposed contract term as qualified upon determining that the forecasted performance satisfies a predetermined performance criteria.

12. The method of claim 11, further comprising the step of storing a plurality of proposed contract terms including a plurality of term performance rules for each proposed term, wherein the step of qualifying a proposed contract term includes comparing the forecasted performance with a term performance rule.

13. The method of claim 1, wherein the step of collecting transaction data includes receiving transaction data in a plurality of data formats and storing the received transaction data in accordance with a common data format, wherein the common data format is defined by the representation and arrangement of data in the data set.

14. The method of claim 13, wherein the step of storing received data includes storing data representing transaction attributes from the group of transaction attributes consisting of count of product units, cost of product, product code, customer entity code, supplier entity code including product originator and product distributor, and combinations thereof.

15. The method of claim 1, wherein the step of collecting transaction data includes, providing an ancillary database containing data representing product attributes of each of a supplier's products, whereby individual transaction for a single product are identifiable with a plurality of product attributes;

receiving, at a client station, parent transaction data relating to a parent purchase transaction, wherein the parent transaction embodies a plurality of individualized transactions;

deriving an individualized transaction from the parent transaction by executing a computer program to compare at least a portion of each parent transaction data with the product attributes stored in the ancillary database;

defining an individualized transaction with each of the identified products, each of the individualized transactions being associated with at least one of the transaction data sets; and storing each transaction data set for each individualized transaction in a computer database.

16. The method of claim 1, wherein the step of identifying a plurality of the stored sets of transaction ticketing data includes electronically marking each identified transaction data set with a unique contract term code and an entity code specifying the supplier entity and the customer entity.

17. The method of claim 16, wherein the step of defining a contract term includes storing an SQL statement that describes each term and wherein the marking step includes generating an SQL statement to match transaction data sets with a contract term.

18. The method of claim 1, further comprising the steps of:

generating a transaction database for storing the collected transaction data sets in a common data format;

generating a term database for storing the contract term attributes sets;

generating an entity database for storing data relating to supplier entities and customer entities;

generating an entity contacts database for storing data relating to information on individuals designated to a contract at supplier entities and individuals designated to a contract at customer entities; and generating a term performance database for storing measured term performance data;

whereby each of the databases are computer databases interconnected to at least one data processing means.

19. In a method of managing purchasing contracts between at least one supplier entity for a common carrier and at least one customer entity, wherein the purchasing contract is applicable to ticket purchasing transactions for ticket products effected, at least partially, through a computerized system, a method of generating a ticket purchasing contract, said method comprising the steps of:

collecting transaction data representing historical ticket purchasing transactions effected by the customer entity;

storing, in at least one database, a set of transaction data for each historical ticket purchasing transaction;

defining a plurality of proposed contract terms that define a ticket purchasing obligation of the customer entity;

defining term attributes associated with each proposed contract term and storing the term attributes as a term data set in a database;

executing a computer program to qualify each proposed contract term, including selecting a proposed contract term having a set of the stored term attributes;

identifying each transaction data set, among the population of stored ticketing transaction data sets, that satisfies the selected term attributes and is applicable to the proposed contract, by comparing the term attributes with the transaction data set, thereby generating a collection of contract transaction data sets;

forecasting a performance result of the proposed contract term using, as input, at least a portion of each transaction data set identified; and qualifying the proposed contract term if the forecasted result satisfies a predetermined performance criteria; and assigning a purchasing contract between the supplier entity and the customer entity, the purchasing contract having a plurality of qualified contract terms.

20. The method of claim 19, further comprising the step of defining term performance rules for each proposed contract term and storing the performance rules in at least one database, and wherein the step of qualifying the proposed contract term includes comparing the forecasted performance result with performance rules associated with the contract term, whereby the performance rules provide the predetermined criteria.

21. The method of claim 20, further comprising the step of individualizing each of the collected transaction data, including executing data processing means to convert each transaction data set to individualized transaction data sets, whereby each individualized transaction data set is associated with a single predetermined product.

22. The method of claim 21, wherein the step of collecting transaction data sets includes,
providing an ancillary database containing data representing product attributes of each product, whereby individualized transactions for a single product are identifiable with product attributes;
receiving, at a client station, information relating to a parent purchase transaction, wherein the parent transaction embodies a plurality of purchasing transactions; and
deriving individualized transactions from the parent transaction by executing data processing means, including
selecting at least a portion of data collected for the parent transaction,
comparing the selected data with the product attributes stored in the ancillary database to identity products, and
defining an individualized transaction with each of the identified products, each of the individualized transactions being associated with a plurality of the transaction data set.

23. The method of claim 19, wherein the step of collecting transaction data includes receiving transaction data in a plurality of data formats and selecting a predetermined portion of each collected transaction data for the storing step.

24. The method of claim 23, wherein the step of storing transaction data sets include storing each of the transaction data sets in accordance with a common data format.

25. The method of claim 19, wherein the step of identifying transaction data sets includes electronically marking each identified transaction data set with a unique code associated with the contract term.

26. The method of claim 25, wherein the marking step includes marking the transaction data set with a contract code and an entity code specifying the supplier entity and the customer entity.

27. The method of claim 25, wherein the step of defining a contract term includes storing an SQL statement that describes each term and wherein the marking step includes generating an SQL statement to match transaction data sets with a contract term.

28. The method of claim 19, wherein the step of storing transaction data includes creating a common data format characterized by a single line of transaction data, and wherein the transaction data set represent information selected from the group of historical purchasing information consisting of: product description, count, cost, date, time, salesperson, computed share applicable to supplier entity, and combinations thereof.

29. A method of managing a purchasing contract between a supplier entity for a common carrier and a customer entity, the purchase contract being applicable to ticketing transactions for the purchase of tickets for travel, each of the ticketing transactions being associated with a ticket unit, said method comprising the steps of:
generating a ticket purchasing contract between a supplier entity for a common carrier and a customer entity including,
defining a plurality of contract terms, a contract term being defined by a plurality of term attributes and defining a purchasing obligation of the customer entity,
storing the term attributes associated with each contract term as a term data set in a computer database,
collecting historical transaction data sets representing ticketing transactions by the customer entity,
identifying a proposed contract term having a set of term attributes,
identifying historical ticketing transaction data sets applicable to the proposed contract term by comparing contract term attributes with at least a portion of each historical ticketing transaction data set and electronically marking each identified transaction data set with a unique code associated with the contract term,
qualifying a contract term by, forecasting the performance of the proposed contract term using, as input, at least a portion of each identified historical ticketing transaction data set, and qualifying the proposed contract term based, at least partly, on the forecasted performance, and
assigning the contract term to a proposed contract;
collecting sets of ticketing transaction data for a plurality of historical ticketing transactions from a plurality of data sources;
storing a set of transaction data for each historical ticketing transaction in a computer database and in accordance with a common data format;
executing a computer program to identify historical ticketing transactions as contracted ticketing transactions (under the purchasing contract) by selecting at least a portion of the transaction data set for a transaction and comparing the selected portion with the term data set for a contract term, whereby the transaction is identified as a contracted ticketing transaction upon identifying the selected portion with a portion of the term data set; and
electronically marking each identified transaction data set with a unique code associated with the contract term thereby generating a collection of contract transaction data sets; and
executing a computer program to measure the performance of the contract term using, as input, at least a portion of the transaction data set for each identified contracted ticketing transaction.

30. A computerized system for use in managing a purchasing contract for tickets for travel, between a supplier entity for a common carrier and a customer entity, the contract covering a plurality of contracted ticketing transactions effected, at least partially, through a computerized system, said system comprising:
a plurality of data storage systems storing (i) entity data specific to the supplier entity and entity data specific to the customer entity, (ii) multiple sets of term data, each set representing attributes of a contract term, including a term code, a contract code, and term definitions for identifying transaction data sets applicable to the contract term, and (iii) a plurality of transaction data sets, each set being identified with a contracted ticketing transaction
wherein a contract term is defined by term attributes and defines a purchasing obligation of the customer entity for tickets for travel and a contracted ticketing transaction is a transaction effecting a purchase, by the customer entity, of a ticket for travel on the common carrier under the purchasing contract;
a plurality of client stations for receiving transaction data sets, each data set relating to a purchasing transaction; and a plurality of data processing systems communicable with said client stations and with said data storage systems, said data processing systems being configured to collect and store said transaction data sets in said data storage systems;

for each contract term, to compare at least a portion of said term data set with at least a portion of said transaction data set so as to identify transaction data sets applicable to the contract term and electronically mark each of said identified transaction data sets with a unique contract term code and an entity code, thereby generating a collection of contract transaction data sets, and in a contract generating procedure, to identify electronically marked historical ticketing transaction data sets applicable to a proposed contract term by comparing contract term attributes with at least a portion of each historical ticketing transaction data set;

to qualify a contract term by, forecasting the performance of the proposed contract term using, as input, at least a portion of each identified historical ticketing transaction data set, and qualifying the proposed contract term based, at least partly, on the forecasted performance;

to assign the contract term to a proposed contract; and to evaluate the proposed contract with a plurality of qualified contract terms.

31. The system of claim 30, wherein said data processing system is configured to store each transaction data set in a common data format.

32. The system of claim 30, further comprising data processing systems intercoupled with at least one of said data storage systems so as to be accessible with the contracted transaction data set, wherein said contracted transaction data sets are stored in said at least one of said data storage systems.

33. The system of claim 30, wherein each electronically marked transaction data set is electronically marked with a unique contract term code and an entity code specifying the supplier entity and the customer entity.

34. The system of claim 33, wherein said data storage systems stores an SQL statement that describes each term and wherein said data processing system is further configured to generate an SQL statement to match transaction data sets with a contract term.

* * * * *